US008751658B2

(12) United States Patent
Yamasaki et al.

(10) Patent No.: US 8,751,658 B2
(45) Date of Patent: Jun. 10, 2014

(54) ALLOCATING METHOD, ALLOCATING APPARATUS, AND COMPUTER PRODUCT

(75) Inventors: Koichi Yamasaki, Kawasaki (JP); Kazuki Matsui, Kawasaki (JP); Takashi Ohno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 362 days.

(21) Appl. No.: 13/359,805

(22) Filed: Jan. 27, 2012

(65) Prior Publication Data

US 2012/0254439 A1    Oct. 4, 2012

(30) Foreign Application Priority Data

Mar. 31, 2011  (JP) .................. 2011-080723

(51) Int. Cl.
*G06F 15/173*  (2006.01)
*G06F 9/46*  (2006.01)

(52) U.S. Cl.
USPC .......................................... 709/226; 718/104

(58) Field of Classification Search
USPC .................... 709/226, 203; 718/104
See application file for complete search history.

(56) References Cited

U.S. PATENT DOCUMENTS

| 7,380,004 | B2   | 5/2008  | Shimozono et al.            |
|-----------|------|---------|-----------------------------|
| 7,752,623 | B1 * | 7/2010  | Crawford, Jr. ....... 718/104 |
| 7,761,548 | B2 * | 7/2010  | Snyder et al. ........ 709/223 |
| 7,765,552 | B2 * | 7/2010  | Miller et al. ......... 718/104 |
| 7,808,499 | B2   | 10/2010 | Bakalash et al.             |
| 8,060,610 | B1 * | 11/2011 | Herington ........... 709/226 |
| 8,347,301 | B2 * | 1/2013  | Li et al. ............. 718/104 |
| 8,516,492 | B2 * | 8/2013  | Vaddagiri ........... 718/105 |
| 2004/0135785 | A1 * | 7/2004 | Lin et al. ........... 345/501 |
| 2008/0184227 | A1 * | 7/2008 | Matsumoto et al. ...... 718/1 |
| 2011/0119670 | A1 * | 5/2011 | Sugumar et al. ........ 718/1 |
| 2011/0199928 | A1 * | 8/2011 | Jiang et al. .......... 370/252 |
| 2012/0174106 | A1 * | 7/2012 | Seo et al. ........... 718/100 |
| 2013/0067166 | A1 * | 3/2013 | Kataoka et al. ........ 711/114 |

FOREIGN PATENT DOCUMENTS

| JP | 2005-321854 A | 11/2005 |
| JP | 2007-512613 A | 5/2007 |
| JP | 2007-140954 A | 6/2007 |
| JP | 2008-090546 A | 4/2008 |
| WO | WO 2005/050557 | 6/2005 |

* cited by examiner

*Primary Examiner* — Larry Donaghue

(74) *Attorney, Agent, or Firm* — Fujitsu Patent Center

(57) ABSTRACT

An allocating method is executed by a computer. The allocating method includes transmitting to any one given apparatus among multiple apparatuses capable of executing an identical process and respectively having a different processing performance, a command for the process; duplicating the command and transmitting resulting duplicated commands to an apparatus group that is not executing the process and among the apparatuses; measuring for the given apparatus and each apparatus of the apparatus group, a utilization rate acquired when the command is executed; identifying based on the utilization rate for the given apparatus, an apparatus to be switched among the apparatus group; and switching a transmission destination of the command, from the given apparatus to the apparatus to be switched.

13 Claims, 37 Drawing Sheets

FIG.4

| GRAPHIC CARD ID | GPU ALLOCATION DESTINATION INFORMATION | GPU PERFORMANCE INFORMATION | GPU ALLOCATION STATE |
|---|---|---|---|
| GPU-1 | VM1 | 100 [GFLOPS] | TEMPORARY ALLOCATION |
| GPU-2 | VM2 | 200 [GFLOPS] | TO BE ALLOCATED |
| GPU-3 |  | 300 [GFLOPS] | UNALLOCATED |
| GPU-4 | VM1 | 500 [GFLOPS] | FINAL ALLOCATION |
| GPU-5 | VM2 | 800 [GFLOPS] | TO BE RELEASED |
| ⋮ | ⋮ | ⋮ | ⋮ |
| GPU-n | VM2 | 1 [TFLOPS] | TO BE RELEASED |

FIG.8

| GRAPHIC CARD ID | CRITICAL TEMPERATURE [°C] |
|---|---|
| GPU-1 | 85 |
| GPU-2 | 113 |
| GPU-3 | 101 |
| ⋮ | ⋮ |
| GPU-n | 120 |

801

GPU UTILIZATION RATE=TEMPERATURE/CRITICAL TEMPERATURE×100 ⋯(1)
GPU UTILIZATION RATE OF GPU-1: GPU UTILIZATION RATE=80/85×100=94 [%]

| | FINAL ALLOCATION GPU | TEMPORARY ALLOCATION GPU1 | TEMPORARY ALLOCATION GPU2 | TEMPORARY ALLOCATION GPU3 |
|---|---|---|---|---|
| QUEUE [REMAINING COMMANDS] | 0 | 10 | 0 | 0 |
| GPU UTILIZATION RATE [%] | 45 | 100 | 88 | 93 |

903

→ MOST SUITABLE GRAPHIC CARD

FIG.9B

| | FINAL ALLOCATION GPU | TEMPORARY ALLOCATION GPU1 | TEMPORARY ALLOCATION GPU2 | TEMPORARY ALLOCATION GPU3 | TEMPORARY ALLOCATION GPU4 |
|---|---|---|---|---|---|
| QUEUE [REMAINING COMMANDS] | 35 | 0 | 0 | 5 | 0 |
| GPU PERFORMANCE INFORMATION [MFLOPS] | 100 | 300 | 650 | 250 | 1000 |

→ MOST SUITABLE GRAPHIC CARD

904

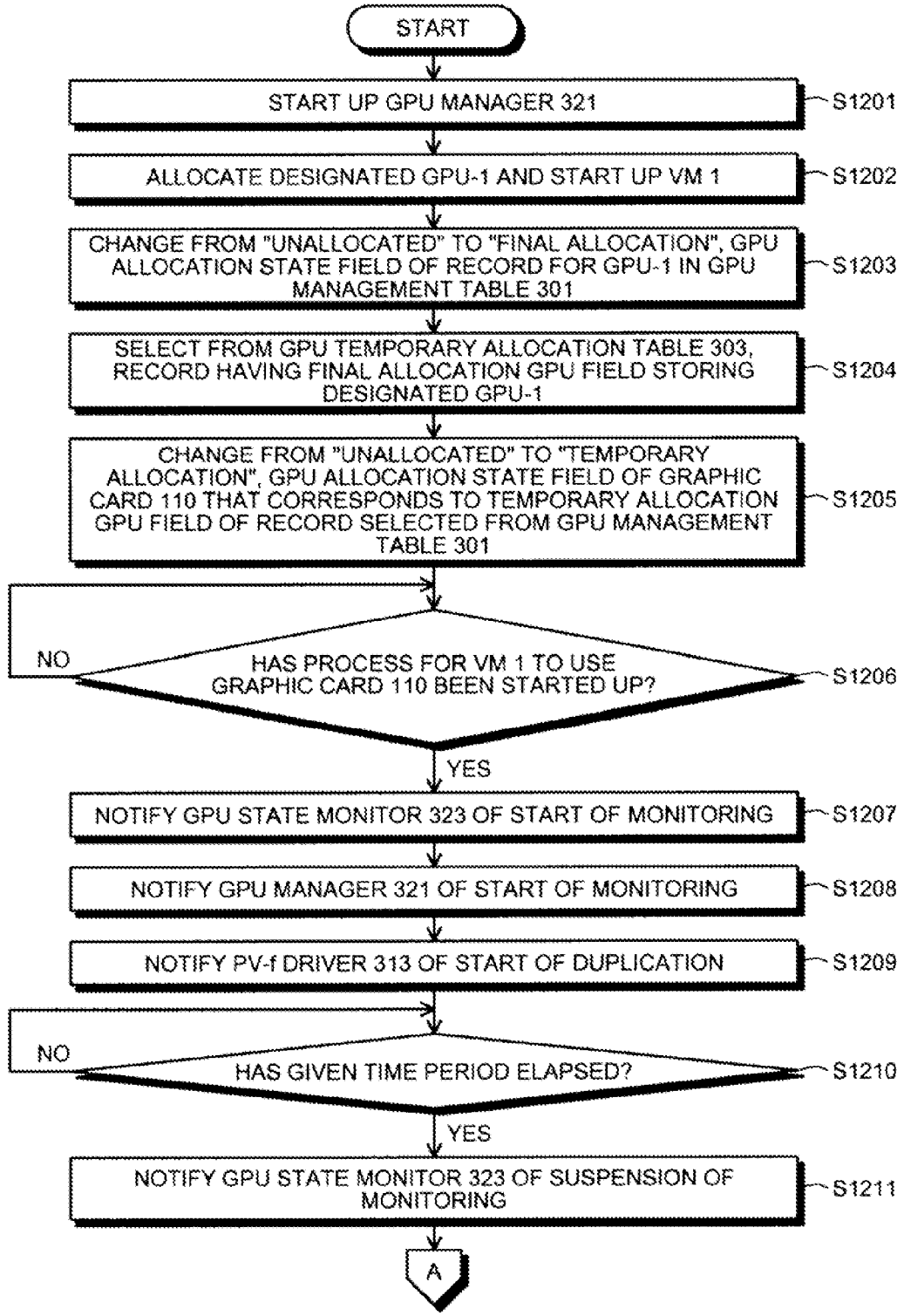

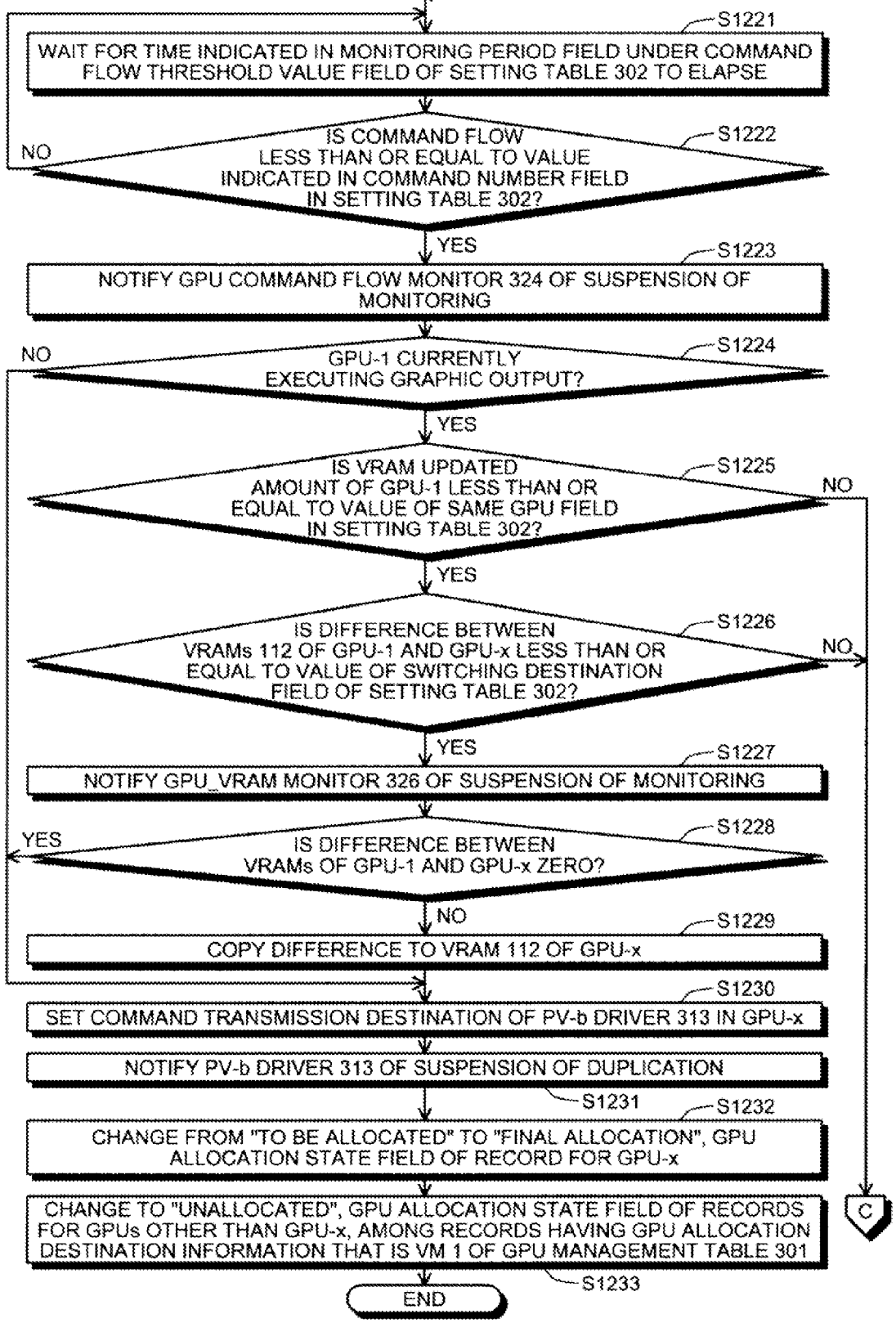

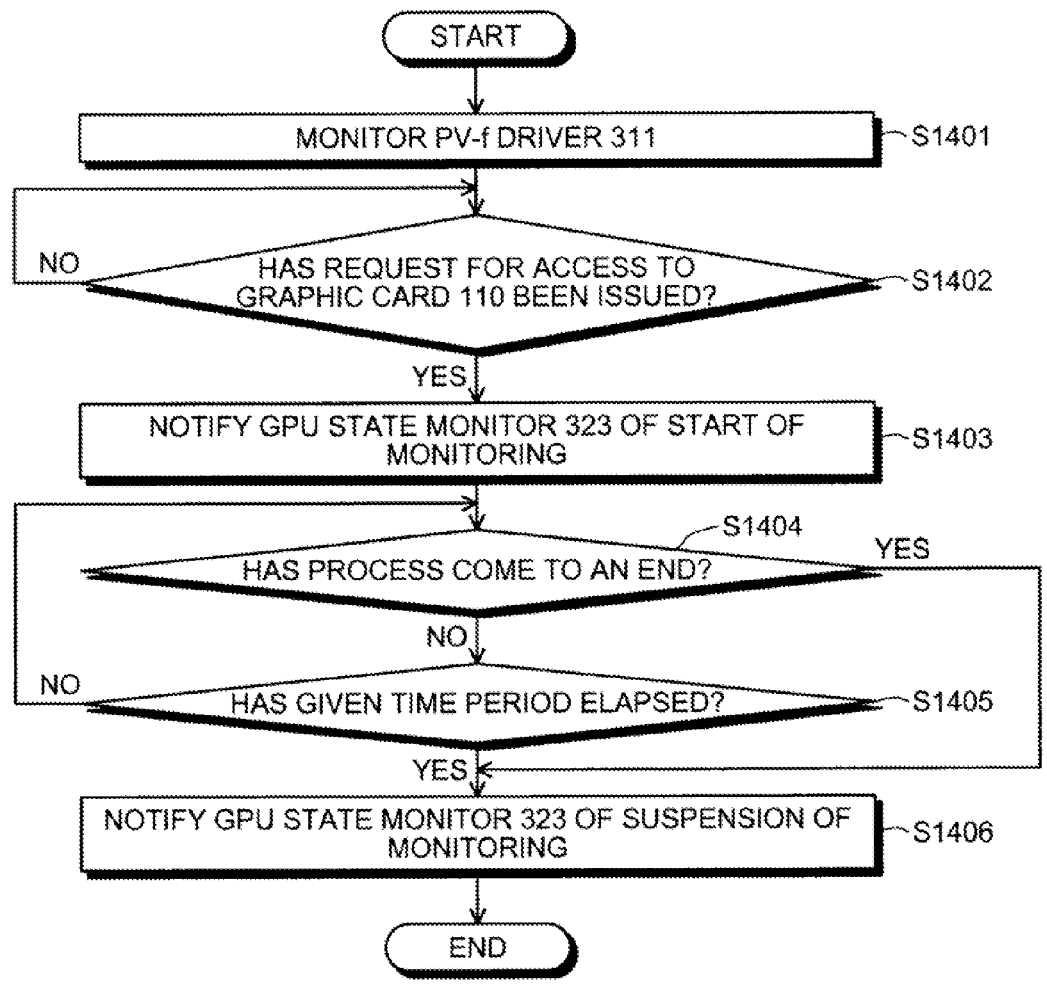

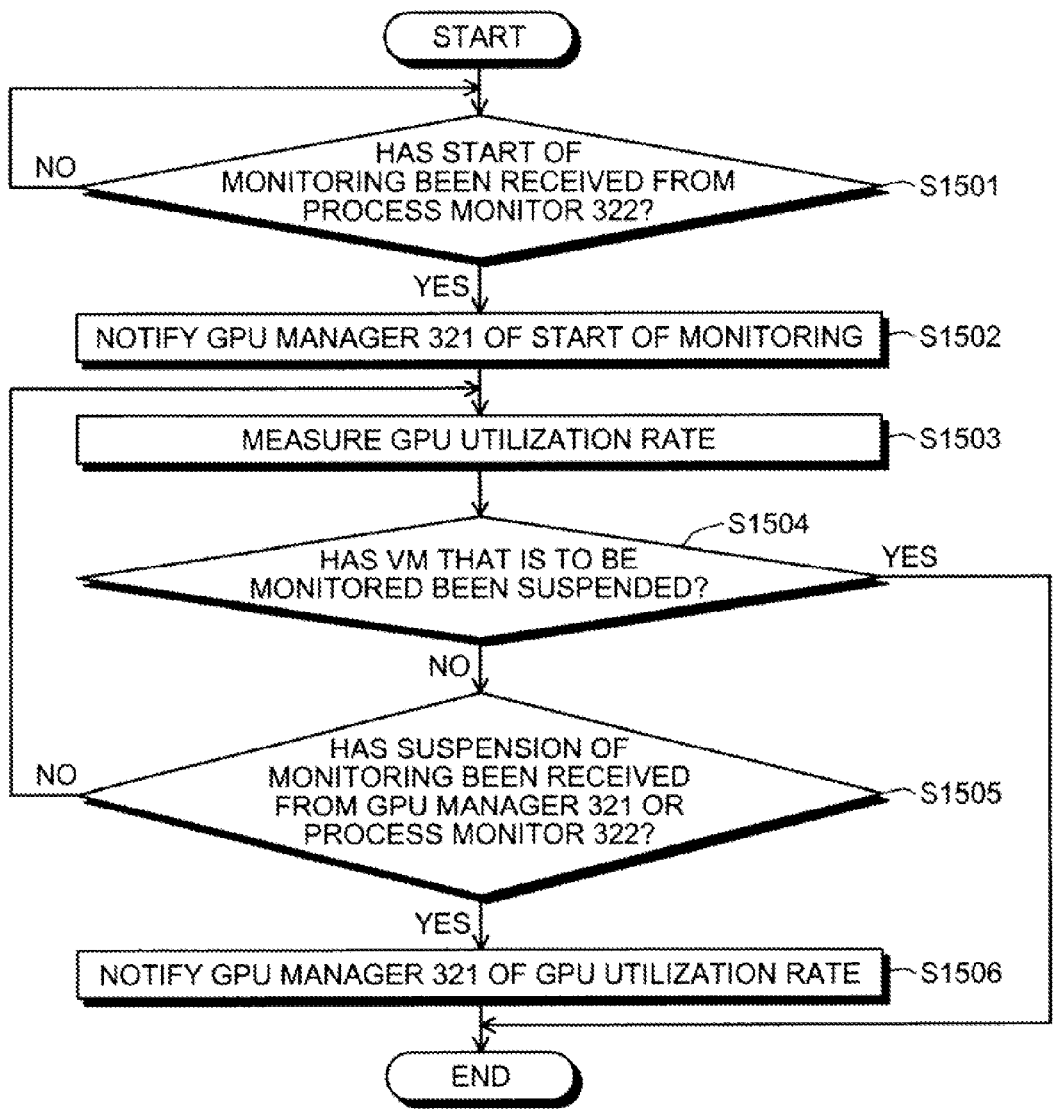

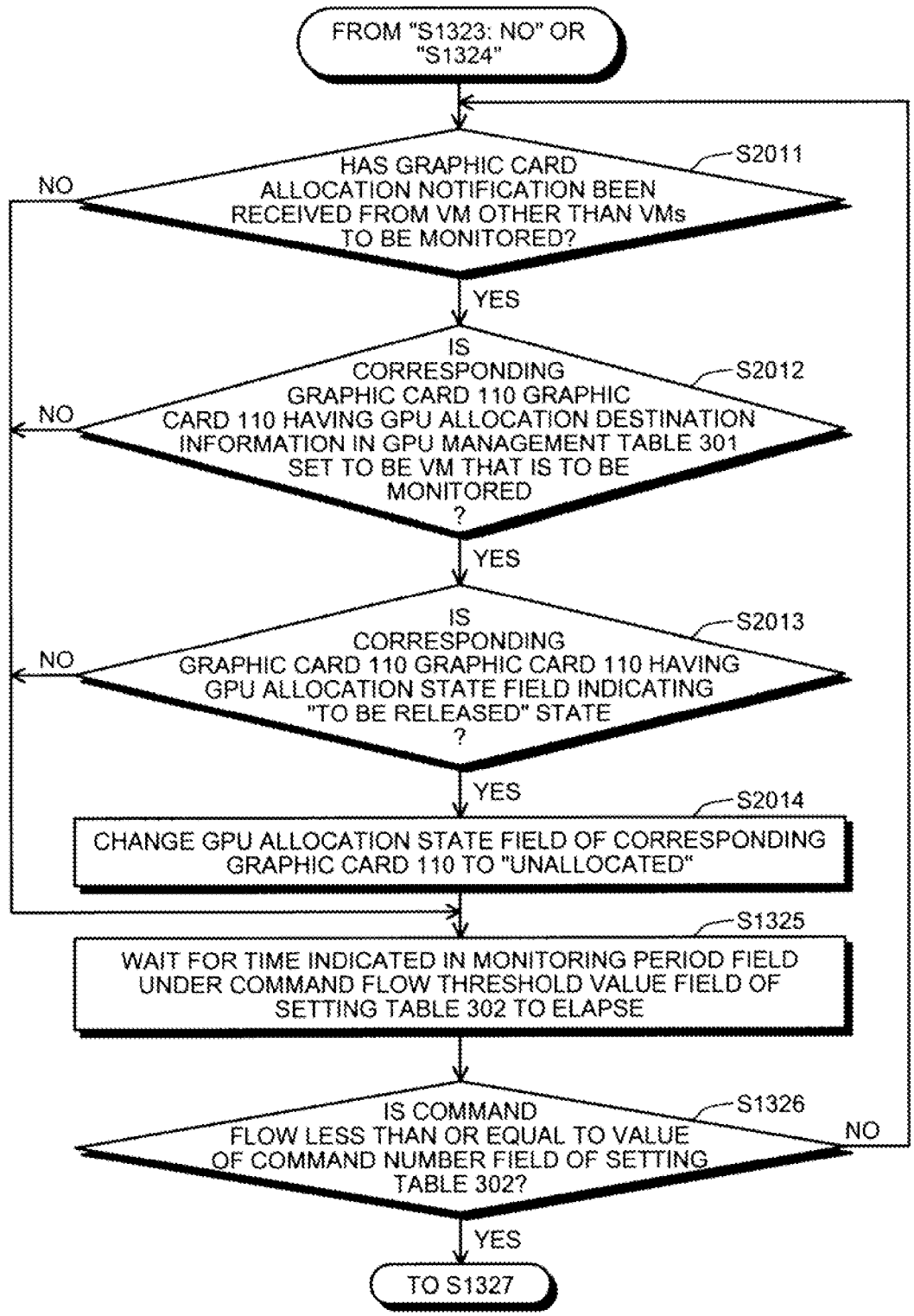

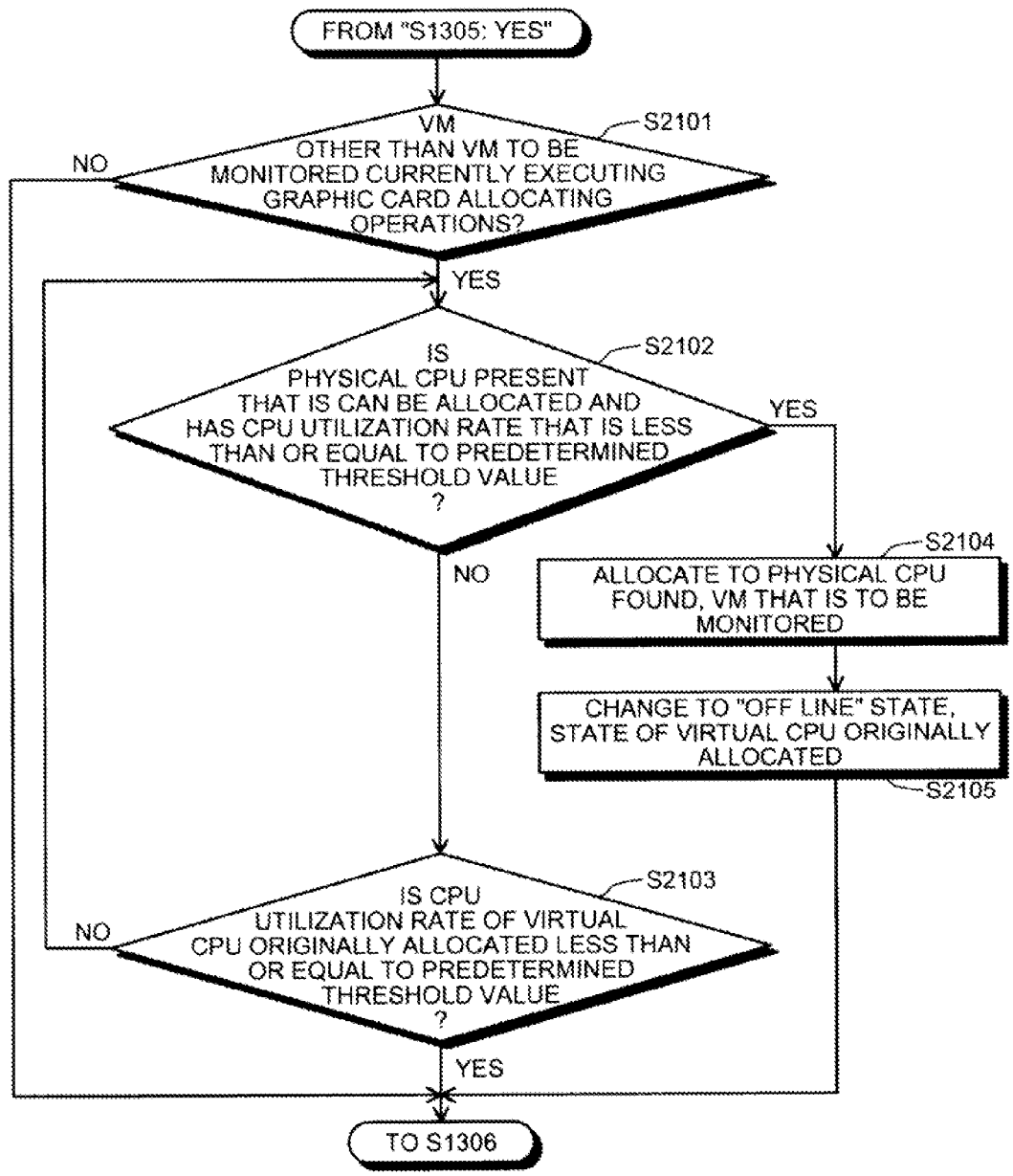

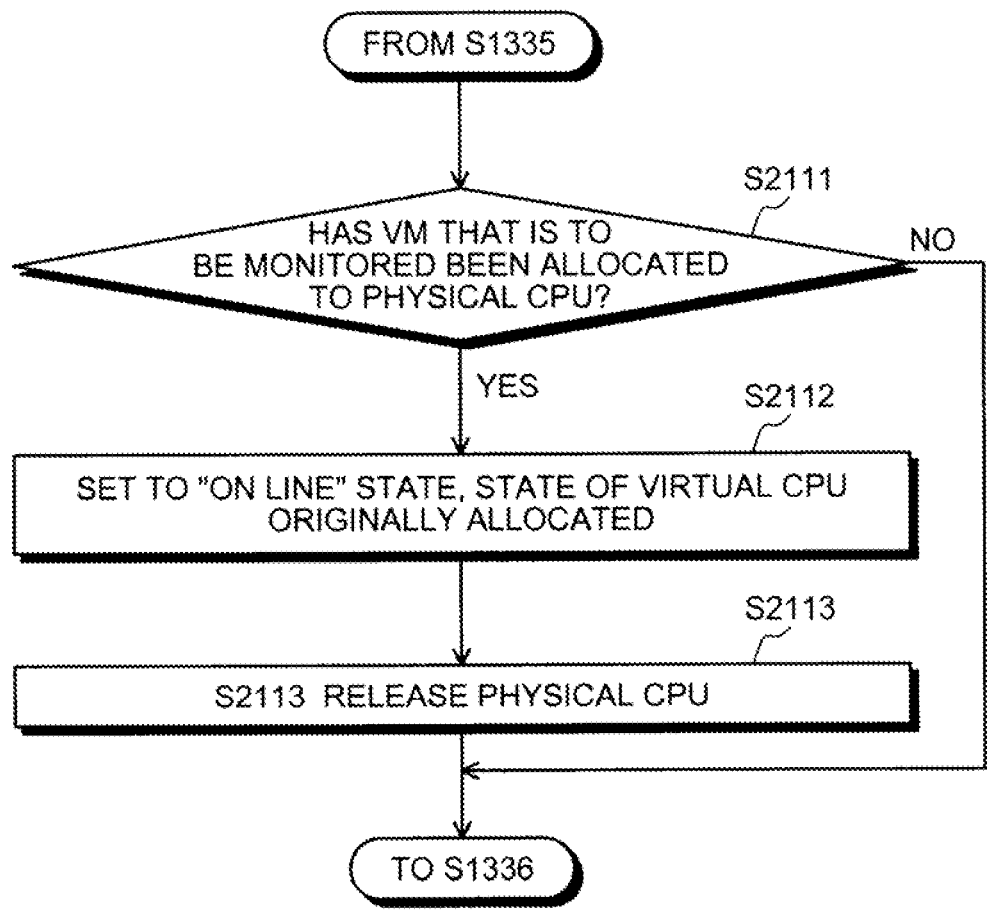

FIG.22

| USER ID | PASSWORD | VM ID | GRAPHIC CARD ID | USED MEMORY AMOUNT [M BYTE] ||
|---|---|---|---|---|---|
| | | | | AVERAGE VALUE | MAXIMUM VALUE |
| USER-A | PASSWORD-A | VM1 | GPU-3 | 1.5 | 1.8 |
| USER-B | PASSWORD-B | VM2 | GPU-7 | 20.3 | 27.6 |
| USER-C | PASSWORD-C | VM3 | GPU-6 | 4.9 | 6.2 |
| USER-D | PASSWORD-D | VM4 | GPU-1 | 10.1 | 13.3 |
| : | : | : | : | : | : |
| USER-x | PASSWORD-x | VMx | GPU-2 | 13.4 | 15.0 |

2201

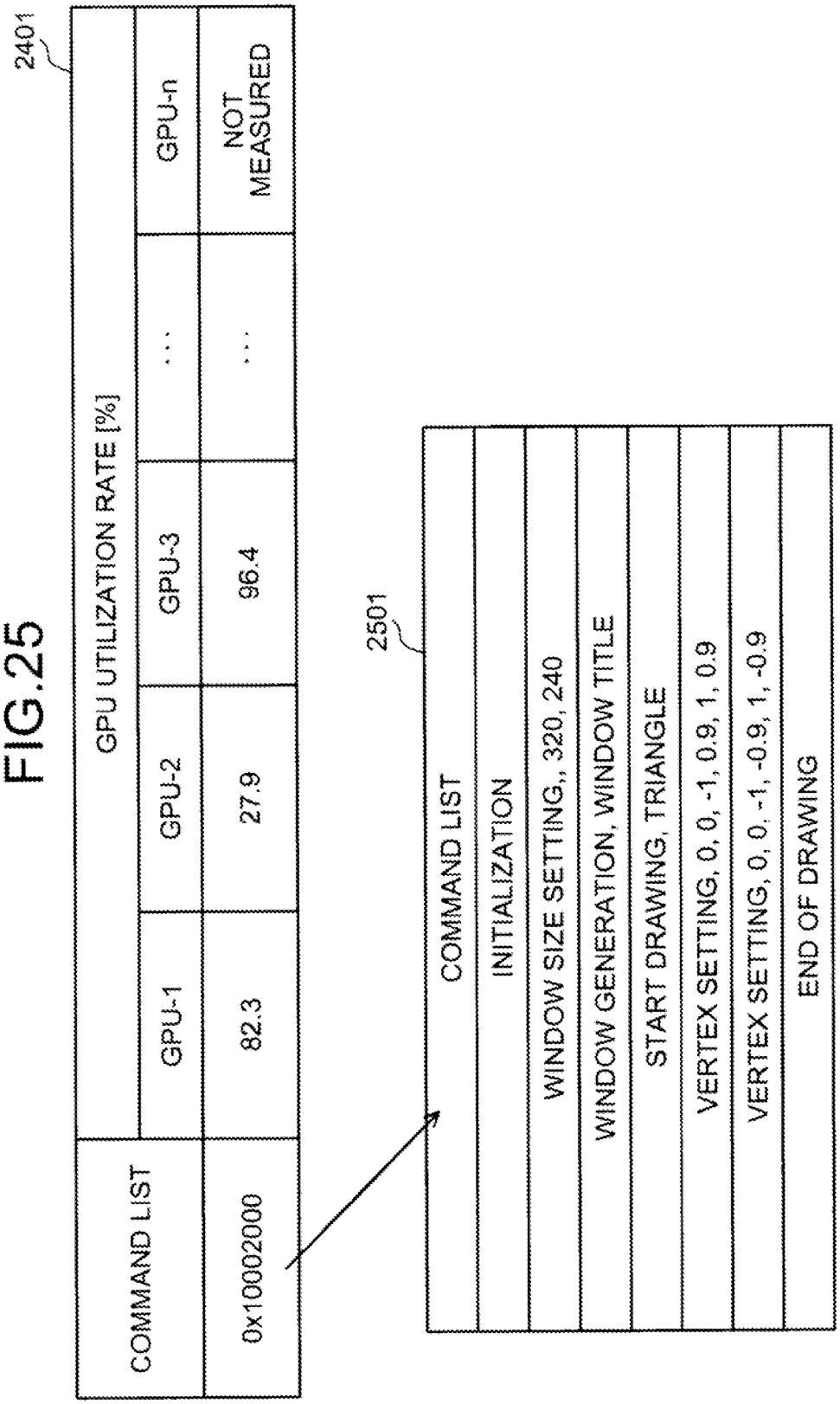

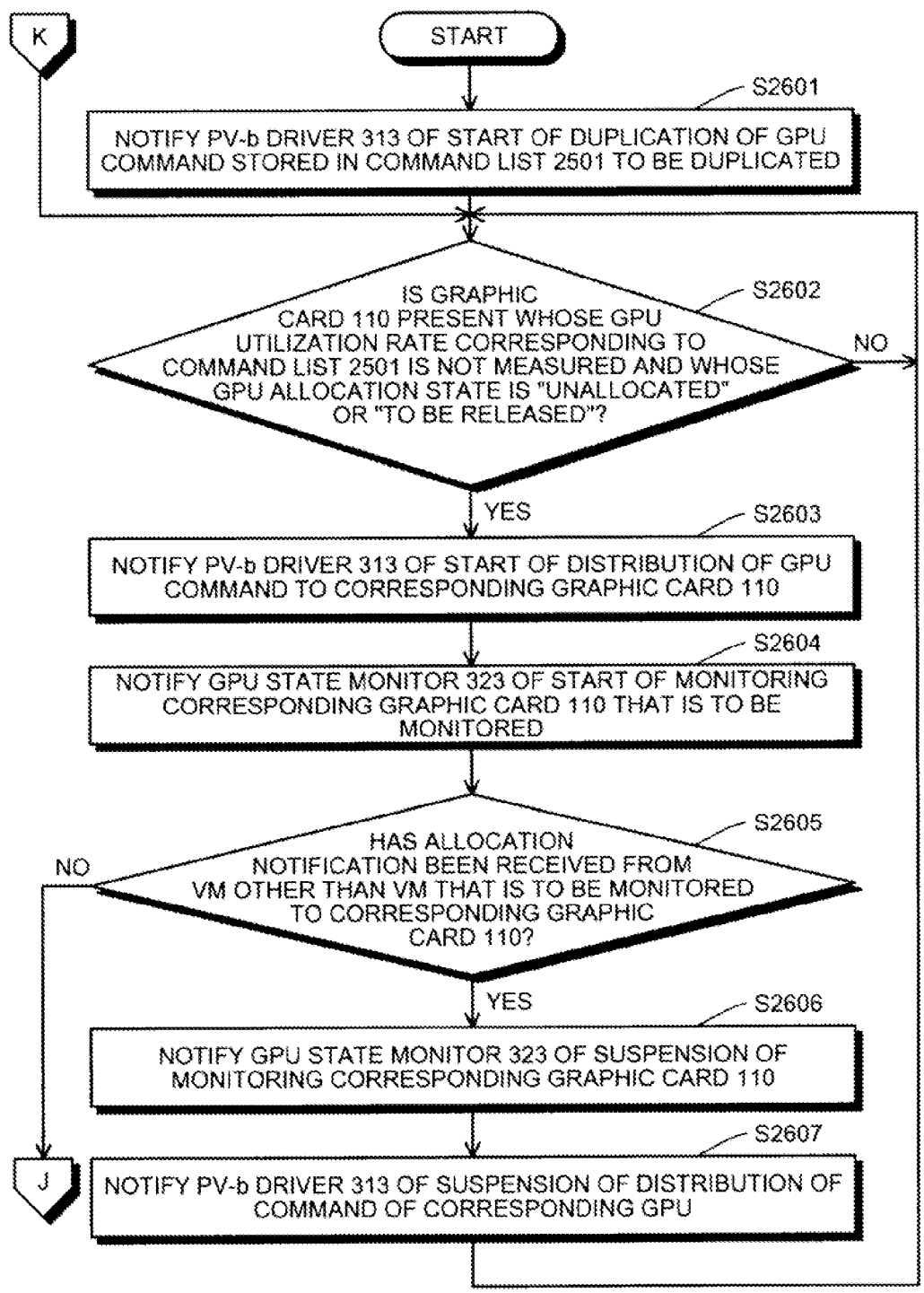

ALLOCATING METHOD, ALLOCATING APPARATUS, AND COMPUTER PRODUCT

CROSS REFERENCE TO RELATED APPLICATIONS

This application is based upon and claims the benefit of priority of the prior Japanese Patent Application No. 2011-080723, filed on Mar. 31, 2011, the entire contents of which are incorporated herein by reference.

FIELD

The embodiments discussed herein are related to apparatus allocation.

BACKGROUND

Recently, the market for client virtualization solutions in which the execution environment is moved to the server side, unlike client terminals that are directly operated by users on the client side, has expanded. For example, technologies have been disclosed where, in a thin client system having a client terminal that executes the least processing necessary and a server that executes most of the processing, functions of the client terminal is virtualized and PC functions of several dozen PCs are integrated into one server.

The introduction cost of a conventional thin client system is high and therefore, a Desktop-As-A-Service (DaaS) system has been offered that is small-scale and can be inexpensively introduced. The DaaS system is a system that applies client virtualization in a cloud environment and that supplies to a client terminal, a desktop environment of an OS of a virtual machine operating on a server (hereinafter, "virtual desktop environment").

The client terminal in the DaaS system has to use the virtual desktop environment through a network. In this case, by allocating to the virtual machine, a graphic card that is connected to the server, a graphic process is executable at a high speed even in the virtual desktop environment. Consequently, a user of the client terminal is able to use in a stress-free manner application software (hereinafter, "application") that accompanies high-speed graphic processing such as computer-aided design (CAD) and regeneration of a moving image.

For example, a technology is disclosed of distributing load using multiple parallel modes in a computer having multiple graphics processing units (GPUs) as a technology concerning apparatus allocation. A technology is disclosed of dynamically and efficiently allocating processes to processor cores according to the execution state of the processes in an example of a multi-core processor system that has multiple cores, as a technology concerning allocation to apparatuses (see, e.g., Published Japanese-Translation of PCT Application, Publication No. 2007-512613 and Japanese Laid-Open Patent Publication No. 2008-90546). A "process" is an execution unit of a program that is executed by a central processing unit (CPU).

For example, a technology is disclosed of selecting a processor of a server such that the requested performance of the server connected to a storage system is not higher than the processing performance of the processor that corresponds to an interface of the storage system, as another technique concerning the allocation. A technology is present of extracting log data operated by an operator and reproducing the log data (see, e.g., Japanese Laid-Open Patent publication Nos. 2005-321854 and 2007-140954).

When a server in the DaaS system allocates a graphic card to a virtual machine by applying any one of the conventional technologies, the processing performance of the graphic card allocated may be too high or too low for application used by a user of the virtual machine. If the processing performance of the graphic card allocated is too high for the application running on the virtual machine that made the request, although no problems arises since the request of the application operating on the corresponding virtual machine has been satisfied, graphic cards allocated by the server are limited and therefore, a problem arises in that, when another virtual machine desires to use a graphic card having high processing performance, such graphic cards may have already been allocated.

SUMMARY

According to an aspect of an embodiment, an allocating method is executed by a computer. The allocating method includes transmitting to any one given apparatus among multiple apparatuses capable of executing an identical process and respectively having a different processing performance, a command for the process; duplicating the command and transmitting resulting duplicated commands to an apparatus group that is not executing the process and among the apparatuses; measuring for the given apparatus and each apparatus of the apparatus group, a utilization rate acquired when the command is executed; identifying based on the utilization rate for the given apparatus, an apparatus to be switched among the apparatus group; and switching a transmission destination of the command, from the given apparatus to the apparatus to be switched.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory diagram of an example of the contents stored in a GPU management table 301.

FIG. 8 is an explanatory diagram of an example of a method of measuring a GPU utilization rate.

FIG. 9A depicts a method of identifying the most suitable graphic card 110 based on the queue that remains in a PV-b driver 313 and the GPU utilization rate.

FIG. 9B depicts a method of identifying the most suitable graphic card 110 based on the queue that remains in the PV-b driver 313 and the GPU performance information.

FIG. 12A is a flowchart of an example of a procedure for graphic card allocating operations of a management OS 122.

FIG. 12C is a flowchart of an example of a procedure for graphic card allocating operations of the management OS 122.

FIG. 14 is a flowchart of an example of operations of a process monitor 322.

FIG. 15 is a flowchart of an example of operations of a GPU state monitor 323.

FIG. 20B is a flowchart of an example of graphic card allocating operations of the GPU manager 321 according to the second embodiment.

FIG. 21A is a flowchart of an example of graphic card allocating operations of the GPU manager 321 according to the third embodiment.

FIG. 21B is a flowchart of an example of graphic card allocating operations of the GPU manager 321 according to the third embodiment.

FIG. 22 is an explanatory diagram of an example of the contents stored in a user table 2201.

FIG. 25 is an explanatory diagram of an example of the contents stored in a command retaining table 2401.

FIG. 26A is a flowchart of an example of the GPU utilization rate measuring operations by the GPU manager 321.

DESCRIPTION OF EMBODIMENTS

Preferred embodiments of the present invention will be explained with reference to the accompanying figures.

Figure 1:
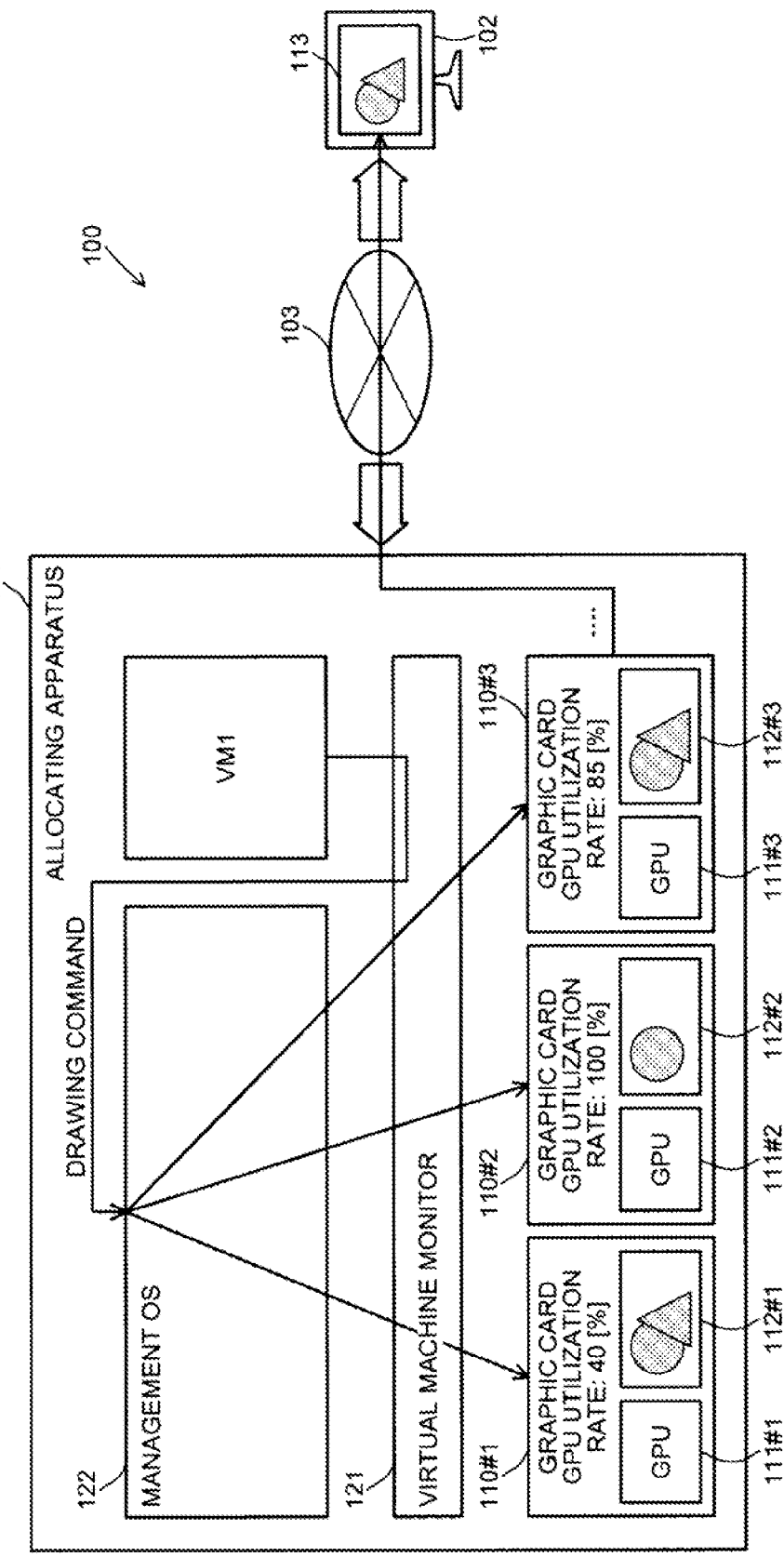
FIG. 1 is an explanatory diagram of an example of operation of a DaaS system 100 according to a first embodiment.

FIG. 1 is an explanatory diagram of an example of operation of a DaaS system 100 according to a first embodiment. The DaaS system 100 includes an allocating apparatus 101 that is a server and a terminal apparatus 102. The allocating apparatus 101 and the terminal apparatus 102 are connected to each other by a network 103. The allocating apparatus 101 is an apparatus that provides a virtual desktop environment to the terminal apparatus 102. The terminal apparatus 102 is a terminal operated by a user and uses the virtual desktop environment provided by the allocating apparatus 101.

The allocating apparatus 101 includes multiple graphic cards 110#1 to 110#n each having a different processing performance. "n" is an integer that is two or larger. The graphic cards 110#1 to 110#n may be directly connected to the allocating apparatus 101 or may be connected to an extension box that is connected to the allocating apparatus 101. For example, four or eight graphic cards 110 may be connected to the extension box.

Each of the graphic cards 110 executes operations to display a picture or characters on a screen. The graphic card 110 includes a GPU 111 and video random access memory (VRAM) 112. For example, the graphic card 110#1 includes a GPU 111#1 and VRAM 112#1. Similarly, the graphic card 110#2 includes a GPU 111#2 and VRAM 112#2, and the graphic card 110#3 includes a GPU 111#3 and VRAM 112#3. The GPU 111 executes graphic processing. The VRAM 112 is memory that retains an image processed by the GPU 111.

The terminal apparatus 102 includes a display 113. By the virtual desktop environment, an image in the VRAM 112 generated by the graphic card 110 is displayed on the display 113.

The allocating apparatus 101 executes a virtual machine monitor 121. The virtual machine monitor 121 is software that virtualizes a computer and controls the computer to be able to execute multiple OSs. In the example depicted in FIG. 1, the virtual machine monitor 121 causes a virtual machine (VM) 1 and a management OS 122 to operate.

The VM 1 is a virtual computer that is operated by the allocating apparatus 101. For example, the VM 1 is software that virtualizes hardware resources of the allocating apparatus 101, such as the CPU, memory, and the graphic card 110 and provides a virtualized execution environment to the software executed on the VM. The VM 1 depicted in FIG. 1 is correlated with the terminal apparatus 102, executes an application such as CAD, and regenerates moving images according to an instruction from the terminal apparatus 102.

The management OS 122 has a function of managing a portion of the hardware and the virtual machine in the allocating apparatus 101. For example, when the management OS 122 receives a drawing command from the VM 1, the management OS 122 allocates any one of the graphic cards 110 among the graphic cards 110 to the VM 1.

When the application for the VM 1 to use the graphic card 110 is started up, the allocating apparatus 101 according to the first embodiment and including the above hardware and software, outputs to the graphic cards 110#1 to 110#3, the drawing commands transmitted from the application. In the example depicted in FIG. 1, it is assumed that the drawing commands transmitted are drawing commands to draw a circle and to draw a triangle.

According to the drawing commands, the graphic cards 110#1 to 110#3 generate images in the VRAMs 112#1 to 112#3. At this time, the management OS 122 transmits to the terminal apparatus 102, any one of the images in the VRAMs 112#1 to 112#3. For example, the management OS 122 transmits to the terminal apparatus 102, the image in the VRAM 112#1.

The management OS 122 measures the utilization rate of the graphic card 110 during generation of an image. The "utilization rate of the graphic card 110" is the utilization rate of the GPU 111 in the graphic card 110. The "utilization rate of the GPU 111" refers to the rate of the processing capacity of the GPU 111 that is used. When the utilization rate is, for example, 0[%], the GPU 111 does not execute processing at all and, when the utilization rate is, for example, 100[%], the GPU 111 executes processing at a processing capacity that is equal to the processing capacity of the GPU 111.

In the example depicted in FIG. 1, the GPU utilization rate of the graphic card 110#1 is 40[%] and the graphic card 110#1 has high processing performance and a processing capacity that is higher than that demanded by the application, affording a margin in terms of processing capacity. The GPU utilization rate of the graphic card 110#2 is 100[%] and the graphic card 110#2 has low processing performance, is unable to draw a triangle, and the processing capacity of the graphic card 110#2 does not satisfy the processing capacity demanded by the application. The GPU utilization rate of the graphic card 110#3 is 85[%] and this state corresponds to a state where the processing capacity of a graphic card satisfies the processing capacity requested by the application. As to the processing capacity requested by the application, the management OS 122 may designate, for example, a utilization rate range of 80 to 90[%] as the processing capacity requested by the application.

In this case, the management OS 122 identifies the graphic card 110#3 as a graphic card 110 whose processing capacity satisfies the processing capacity requested by the application, and allocates the graphic card 110#3 to the VM 1. Consequently, the allocating apparatus 101 is able to allocate a graphic card 110 that is suitable for the processing capacity demanded by the source of the request.

Figure 2:
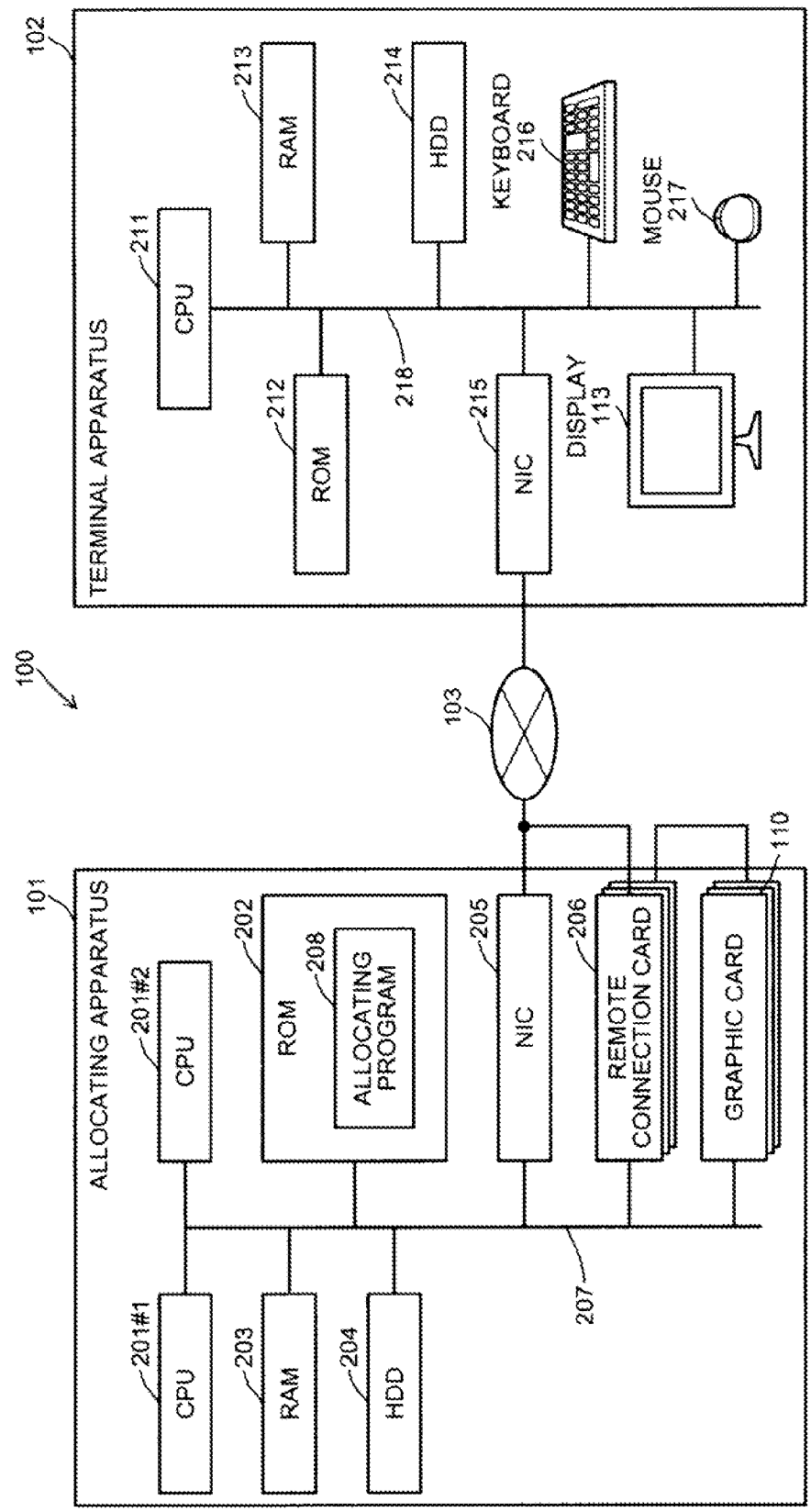
FIG. 2 is a block diagram of an example of hardware of the DaaS system 100.

FIG. 2 is a block diagram of an example of hardware of the DaaS system 100. As depicted in FIG. 2, the allocating apparatus 101 includes CPUs 201#1 and 201#2, read only memory (ROM) 202, and random access memory (RAM) 203. The allocating apparatus 101 includes a hard disk drive (HDD) 204 as an auxiliary storage device. The allocating apparatus 101 includes a network interface card (NIC) 205, remote connection cards 206#1 to 206#n, and the graphic cards 110, respectively connected by a bus 207.

The CPUs 201#1 and 201#2 control the entire allocating apparatus 101. The allocating apparatus 101 may include three or more CPUs. In this manner, the allocating apparatus 101 according to the first embodiment may be configured as a multi-core processor system. The "multi-core processor system" is a system of a computer that includes a processor having multiple cores. A single processor may be employed that has multiple cores or a processor group may be employed that includes single-core processors in parallel, when the system has multiple cores. In the embodiment, description will be made taking an example of a configuration of parallel CPUs that are respectively a single-core processor.

The allocating apparatus 101 according to the first embodiment may be a single-core processor system that has one core. The CPUs 201#1 and 201#2 may each have cache memory.

The ROM 202 stores therein programs such as a boot program. The ROM 202 may further store therein an allocation program 208. The RAM 203 is used as a work area of the CPUs 201#1 and 201#2. The HDD 204 stores data written under the control of the CPU 201, controls the reading. The allocation program may be stored by the HDD 204.

The NIC 205 is connected to a network 103 such as a local area network (LAN), a wide area network (WAN), and the Internet through a communication line and is connected to other apparatuses through the network 103.

The remote connection card 206 is a card that transmits display data [of the virtual desktop environment] to the terminal apparatus 102 according to "PC over IP". For example, the remote connection card 206 receives output from the graphic card 110 as the display data, encrypts the output according to the "PC over IP", and transmits the encrypted data to the terminal apparatus 102 through the network 103. The terminal apparatus 102 converts the data received, decrypts the data as the display data, and displays the data on the display 113. The remote connection card 206 and the graphic card 110 are present in one-to-one correlation.

The terminal apparatus 102 includes a CPU 211, ROM 212, RAM 213, an HDD 214, a NIC 215, a keyboard 216, a mouse 217, and the display 113, respectively connected by a bus 218. The CPU 211 to the NIC 215 are similar to the CPU 201 to the NIC 205 and therefore, will not again be described.

The keyboard 216 includes, for example, keys for inputting letters, numerals, and various instructions and performs the input of data. The keyboard 216 may be a touch-panel-type input pad or numeric keypad, etc. may be adopted. The mouse 217 is used to move the cursor, select a region, or move and change the size of windows. A track ball or a joy stick may be adopted provided each respectively has a function similar to a pointing device.

The display 113 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 113.

Figure 3:
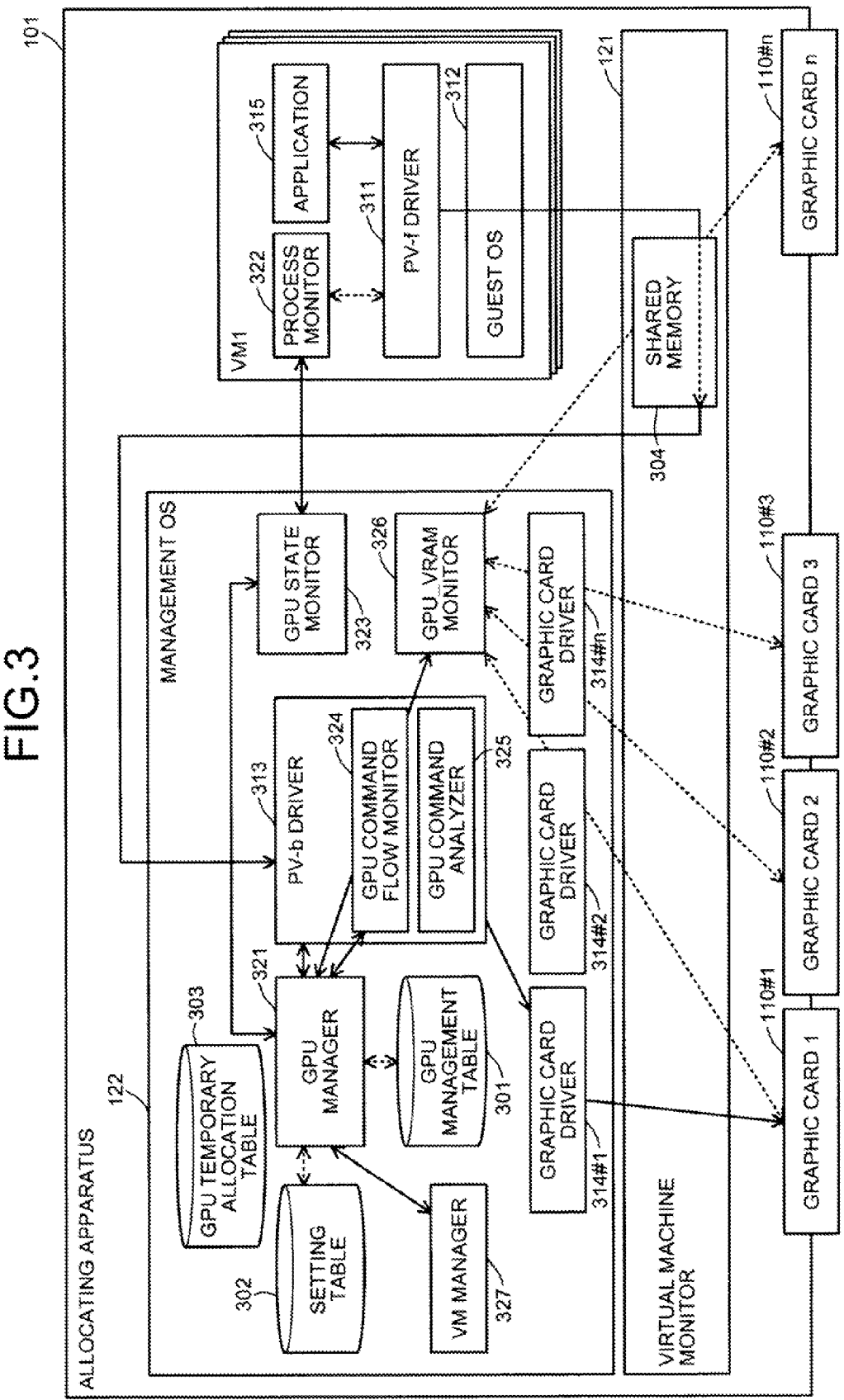
FIG. 3 is a block diagram of an example of software of an allocating apparatus 101.

FIG. 3 is a block diagram of an example of software of the allocating apparatus 101. The allocating apparatus 101, using the software, is able to access the tables such as a GPU management table 301, a setting table 302, and a GPU temporary allocation table 303. These tables 301 to 303 are stored in a storage device such as the ROM 202, the RAM 203, or the HDD 204. The allocating apparatus 101 is able to access shared memory 304 that enables data to be transmitted and received between the management OS 122 and each VM.

The allocating apparatus 101 also includes a graphic device pseudo-virtualization front end driver (hereinafter, "PV-f driver") 311, a guest OS 312, a pseudo-virtualization back end driver (hereinafter, "PV-b driver") 313, and a graphic card driver 314.

The allocating apparatus 101 further includes a GPU manager 321, a process monitor 322, a GPU state monitor 323, a GPU command flow monitor 324, a GPU command analyzer 325, a GPU_VRAM monitor 326, and a VM manager 327.

The GPU management table 301 is a table that stores therein information such as the allocation state of the graphic cards 110. Details of the GPU management table 301 will be described later with reference to FIG. 4. The setting table 302 is a table that stores therein the number of allocated graphic cards 110 and threshold values referred to by the functional units. Details of the setting table 302 will be described later with reference to FIG. 5. The GPU temporary allocation table 303 is a table for determining the graphic cards 110 to be finally allocated and temporarily allocated when the virtual machine is started up. Details of the GPU temporary allocation table 303 will be described later with reference to FIG. 6.

The PV-f driver 311 is executed on the VM, receives a graphic process from the application, and transmits a command for the graphic process to the management OS 122. Hereinafter, a command for graphic processing will be referred to as a "GPU command". The "graphic process from the application" is a 3-D graphic process such as OpenGL or DirectX.

The guest OS 312 is an OS executed on the VM. For example, the guest OS 312 supplies a library and an application programming interface (API), etc., used by the application 315.

The PV-b driver 313 is executed on the management OS 122, duplicates the GPU command, and simultaneously notifies multiple graphic card drivers 314 of the duplicated GPU command. When the GPU manager 321 identifies the most suitable graphic card 110, the PV-b driver 313 switches to the identified graphic card 110, the transmission destination of the command, which is the duplication source for the graphic process.

The graphic card drivers 314#1 to 314#n are executed on the management OS 122 and are device drivers that control the graphic cards 110#1 to 110#n.

The application 315 is a process that is started up on the VM. A "process" is an execution unit of a program executed by the CPU. For example, the application 315 is an application that executes a 3-D graphic process such as OpenGL, DirectX, etc., for the graphic cards 110#1 to 110#n.

The application 315 may be an application that requests the graphic cards 110#1 to 110#n for an execution of a general-purpose process other than the image processing. A technology such as general purpose computing on GPU (GPGPU) is disclosed as a technology of using the computing resources of the GPU for a purpose other than image processing. In the following description, a command to use the GPU 111 as the GPGPU will be handled to be included in the GPU command.

The GPU manager 321 is executed on the management OS 122, identifies the most suitable graphic card 110, and allocates the identified graphic card 110 to the VM. The process monitor 322 is executed on the VM and monitors whether the graphic card 110 has been accessed by the application 315.

The GPU state monitor 323 is executed on the management OS 122 and measures the GPU utilization rate of the graphic card 110 to be monitored. For example, the GPU state monitor 323 invokes the API capable of acquiring the GPU utilization rate and thereby, refers to the GPU utilization rate. When no API capable of acquiring the GPU utilization rate is supplied, the GPU state monitor 323 may measure the GPU utilization rate by referring to the temperature of the graphic card 110, a queue for the PV-b driver 313, etc.

The GPU command flow monitor 324 is executed on the management OS 122 and counts the flow of the GPU commands that pass through the PV-b driver 313. The GPU command analyzer 325 analyzes the GPU commands that pass through the PV-b driver 313. As to the content of the analysis, the GPU command analyzer 325 acquires the operation type of the GPU command passing through the PV-b driver 313 according to the format of the GPU command. The GPU command analyzer 325 judges through the analysis, that the GPU command passing through the PV-b driver 313 is a command to start drawing or a command to draw a triangle.

The GPU_VRAM monitor 326 monitors the updated amount of the VRAM 112 of the graphic card 110. For example, after the most suitable graphic card 110 is identified, the GPU_VRAM monitor 326 monitors the updated amount between the VRAM 112 of the graphic card 110 before the switching and that after the switching.

The VM manager 327 has a function of managing the VM currently executed by the allocating apparatus 101. For example, the VM manager 327 acquires identification information of the VM currently executed, and starts up and shuts down the VM.

FIG. 4 is an explanatory diagram of an example of the contents stored in the GPU management table 301. The GPU management table 301 includes four fields, a "graphic card ID" field, a "GPU allocation destination information" field, a "GPU performance information" field, and a "GPU allocation state" field. The graphic card ID field stores therein identifiers that uniquely identify the graphic cards 110#1 to 110#n. In the description with reference to FIG. 4, the graphic card 110 identified by the graphic card ID field is described as a target graphic card 110.

The GPU allocation destination information field stores therein identification information of a virtual machine that is the allocation destination of the target graphic card 110. The GPU performance information field stores therein processing information of the GPU 111 included in the target graphic card 110. The performance information is represented by the result of measurement by a bench mark software, a catalog value of the graphic card 110, etc. The GPU performance information field may store therein the GPU utilization rate acquired when a given GPU command is executed.

The GPU allocation state field stores therein any one state among five states that include "unallocated", "final allocation", "temporary allocation", "to be allocated", and "to be released", which indicate the state of the allocation of the target graphic card 110 to the virtual machine. The "unallocated" state represents a state where the target graphic card 110 is not allocated to any virtual machine. The "final allocation" state represents a state where the virtual machine currently uses the target graphic card 110. The "temporary allocation" state represents a state where the target graphic card 110 is a candidate for the most suitable graphic card 110.

The "to be allocated" state represents a state from when the target graphic card 110 is identified as the most suitable graphic card 110 until the final allocation state is established. The "to be released" state represents a state where, the target graphic card 110, while in the temporary allocation state, is identified to not be the most suitable graphic card 110 and can be released at any time. A graphic card 110, in the "to be released" state, transitions to the "unallocated state" when the graphic card 110 in the "to be allocated" state transitions in the "final allocation" state.

To simplify the description, the graphic cards 110#1, 110#2, . . . , 110#n will hereinafter respectively be referred to as "GPU-1", "GPU-2", . . . , "GPU-n".

For example, in the example depicted in FIG. 4, the VM 1 is allocated with the GPU-4 whose GPU performance information indicates 500 [GFLOPS (floating point number operations per second (FLOPS)] for the "final allocation" state and the GPU-1 whose GPU performance information indicates 100 [GFLOPS] for the "temporary allocation" state; and the VM 2 is allocated with the GPU-5 whose GPU performance information indicates 800 [GFLOPS] and the GPU-n whose GPU performance information indicates 1 [TFLOPS] for the "to be released" state.

Figure 5:
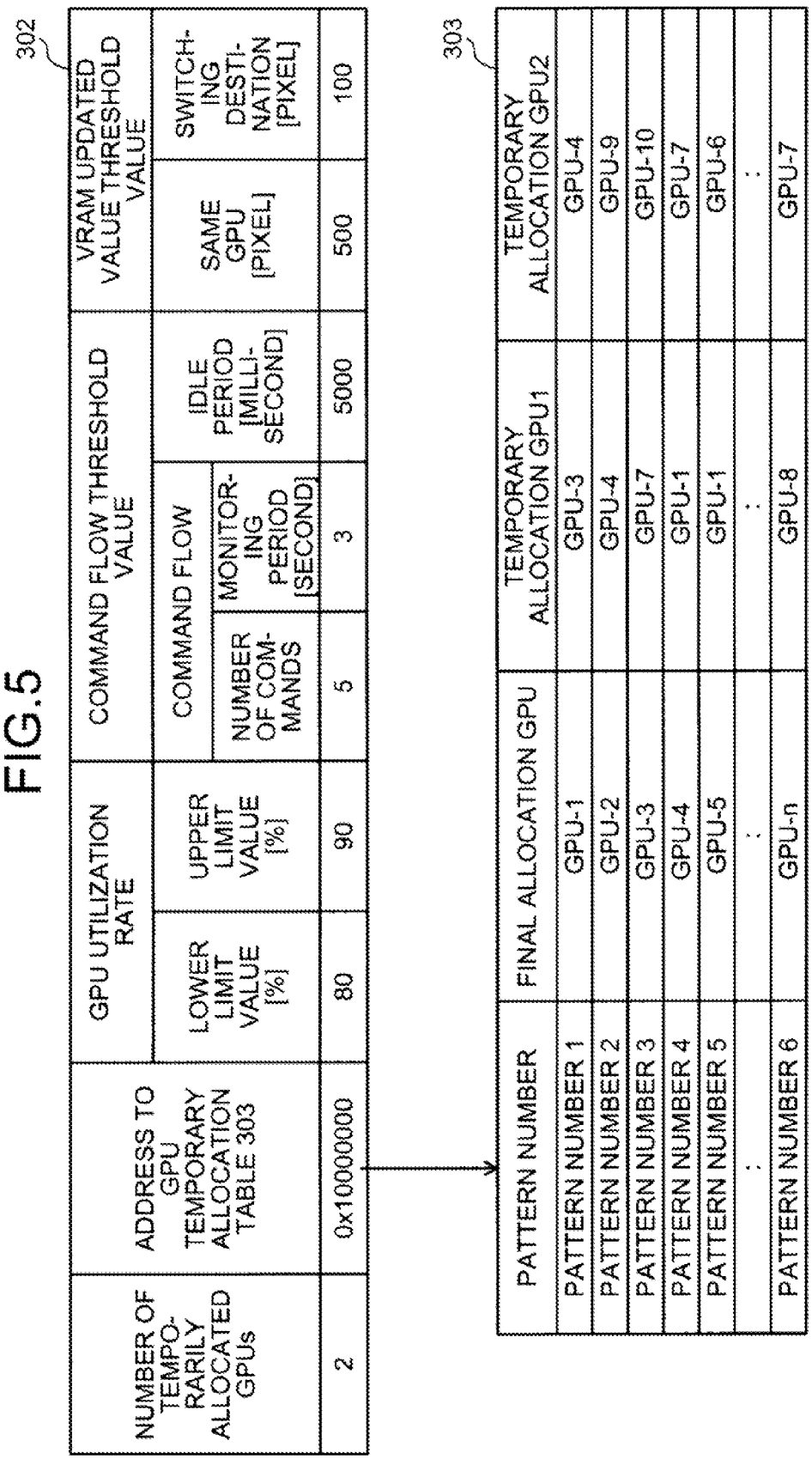
FIG. 5 is an explanatory diagram of an example of the contents stored in a setting table 302 and a GPU temporary allocation table 303.

FIG. 5 is an explanatory diagram of an example of the contents stored in the setting table 302 and the GPU temporary allocation table 303. The setting table 302 includes five fields, a "number of temporarily allocated GPUs" field, an "address to the GPU temporary allocation table 303" field, a "GPU utilization rate" field, a "command flow threshold value" field, and a "VRAM updated amount threshold value" field. The "number of temporarily allocated GPUs" field stores therein the number of graphic cards 110 to be temporarily allocated excluding the graphic cards 110 that are to be "finally allocated". The "address to the GPU temporary allocation table 303" field stores therein an address to the GPU temporary allocation table 303.

The "GPU utilization rate" field stores therein a threshold value to judge the most suitable graphic card 110 for a user. The "GPU utilization rate" field further includes sub fields that include a "lower limit value" sub field and an "upper limit value" sub field. The "lower limit value" sub field stores therein a lower limit value of the threshold value, and the "upper limit value" sub field stores therein an upper limit value of the threshold value.

The "command flow threshold value" field stores therein a threshold value to judge whether the switching of the graphic card 110 is executable. The "command flow threshold value" field further includes sub fields that include a "command flow" sub field and an "idle period" sub field. The "command flow" sub field stores therein a setting value to judge that the switching of the graphic card 110 is executable when the number of commands flowing in a monitoring period is less than or equal to the threshold value. The "command flow" sub field further includes sub fields that include a "number of commands" sub field and a "monitoring period" sub field. The "number of commands" sub field stores therein a threshold value for a monitoring period and the "monitoring period" sub field stores therein the monitoring period. The "idle period" sub field stores therein a setting value to judge that the switching is executable when the command flow is zero during an idle period.

The "VRAM updated amount threshold value" field stores therein a threshold value to judge that the switching of the graphic card 110 is executable. The "VRAM updated amount threshold value" field further includes sub fields that include a "same GPU" sub field and a "switching destination" sub field. The "same GPU" sub field stores therein a threshold value to judge whether comparison is executable with the VRAM 112 of the graphic card 110 that is the switching destination when the updated amount of the VRAM 112 is less than or equal to the threshold value since the last monitoring in the graphic card 110 to be "finally allocated". The "switching destination" sub field is a setting to judge that a timing is established at which the switching of the graphic card 110 is executable when the difference is less than or equal to the threshold value between the VRAM 112 of the switching source and that of the switching destination, and stores therein the threshold value to judge the switching of the graphic card 110 to be executable.

For example, in the setting table 302 depicted in FIG. 5, the number of graphic cards 110 temporarily allocated is indicated to be two in the "number of temporarily allocated GPUs" field. The setting table 302 indicates that the GPU temporary allocation table 303 is stored at "0x10000000" and also indicates that, when the GPU utilization rate of the target graphic card 110 is between 80 and 90[%] in a GPU utilization rate field, the management OS 122 identifies the target graphic card 110 to be the most suitable graphic card 110.

The setting table 302 also indicates based on the command flow sub field, that the management OS 122 judges that the switching of the graphic card 110 is executable when the number of commands is five or smaller within a monitoring period of three [second] and also indicates based on the idle period sub field, that the management OS 122 judges that the switching of the graphic card 110 is executable when the command flow is zero in 5,000 [millisecond].

The setting table 302 also indicates based on from the same GPU sub field, that after judging that the switching of the graphic card 110 is executable, the management OS 122 judges that comparison with the VRAM 112 of the switching destination is executable when the updated amount of the VRAM 112 of the switching source is less than or equal to 500 [pixel] and also indicates that the management OS 122 judges that a timing is established at which the switching of the graphic card 110 is executable when the difference is less than or equal to 100 [pixel] between the VRAM 112 of the switching source and that of the switching destination.

The GPU temporary allocation table 303 includes four fields that include a "pattern number" field, a "finally allocated GPU" field, a "temporarily allocated GPU 1" field, and a "temporarily allocated GPU 2" field. The "pattern number" field stores therein a number that uniquely identifies the finally allocated GPU. The "finally allocated GPU" field stores therein identification information of the graphic card 110 designated by the VM. The "temporarily allocated GPU 1" and the "temporarily allocated GPU 2" fields respectively store therein temporarily allocated GPUs 1 and 2 that correspond to the finally allocated GPU.

For example, in FIG. 5, when the finally allocated GPU is the GPU-1, the management OS 122 designates a pattern number 1 and selects the GPU-3 and the GPU-4 as the temporarily allocated GPUs. Similarly, when the finally allocated GPU is the GPU-2, the management OS 122 designates a pattern number 2 and selects the GPU-4 and the GPU-9 as the temporarily allocated GPUs. The same selection method is executed for each of pattern numbers 3 to n that are registered in FIG. 5. In the GPU management table 301 depicted in FIG. 4, the GPU-4 is the finally allocated GPU and therefore, the pattern number 4 is designated and the GPU-1 and the GPU-7 are selected as the temporarily allocated GPUs.

When no graphic card 110 is designated from the VM, the management OS 122 searches the GPU management table 301 for a graphic card 110 whose GPU allocation state is the unallocated state, and designates the graphic card 110 as the finally allocated GPU. Thereafter, the management OS 122 selects a temporarily allocated GPU in a manner similar to the method for the VM to designate the graphic card 110.

The graphic card 110 in the "temporarily allocated GPU 1" field may be a graphic card 110 whose processing performance is lower than that of the graphic card 110 stored in the finally allocated GPU. The graphic card 110 in the "temporarily allocated GPU 2" field may be a graphic card 110 whose processing performance is higher than that of the graphic card 110 stored in the finally allocated GPU. In a case where the graphic card allocating operation is executed based on these conditions, when the processing performance is high or low of the graphic card that is finally-allocated first, the graphic card can be switched to a more suitable graphic card.

Figure 6:
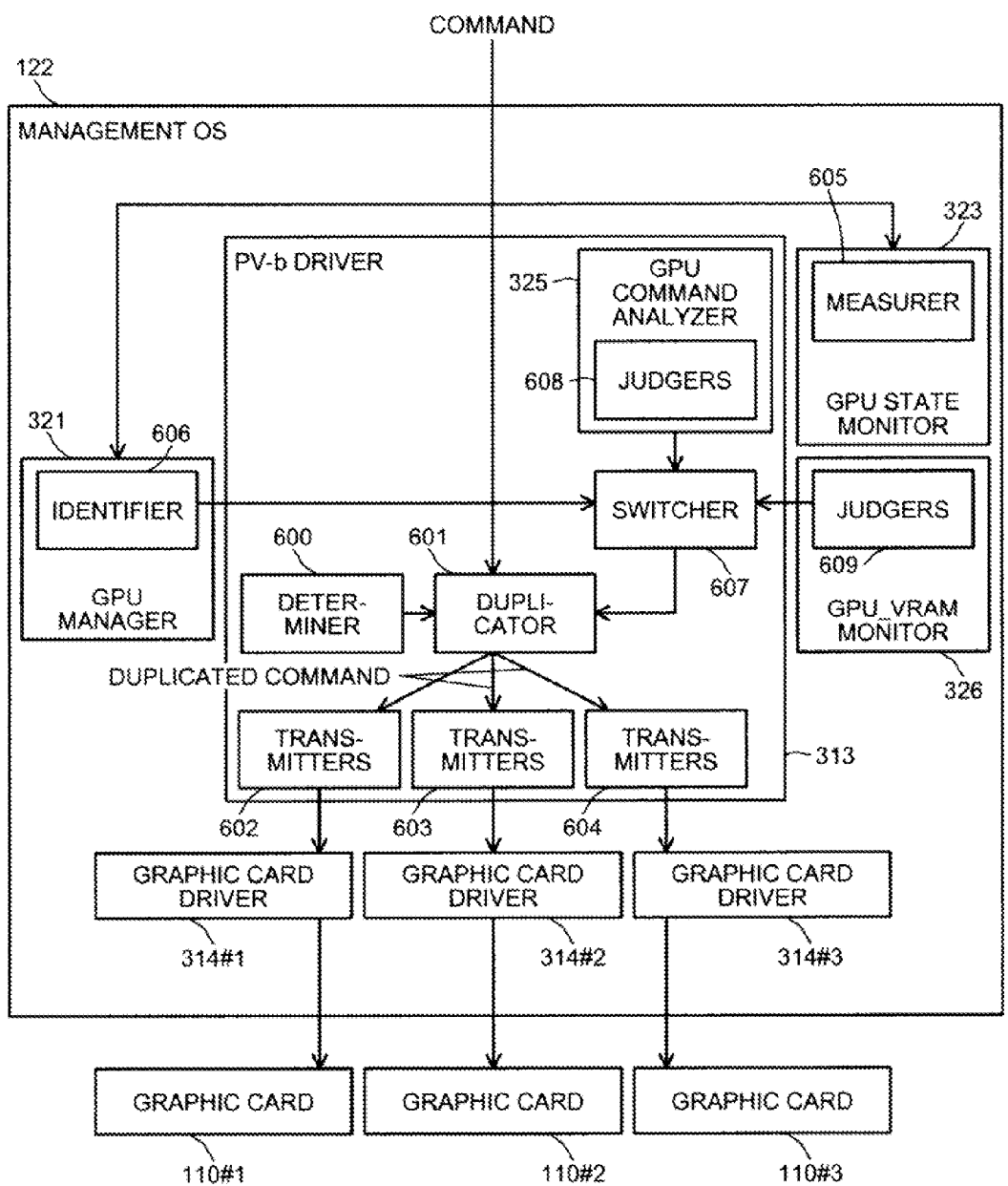
FIG. 6 is a block diagram of an example of functions of a management OS 122.

FIG. 6 is a block diagram of an example of functions of the management OS 122. The management OS 122 includes a determiner 600, a duplicator 601, transmitters 602, 603, and 604, a measurer 605, an identifier 606, a switcher 607, and judgers 608 and 609. The functions constituting a control unit (the determiner 600 to the judger 609) are implemented by an execution of programs by the CPUs 201. The programs are stored in a storage device. For example, the "storage device" is the ROM 202, the RAM 203, the HDD 204, etc., depicted in FIG. 2.

The determiner 600 to the transmitter 604 and the switcher 607 are included in the PV-b driver 313. The measurer 605 is included in the GPU state monitor 323 and the identifier 606 is included in the GPU manager 321. The judger 608 is included in the GPU command analyzer 325. The judger 609 is included in the GPU_VRAM monitor 326.

The determiner 600 has a function of determining based on any one apparatus, apparatuses that are candidates for the most suitable apparatus, among a group of apparatuses not executing any operations. For example, the determiner 600 determines the GPU-2 and the GPU-3 to be candidates for the most suitable apparatus based on the GPU-1, which is in the final allocation state. The GPU-2 and the GPU-3 that have been determined to be candidates for the most suitable apparatus are put in the temporary allocation state. Information related to the determination is stored in the GPU management table 301.

The duplicator 601 has a function of duplicating a command notified from the PV-f driver 311. The "command" is a GPU command for the graphic card 110. For example, the duplicator 601 duplicates a GPU command to start drawing, a GPU command to draw a triangle, etc. The GPU command duplicated is stored to the cache memory, the RAM 203, etc. of the allocating apparatus 101.

The transmitter 602 has a function of transmitting a command for an operation to any one apparatus, among multiple apparatuses that are capable of executing the same operation and respectively have a different processing performance. The "multiple apparatuses" refers to the GPU-1 to the GPU-n. For example, the transmitter 602 transmits a GPU command to the GPU-1, which is in the final allocation state. For example, the transmitter 602 transmits the GPU command to the graphic card driver 314#1 that corresponds to the GPU-1.

The transmitters 603 and 604 each have a function of transmitting a command duplicated by the duplicator 601 to the apparatuses that are candidates for the most suitable apparatus determined by the determiner 600. For example, among the GPU-1 to the GPU-n, the transmitter 603 transmits a duplicated GPU command to the GPU-2, which has been determined by the determiner 600 to be a graphic card 110 in the temporary allocation state. The transmitter 604 also transmits the duplicated GPU command to the GPU-3.

A group of the graphic cards 110 in the temporary allocation state may include the graphic cards 110 whose processing performance is lower or higher than that of the graphic cards 110 in the final allocation state. For example, a case is assumed where the processing performance of the GPU-1 is 200 [GFLOPS], that of the GPU-2 is 300 [GFLOPS], that of the GPU-3 is 400 [GFLOPS], and that of the GPU-4 is 500 [GFLOPS]. In this case, when the GPU-2 is designated the apparatus to receive transmission of the command from the transmitter 602, the transmitters 603 and 604 transmit duplicated commands to the GPU-1 whose processing performance is lower than that of the GPU-2 and to the GPU-3 or the GPU-4 whose processing performance is higher than that of the GPU-2.

The processing performance of each graphic card 110 among the group of graphic cards 110 in the final allocation state or the temporary allocation state may differ from each other at equal intervals. The graphic card 110 having the median processing performance among the group of the graphic cards 110 in the final allocation state or the temporary allocation state, may be a graphic card 110 in the final allocation state.

The measurer 605 has a function of measuring for each apparatus, the utilization rate acquired when a command is executed. For example, the measurer 605 measures for each of the GPU-1 to the GPU-3, the utilization rate acquired when the GPU command is executed. A specific method of measuring the utilization rate can be, for example, a measuring method that uses the API of the graphic card 110 or, without any API supplied, a measuring method that uses the temperature of the graphic card 110. The method will be described later in detail with reference to FIG. 8. The measured utilization rate is stored to the cache memory, the RAM 203, etc. of the allocating apparatus 101.

The identifier 606 has a function of identifying among the group of the apparatuses and based on the utilization rate for any one apparatus, an apparatus to be switched. For example, the identifier 606 may identify an apparatus whose utilization rate is less than 100% and is higher than that of any one apparatus as the apparatus to be switched. For example, a case is assumed where the GPU utilization rate of the GPU-1 is 40[%], that of the GPU-2 is 100[%], and that of the GPU-3 is 85[%]. In this case, the identifier 606 identifies the GPU-3 as the apparatus to be switched.

The identifier 606 may identify among the utilization rates of each apparatus and as the apparatus to be switched, an apparatus whose utilization rate is between a predetermined upper limit value and a predetermined lower limit value. The "predetermined upper limit value" is a value in an upper limit value field of the setting table 302 and the "predetermined lower limit value" is a value in a lower limit value field of the setting table 302. For example, a case is assumed where the predetermined upper limit value is 90[%], the predetermined lower limit value is 80[%], the GPU utilization rate of the GPU-1 is 40[%], that of the GPU-2 is 87[%], and that of the GPU-3 is 85[%]. In this case, the identifier 606 identifies either one of the GPU-2 and the GPU-3 as the apparatus to be switched.

The identifier 606 may identify among the utilization rates of each apparatus and as the apparatus to be switched, an apparatus whose utilization rate is less than a predetermined upper limit value and is highest. For example, a case is assumed where the predetermined upper limit value is 90[%], the GPU utilization rate of the GPU-1 is 40[%], that of the GPU-2 is 87[%], and that of the GPU-3 is 85[%]. In this case, the identifier 606 identifies the GPU-2 as the apparatus to be switched.

The identifier 606 may identify among the utilization rates of each apparatus and as the apparatus to be switched, an apparatus whose utilization rate is less than a predetermined upper limit value and whose performance is worst. For example, a case is assumed where the predetermined upper limit value is 90[%], the GPU utilization rate of the GPU-1 is 40[%], that of the GPU-2 is 87[%], and that of the GPU-3 is 85[%]. In this case, the identifier 606 identifies the GPU-2 as the apparatus to be switched. It is further assumed that the processing performance of the GPU-1 is 400 [GFLOPS], that of the GPU-2 is 300 [GFLOPS], and that of the GPU-3 is 200 [GFLOPS]. In this case, the identifier 606 identifies the GPU-3 as the apparatus to be switched. Identification information concerning the identified apparatus to be switched is stored to the cache memory, the RAM 203, etc. of the allocating apparatus 101.

The switcher 607 has a function of switching the transmission destination of a command from any one apparatus to the apparatus to be switched. For example, the switcher 607 switches the GPU command that is the original GPU command prior to duplication, from the graphic card 110#1 to the graphic card 110#3. The switcher 607 may execute a switch when the judger 608 judges that the number of transmissions of commands per unit time is less than or equal to a predetermined number. The switcher 607 may execute a switch when the judger 609 judges that the updated amount according to a command is less than or equal to a predetermined amount. The switcher 607 may execute a switch when the judger 609 judges that the difference is less than or equal to a predetermined threshold value.

The judger 608 has a function of judging whether the number of transmissions of commands per unit time is at most the predetermined number. The predetermined number per unit time can be acquired by calculating (the number of commands in the setting table 302/the monitoring period in the setting table 302). The judgment result is stored to the cache memory, the RAM 203, etc. of the allocating apparatus 101.

The judger 609 has a function of judging whether an updated amount according to a command in an image storage area in any one apparatus is at most the predetermined amount. The "image storage area" is the VRAM 112. The "predetermined amount" is the value in the same GPU sub field in the setting table 302. For example, the judger 609 judges whether the updated amount of the VRAM 112 in any one apparatus is less than or equal to 500 [pixel].

The judger 609 may judge whether the difference between the image storage area in any one apparatus and that in the apparatus to be switched is at most a predetermined threshold value. The "predetermined threshold value" is the value of the switching destination field in the setting table 302. For example, a case is assumed where the "one apparatus" is the GPU-1 and the apparatus to be switched is the GPU-3. In this case, the judger 609 judges whether the difference between the VRAMs 112 of GPU-1 and the GPU-3 is less than or equal to 100 [pixel]. The judgment result is stored to the cache memory, the RAM 203, etc. of the allocating apparatus 101.

As described, the allocating apparatus 101 accesses the GPU management table 301 to the GPU temporary allocation table 303 and allocates the most suitable graphic card 110.

Figure 7A:
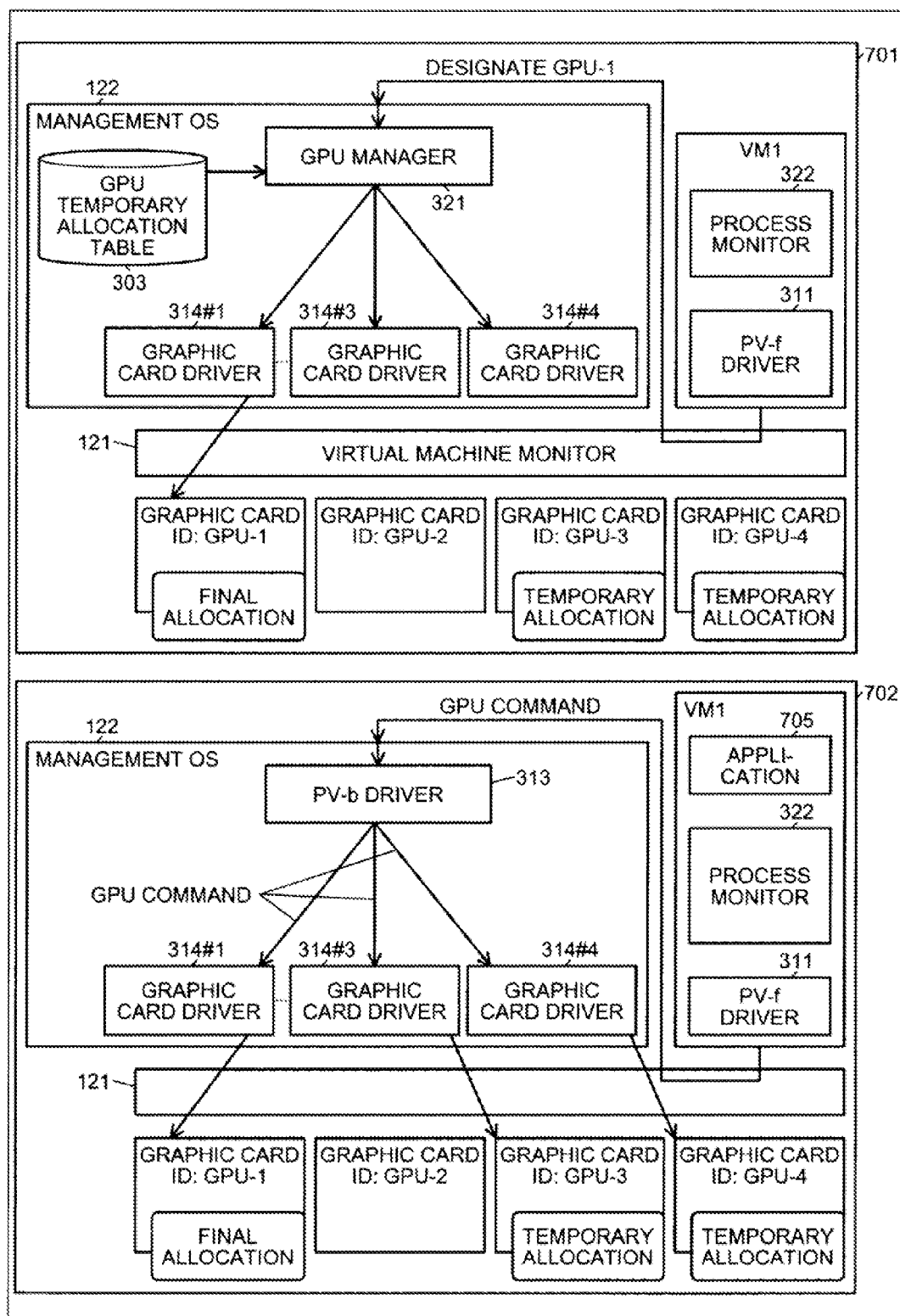
FIG. 7A is an explanatory diagram of an example of an allocating method of a graphic card 110.
Figure 7B:
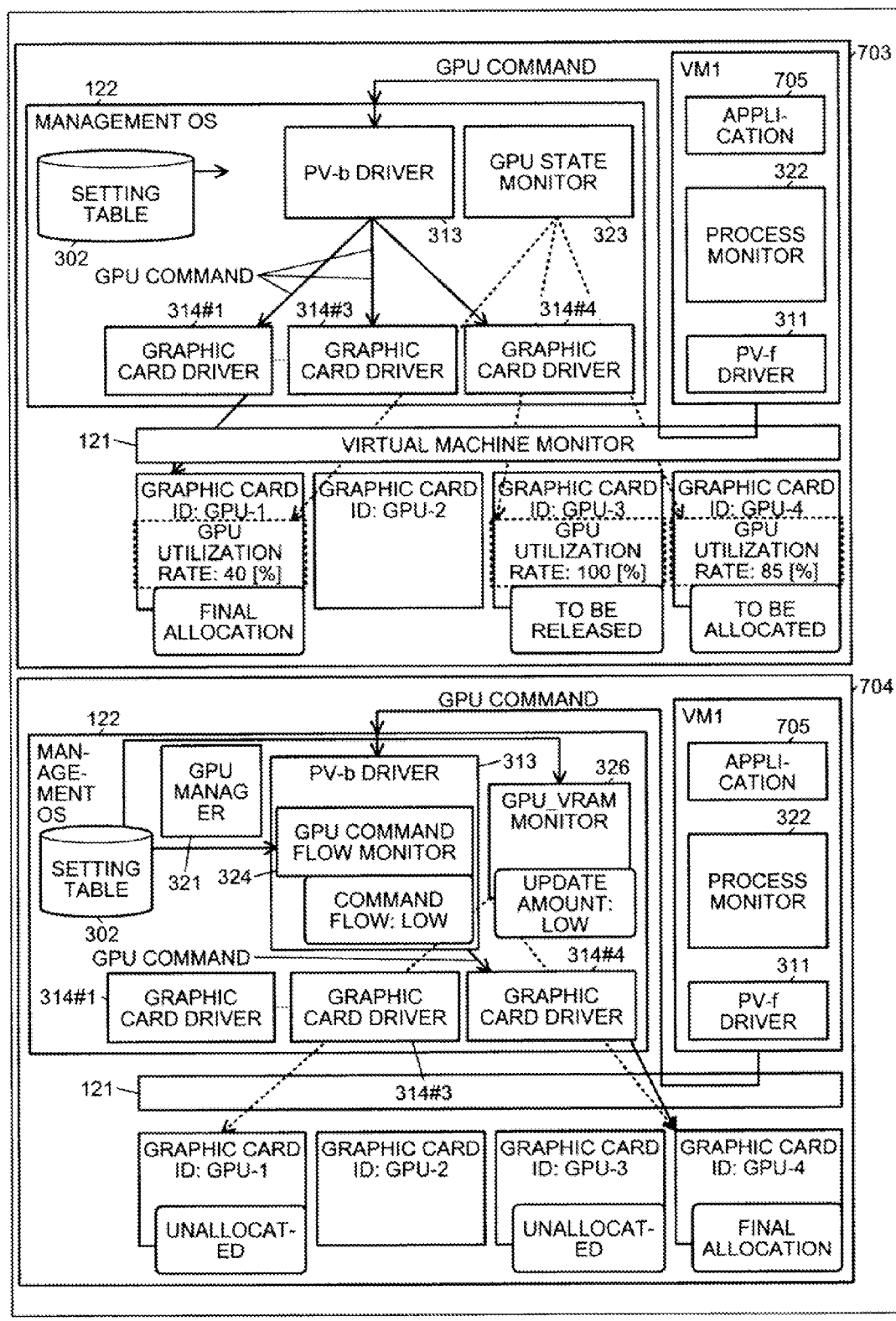
FIG. 7B is an explanatory diagram of an example of an allocating method of the graphic card 110.

FIGS. 7A and 7B are explanatory diagrams of an example of an allocating method of the graphic card 110. With reference to FIGS. 7A and 7B, a method will be described of allocating the most suitable graphic card 110 among the graphic cards 110, using explanatory diagrams denoted by reference numerals "701" to "704". The explanatory diagram denoted by the reference numeral "701" explains a method of selecting the graphic cards 110 that are allocation candidates. The explanatory diagram denoted by the reference numeral "702" explains a state where access of the graphic card 110 by the application is duplicated on the graphic card 110 that is an allocation candidate.

The explanatory diagram denoted by the reference numeral "703" explains a method of identifying the graphic card 110 to be allocated, based on the utilization rate of the graphic card 110 that is altered by the duplication of the access. The explanatory diagram denoted by the reference numeral "704" explains the timing of switching from the graphic card 110 that is the allocation source to the graphic card 110 to be allocated.

The allocating apparatus 101 denoted by the reference numeral "701" selects a graphic card 110 that is an allocation candidate, from among graphic cards 110. For example, when an ID:GPU-1 is designated in the allocating apparatus 101 and the VM 1 is started up, the GPU manager 321 refers to the GPU temporary allocation table 303 and sets the GPU allocation state of the GPU-1 to be the final allocation state and that of the GPU-3 and the GPU-4 to be the temporary allocation state. The method of referring to the GPU temporary allocation table 303 is the method that is described with reference to FIG. 6. When the management OS 122 receives the GPU command, the management OS 122 notifies the GPU-1, which is in the final allocation state, of the GPU command.

The allocating apparatus 101 denoted by the reference numeral "702" is in the state where the allocating apparatus 101 duplicates the GPU command on the graphic cards 110 that are allocation candidates. For example, when an application 705 that accesses the graphic card 110 is started up by the VM 1, the PV-f driver 311 notifies the PV-b driver 313 of the GPU command. The PV-b driver 313 duplicates the GPU command and outputs the duplicated GPU command to the GPU-1 whose GPU allocation state is the final allocation state and the GPU-3 and the GPU-4 whose GPU allocation state is the temporary allocation state, respectively.

The allocating apparatus 101 denoted by the reference numeral "703" measures the utilization rate of the graphic card 110 that is an allocation candidate acquired when the GPU command duplicated is executed. For example, the GPU state monitor 323 measures the GPU utilization rate of the GPU-1 as 40[%], that of the GPU-3 as 100[%], and that of the GPU-4 as 85[%]. The method of measuring the GPU utilization rate will be described later with reference to FIG. 8.

Based on the utilization rates measured for the graphic cards 110 that are allocation candidates, the GPU manager 321 refers to the setting table 302 and selects the most suitable graphic card 110. In the example denoted by the reference numeral "703", the GPU manager 321 identifies as the most suitable graphic card 110, the GPU-4 whose utilization rate in the GPU utilization rate field in the setting table 302 depicted in FIG. 5, is between the lower limit value of 80[%] and the upper limit value of 90[%].

In addition to the method of identifying the most suitable graphic card 110 based on the threshold value, a method of monitoring the queue in the PV-b driver 313 is present as the method of identifying the most suitable graphic card 110. The method of identifying the most suitable graphic card 110 by monitoring the queue in the PV-b driver 313 will be described later with reference to FIGS. 9A and 9B. As the result of the identification, the GPU manager 321 sets the GPU allocation state of the GPU-4 to be the "to be allocated" state and sets that of the GPU-3 to be the "to be released" state.

Finally, the allocating apparatus 101 denoted by the reference numeral "704" depicts a switching timing from the GPU-1 that is the allocation source to the GPU-4 that is the allocation destination. For example, the GPU command flow monitor 324 monitors the command flow and, when the command flow becomes lower than a threshold value set in the setting table 302, judges that the comparison of VRAMs 112 is executable. An example of the state of a given GPU command flow causing the switching of the graphic card to be executable will be described later with reference to FIGS. 10A and 10B.

When the updated amount of the VRAM 112 becomes lower than the threshold value set in the setting table 302, the GPU_VRAM monitor 326 copies the data of the VRAM 112 of the GPU-1 into the VRAM 112 of the GPU-4. An example of the specific state of the VRAM 112 causing the switching of the graphic card to be executable will be described later with reference to FIG. 11. After this copying, the GPU manager 321 sets the GPU allocation state of the GPU-4 to be the final allocation state and sets those of the GPU-1 and the GPU-3 to be the unallocated state.

FIG. 8 is an explanatory diagram of an example of a method of measuring the GPU utilization rate. When an API capable of acquiring the GPU utilization rate is prepared in the graphic card driver, the GPU state monitor 323 uses the API. The allocating apparatus 101 according to the first embodiment measures the GPU utilization rate from the critical temperature of the GPU 111 and the current temperature of the GPU 111 as another example of the method of measuring the GPU utilization rate. In this case, the allocating apparatus 101 preliminarily stores in the ROM 202, etc., a table to store therein the critical temperature of the GPU 111 of the graphic card 110.

A GPU critical temperature table 801 depicted in FIG. 8 includes two fields that include a "graphic card ID" field and a "critical temperature" field. The graphic card ID field stores therein the identification information of the graphic card 110. The critical temperature field stores therein the critical temperature of the GPU 111 of the graphic card 110 stored in the graphic card ID field. The GPU critical temperature table 801 may be included in the setting table 302.

In FIG. 8, for example, the critical temperature of the GPU-1 is shown to be 85[° C.]. Similarly, the GPU critical temperature table 801 stores therein the critical temperatures of the GPU-2 to the GPU-n.

A method will be described of calculating the GPU utilization rate by using a calculation equation denoted by a reference numeral "802" and referring to the calculated current temperature of the graphic card 110 and the GPU critical temperature table 801. The GPU state monitor 323 calculates the GPU utilization rate using equation (1) below.

$$\text{GPU utilization rate} = \text{current GPU temperature}/\text{critical temperature} \times 100 \quad (1)$$

For example, when the current temperature of the GPU-1 is 80[° C.], the GPU state monitor 323 calculates the GPU utilization rate of the GPU-1 as below based on equation (1).

$$\text{GPU utilization rate} = 80/85 \times 100 \approx 94[\%]$$

The GPU state monitor 323 may perform calculation using equation (1), based on the room temperature as a reference temperature. For example, the GPU state monitor 323 may calculate the GPU utilization rate in a manner expressed in equation (2) below.

$$\text{GPU utilization rate} = (\text{the current GPU temperature} - \text{the room temperature})/(\text{the critical temperature} - \text{the room temperature}) \times 100 \quad (2)$$

Using equation (2), the utilization rate can be calculated for temperature increases consequent to a load.

FIGS. 9A and 9B are explanatory diagrams of another example of the method of identifying the most suitable graphic card 110. With reference to FIGS. 9A and 9B, a method will be described of identifying the most suitable graphic card 110 by monitoring the queue in the PV-b driver 313.

FIG. 9A depicts a method of identifying the most suitable graphic card 110 based on the queue that remains in the PV-b driver 313 and the GPU utilization rate. A table 903 indicates the queue and the GPU utilization rates of the graphic card 110 whose GPU allocation state is the final allocation state and the three graphic cards 110 whose GPU allocation states are the temporary allocation state. The GPU manager 321 identifies the GPU 3 temporarily allocated whose queue remaining amount is zero and whose GPU utilization rate is highest that is 93[%], as the most suitable graphic card 110.

FIG. 9B depicts a method of identifying the most suitable graphic card 110 based on the queue that remains in the PV-b driver 313 and the GPU performance information. A table 904 indicates the queue and the GPU performance information of the graphic card 110 whose GPU allocation state is the final allocation state and the four graphic cards 110 whose GPU allocation states are the temporary allocation state. The GPU manager 321 identifies the GPU 1 temporarily allocated whose queue remaining amount is zero and whose GPU performance information is lowest that is 300 [MFLOPS], as the most suitable graphic card 110.

Figure 10A:
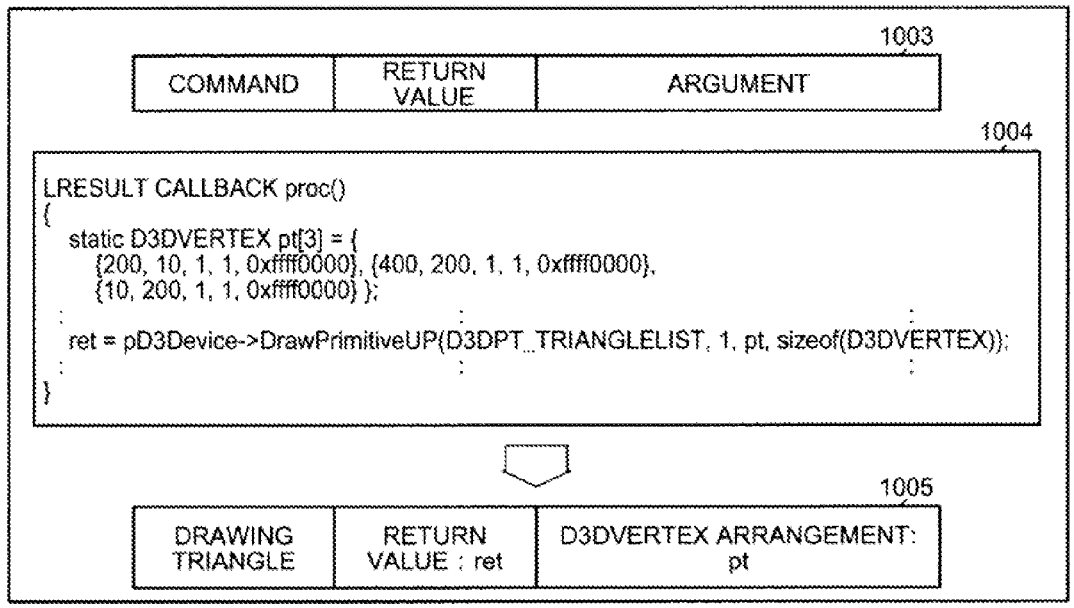
FIG. 10A depicts an example of the GPU command.
Figure 10B:
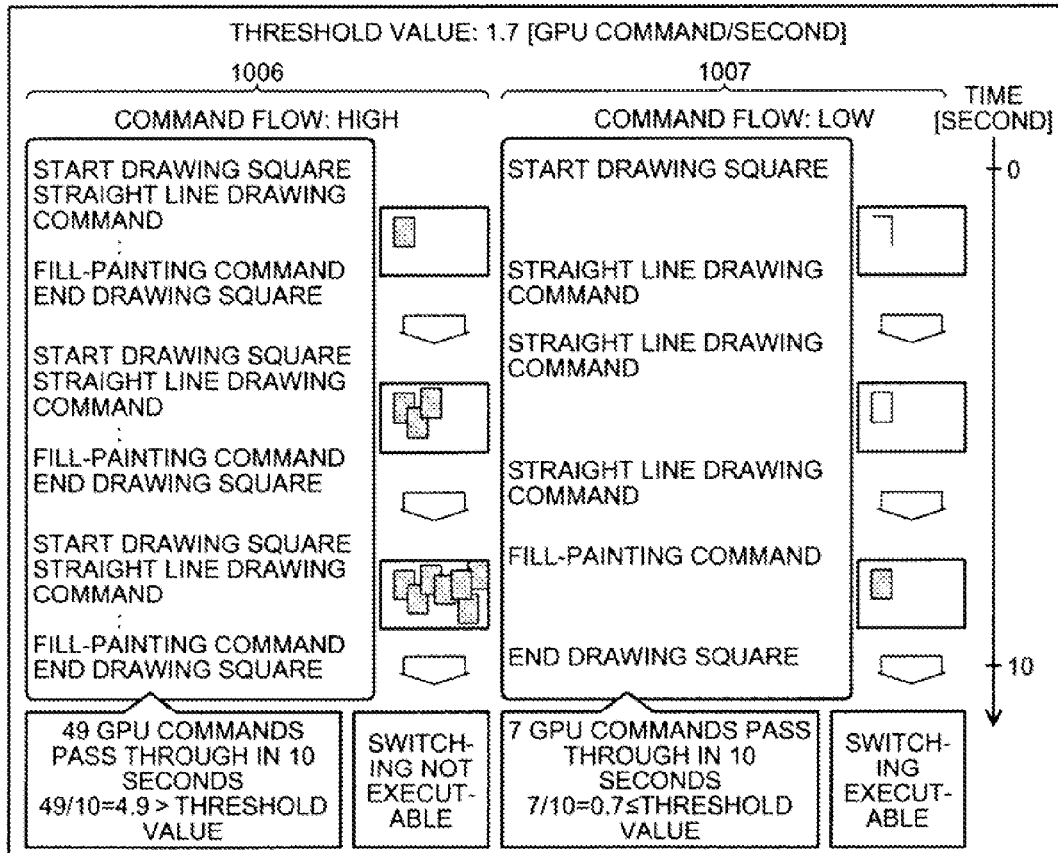
FIG. 10B depicts an example of the state of a GPU command flow that causes the switching of the graphic card to be executable.

FIGS. 10A and 10B are explanatory diagrams of an example of the state of the GPU command flow that causes the switching of the graphic card to be executable. FIG. 10A depicts an example of the GPU command and FIG. 10B depicts an example of the state of the GPU command flow that causes the switching of the graphic card to be executable. Access consequent to the process on the virtual machine is converted into a GPU command by the PV-f driver 311, thereby generating a GPU command. The PV-f driver 311 notifies the PV-b driver 313 of the generated GPU command.

FIG. 10A depicts a format 1003 of the GPU command, an example the GPU command issued using source code 1004, and examples of values in the format 1003 when the GPU command is issued.

The GPU command is formatted according to the format 1003. The format 1003 includes a command field, a return value field, and an argument field. For example, the source code 1004 represents source code to draw a triangle. When the source code 1004 is compiled and is executed in a process on the virtual machine, the GPU command takes a value such as that denoted by a reference numeral "1005".

For example, the command field stores therein an identifier that indicates drawing of a triangle. The identifier indicating drawing of a triangle may be "D3DPT_TRIANGLELIST" as depicted in the source code 1004. The return value field stores therein the value of a variable "ret". The argument field stores therein "pt" that is a pointer of a D3DVERTEX-type arrangement.

FIG. 10B depicts an example of a method of judging the GPU command flow. For example, it is assumed that the GPU command flow monitor 324 judges that the switching is executable when the number of GPU commands is five or fewer during a monitoring period of three seconds, that is, the number of GPU commands per unit time is 5/3≈1.7 as the predetermined threshold value. The GPU command flow monitor 324 acquires the monitoring period and the number of GPU commands from the command flow field of the setting table 302. FIG. 10B depicts a state 1006 where the GPU command flow is high and a state 1007 where the GPU command flow is low.

The state 1006 is a state where 49 GPU commands pass through the PV-b driver 313 in 10 seconds. The number of GPU commands per unit time in the state 1006 is 49/10=4.9>1.7 and is larger than the predetermined threshold value. Therefore, the switching is not executable in this state. The state 1007 is a state where 7 GPU commands pass through the PV-b driver 313 in 10 seconds. The number of GPU commands per unit time in the state 1007 is 7/10=0.7≤1.7 and is smaller than the predetermined threshold value. Therefore, the switching is executable in this state.

Figure 11:
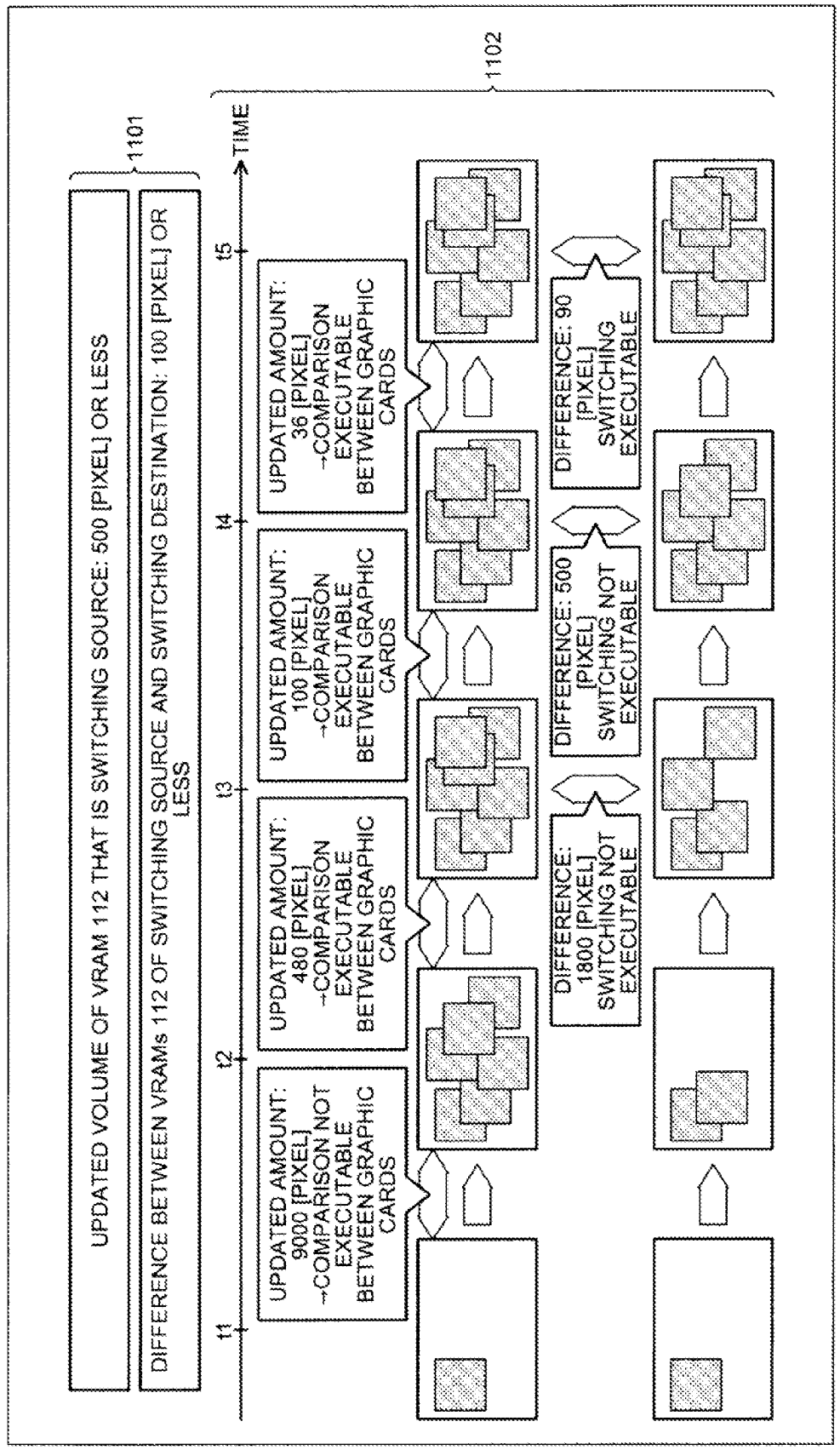
FIG. 11 is an explanatory diagram of an example of the state of a VRAM 112 that causes the switching of the graphic card to be executable.

FIG. 11 is an explanatory diagram of an example of the state of the VRAM 112 that causes the switching of the graphic card to be executable. The content of a screen displayed on the display 113 is written in the VRAM 112 on the graphic card 110 that is the switching destination. In a case where the graphic card 110 is switched, when the displayed data is moving image data, a scene is likely to be lost or a previous scene is likely to again be displayed. To avoid such a state, the GPU_VRAM monitor 326 judges that the switching of the graphic card is executable when conditions 1 and 2 denoted by a reference numeral "1101" are simultaneously satisfied.

Condition 1 is a case where the updated amount of the VRAM 112 is less than or equal to 500 [pixel] in the graphic card 110 that is the switching source. When condition 1 is satisfied, the GPU_VRAM monitor 326 is able to determine a state in which the screen is not frequently updated. The GPU_VRAM monitor 326 acquires the threshold value of 500 [pixel] of condition 1 from the same GPU sub field of the setting table 302.

Condition 2 is a case where the difference is less than or equal to 100 [pixel] between the VRAM 112 of the graphic card 110 that is the switching source and that of the graphic card 110 that is the switching destination. Condition 2 is checked because the processing performance differs for each graphic card and therefore, one graphic card may have already completed drawing an image while another graphic card has not yet completed drawing an image. When the difference is small between the VRAM 112 of the switching source and that of the switching destination and therefore, condition 2 is satisfied, the GPU_VRAM monitor 326 is able to judge that the state is a state where the contents on the screen do not significantly change during the switching. The GPU_VRAM monitor 326 acquires the threshold value of 100 [pixel] of condition 2 from the switching destination field of the setting table 302.

An example of a case where the conditions 1 and 2 are satisfied will be described with reference to an explanatory diagram denoted by a reference numeral "1102". In the explanatory diagram denoted by the reference numeral "1102", the states are displayed of the VRAMs 112 of the graphic card that is the switching source and the graphic card that is the switching destination at time points t1 to t5. In FIG. 11, to simplify the description, description will be given using "_src" indicating the switching source, "_dst" indicating the switching destination, and "_tx" indicating any one time point "tx" among the time points t1 to t5, for the VRAMs 112.

At the time point t2, the GPU_VRAM monitor 326 compares the VRAM 112_src_t2 with the VRAM 112_src_t1 and thereby, judges whether the updated amount is at most 500 [pixel]. The updated amount of the VRAM 112_src at the time point t2 is 9000 [pixel] and therefore, the GPU_VRAM monitor 326 judges that the graphic cards cannot be compared with each other.

At the time point t3, the GPU_VRAM monitor 326 compares the VRAM 112_src_t3 with the VRAM 112_src_t2 and thereby, judges whether the updated amount is at most 500 [pixel]. The updated amount of the VRAM 112_src at the time point t3 is 480 [pixel] and therefore, the GPU_VRAM monitor 326 judges that the graphic cards can be compared with each other. The GPU_VRAM monitor 326 compares the VRAM 112_src_t3 with the VRAM 112_dst_t3 and thereby, judges whether the difference is at most 100 [pixel]. The difference at the time point t3 is 1,800 [pixel] and therefore, the GPU_VRAM monitor 326 judges that the switching of the graphic cards is not executable.

At the time point t4, the GPU_VRAM monitor 326 compares the VRAM 112_src_t4 with the VRAM 112_src_t3 and thereby, judges whether the updated amount is at most 500 [pixel]. The updated amount of the VRAM 112_src at the time point t4 is 100 [pixel] and therefore, the GPU_VRAM monitor 326 judges that the graphic cards can be compared with each other. The GPU_VRAM monitor 326 compares the VRAM 112_src_t4 with the VRAM 112_dst_t4 and thereby, judges whether the difference is at most 100 [pixel]. The difference at the time point t4 is 500 [pixel] and therefore, the GPU_VRAM monitor 326 judges that the switching of the graphic cards is not executable.

At the time point t5, the GPU_VRAM monitor 326 compares the VRAM 112_src_t5 with the VRAM 112_src_t4 and thereby, judges whether the updated amount is at most 500 [pixel]. The updated amount of the VRAM 112_src at the time point t5 is 36 [pixel] and therefore, the GPU_VRAM monitor 326 judges that the graphic cards can be compared with each other. The GPU_VRAM monitor 326 compares the VRAM 112_src_t5 with the VRAM 112_dst_t5 and thereby, judges whether the difference is at most 100 [pixel]. The difference at the time point t5 is 90 [pixel] and therefore, the GPU_VRAM monitor 326 judges that the switching of the graphic cards is executable. The GPU_VRAM monitor 326 judges that the switching between graphic cards at t5 is executable.

A flowchart for executing the operations described with reference to FIG. 7 will be described with reference to FIGS. 12A to 19. For FIGS. 12A to 19, it is assumed that the graphic card designated by the VM 1 has an ID that is ID:GPU-1.

Figure 12B:
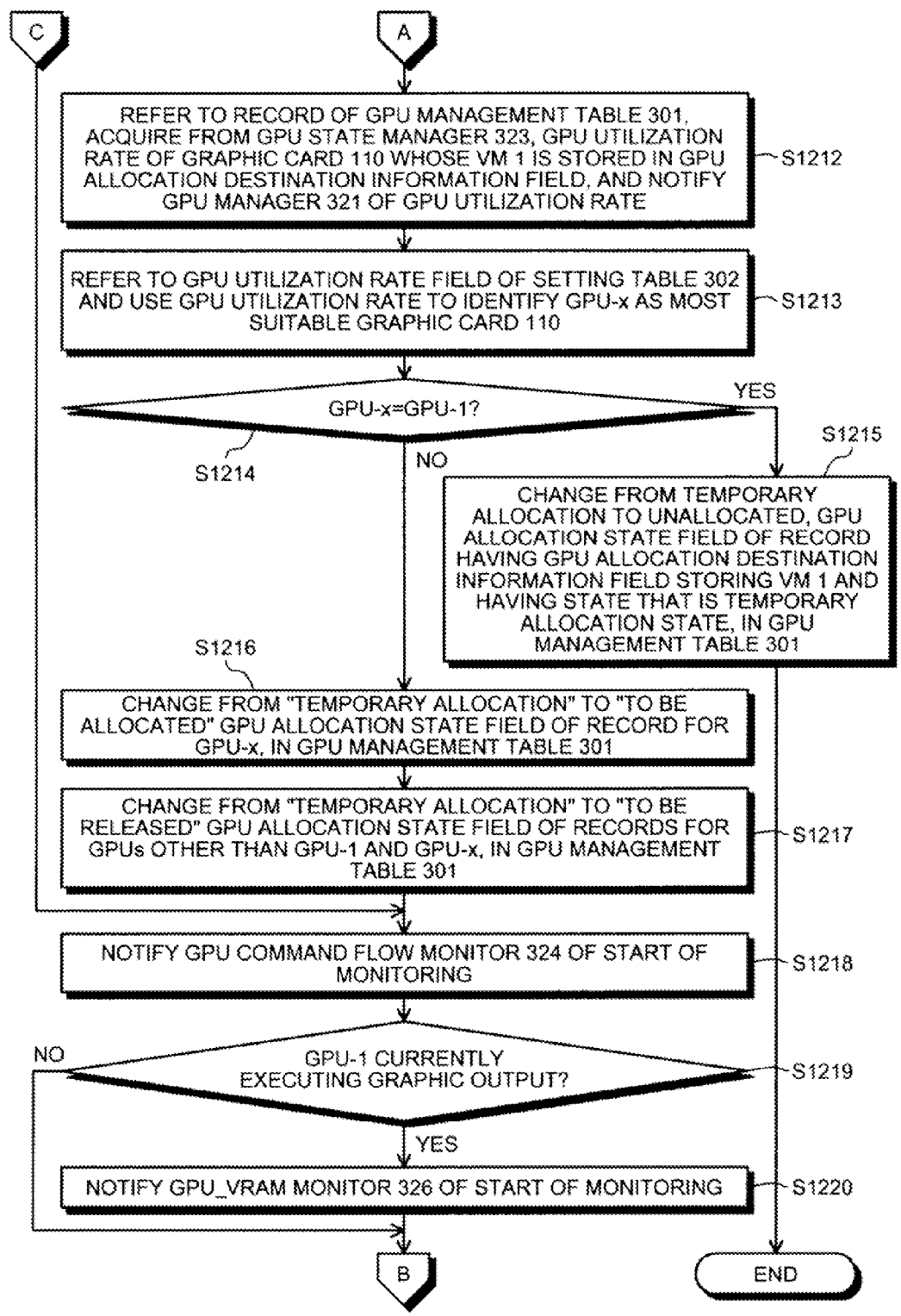
FIG. 12B is a flowchart of an example of a procedure for graphic card allocating operations of the management OS 122.

FIGS. 12A, 12B, and 12C are flowcharts of an example of a procedure for graphic card allocating operations of the management OS 122. As depicted in FIG. 12A, the management OS 122 starts up the GPU manager 321 (step S1201), allocates the GPU-1 designated, and starts up the VM 1 (step S1202). Subsequently, the management OS 122 changes the GPU allocation state field of the record of the GPU-1 in the GPU management table 301 from the "unallocated" to the "final allocation" (step S1203). Next, the management OS 122 selects a record whose final allocation GPU field stores therein the designated GPU-1, in the GPU temporary allocation table 303 (step S1204).

Thereafter, in the GPU management table 301, the management OS 122 changes, from the "unallocated" to the "temporary allocation", the GPU allocation state field of the graphic card 110 that corresponds to the temporarily allocated GPU field of the selected record (step S1205). When multiple temporarily allocated GPU fields are present in the GPU temporary allocation table 303 as depicted in FIG. 5, the GPU allocation state of the GPU that corresponds to each of the temporarily allocated GPU fields is changed from the "unallocated" to the "temporary allocation". For example, the GPU-1 is designated in FIG. 12A and therefore, the management OS 122 changes, from the "unallocated" to the "temporary allocation", each of the allocation states of the GPU-3 stored in the temporary allocation GPU 1 field and that of GPU-4.

Subsequently, the management OS 122 judges whether the VM 1 has started up a process to use the graphic card 110 (step S1206). When the management OS 122 judges that the VM 1 has not yet started up the process (step S1206: NO), the management OS 122 again executes the operation at step S1206 upon the elapse of a predetermined time period. If the management OS 122 judges that the VM 1 has already started up the process (step S1206: YES), the management OS 122 notifies the GPU state monitor 323 of the start of the monitoring (step S1207). Next, the management OS 122 notifies the GPU manager 321 of the start of the monitoring (step S1208) and notifies the PV-b driver 313 of the start of the duplication (step S1209).

Subsequently, the management OS 122 judges whether a given time period has elapsed (step S1210). If the management OS 122 judges that the given time period has not yet elapsed (step S1210: NO), the management OS 122 again executes the process at step S1210. When the management OS 122 judges that the given time period has elapsed (step S1210: YES), the management OS 122 notifies the GPU state monitor 323 of the suspension of the monitoring (step S1211). Thereafter, the management OS 122 proceeds to step S1212.

As depicted in FIG. 12B, the management OS 122 refers to the records of the GPU management table 301, acquires from the GPU state monitor 323, the GPU utilization rate of the graphic card 110 whose GPU allocation destination information field stores therein the VM 1, and notifies the GPU manager 321 of the GPU utilization rate (step S1212). The management OS 122 refers to the GPU utilization rate field of the setting table 302 based on the utilization rate, and identifies a GPU-x to be the most suitable graphic card 110 (step S1213). The specific method of identifying the graphic card 110 is the method described with reference to FIGS. 7A, 7B, and 9.

Next, the management OS 122 judges whether the GPU-x is the GPU-1 (step S1214). If the management OS 122 judges that the GPU-x is the GPU-1 (step S1214: YES), the management OS 122 changes, from the "temporary allocation" to the "unallocated", the GPU allocation state field of the record whose GPU allocation destination information field stores therein the VM 1 and whose state is the temporary allocation state, in the GPU management table 301 (step S1215).

If the management OS 122 judges that GPU-x is not the GPU-1 (step S1214: NO), the management OS 122 changes, from the "temporary allocation" to the "to be allocated", the GPU allocation state field of the record for the GPU-x in the GPU management table 301 (step S1216). The graphic card 110 that is the switching source is the GPU-1 and the graphic card 110 that is the switching destination is the GPU-x. The management OS 122 changes, from the "temporary allocation" to the "to be released", the GPU allocation state field of records for GPUs other than the GPU-1 and the GPU-x, in the GPU management table 301 (step S1217). After this changing, when a route including "step S1225: NO" or "step S1226: NO" is taken, the management OS 122 notifies the GPU command flow monitor 324 of the start of the monitoring (step S1218).

Next, the management OS 122 judges whether the GPU-1 is currently executing graphic output (step S1219). If the management OS 122 judges that the GPU-1 is currently executing graphic output (step S1219: YES), the management OS 122 notifies the GPU_VRAM monitor 326 of the start of the monitoring (step S1220). After this notifying or when the management OS 122 judges that the GPU-1 has not executed the graphic output (step S1219: NO), the management OS 122 proceeds to step S1221. A case where the graphic output has not been executed can be, for example, a case where the process on the VM uses the GPU 111 as the GPGPU.

As depicted in FIG. 12C, the management OS 122 waits for the time period indicated in the monitor time period field of the setting table 302, to elapse (step S1221). After this time period elapses, the management OS 122 judges whether the command flow is less than or equal to the value of the "number of commands" sub field in the setting table 302 (step S1222). If the management OS 122 judges that the command flow is larger than the value of the "number of commands" sub field (step S1222: NO), the management OS 122 proceeds to step S1221. If the management OS 122 judges that the command flow is less than or equal to the value of the "number of commands" sub field (step S1222: YES), the management OS 122 notifies the GPU command flow monitor 324 of the suspension of the monitoring (step S1223).

Next, the management OS 122 judges whether the GPU-1 is currently executing graphic output (step S1224). If the management OS 122 judges that the GPU-1 is currently executing the graphic output (step S1224: YES), the management OS 122 judges whether the VRAM updated amount of the GPU-1 is at most a value in the "same GPU" sub field, in the setting table 302 (step S1225). If the management OS 122 judges that the VRAM updated amount is larger than the value in the "same GPU" sub field (step S1225: NO), the management OS 122 proceeds to step S1218.

If the management OS 122 judges that the VRAM updated amount is less than or equal to the value in the "same GPU" sub field (step S1225: YES), the management OS 122 judges whether the difference between the VRAMs 112 of the GPU-1 and the GPU-x is at most a value in the "switching destination" field in the setting table 302 (step S1226). If the management OS 122 judges that the difference is larger than the value in the "switching destination" field (step S1226: NO), the management OS 122 proceeds to step S1218.

If the management OS 122 judges that the difference is less than or equal to the value in the "switching destination" field (step S1226: YES), the management OS 122 notifies the GPU_VRAM monitor 326 of the suspension of the monitoring (step S1227). Thereafter, the management OS 122 judges whether the difference between the VRAMs of the GPU-1 and GPU-x is zero (step S1228). If the management OS 122 judges that the difference is not zero (step S1228: NO), the management OS 122 copies the difference into the VRAM 112 of the GPU-x (step S1229).

After this copying or when the management OS 122 judges that the difference is zero (step S1228: YES), or when the management OS 122 judges that the GPU-1 is not currently executing graphic output (step S1224: NO), the management OS 122 sets the command transmission destination of the PV-b driver 313 to be the GPU-x (step S1230). After this setting, the management OS 122 notifies the PV-b driver 313 of the suspension of the duplication (step S1231). Next, the management OS 122 changes, from the "to be allocated" to the "final allocation", the GPU allocation state field of the record for the GPU-x (step S1232).

The management OS 122 changes to "unallocated", the GPU allocation state field of records for GPUs other than the GPU-x, among the records whose GPU allocation destination information is VM 1, in the GPU management table 301 (step S1233). After this changing, the management OS 122 causes the graphic card allocating operations of the management OS 122 to come to an end.

FIGS. 13A, 13B, 13C, and 13D are flowcharts of an example graphic card allocating operations of the GPU manager 321. The GPU manager 321 allocates the GPU-1 designated and starts up the VM 1, which is the VM that is to be monitored (step S1301). After this starting up, the GPU manager 321 changes, from the "unallocated" to the "final allocation", the GPU allocation state field of the record for the GPU-1, in the GPU management table 301 (step S1302).

After this changing, the GPU manager 321 selects a record whose final allocation GPU field stores therein the designated GPU-1, in the GPU temporary allocation table 303 (step S1303). Next, the GPU manager 321 changes, from the "unallocated" to the "temporary allocation", the GPU allocation state field of the graphic card 110 that corresponds to the temporary allocation GPU field of the selected record in the GPU management table 301 (step S1304).

Subsequently, the GPU manager 321 judges whether the start of the monitoring from the GPU state monitor 323 has been received (step S1305). If the GPU manager 321 judges that the start of the monitoring has not been received (step S1305: NO), the GPU manager 321 executes the operation at step S1305 after a given time period elapses. If the GPU manager 321 judges that the start of the monitoring has been received (step S1305: YES), the GPU manager 321 notifies the PV-b driver 313 of the start of the duplication (step S1306).

After this notifying or after the result is "NO" at step S1315, the GPU manager 321 judges whether the VM that is to be monitored, has already suspended operation (step S1307). If the GPU manager 321 judges that the VM has already suspended operation (step S1307: YES), the GPU manager 321 sets to "unallocated", the GPU allocation state of the record whose GPU allocation destination information is the VM that is to be monitored, in the GPU management table 301 (step S1308). After this setting, the GPU manager 321 notifies the GPU state monitor 323 of the suspension of the monitoring (step S1309). Next, the GPU manager 321 notifies the PV-b driver 313 of the suspension of the duplication (step S1310) and causes the graphic card allocating operations of the GPU manager 321 to come to an end. If the GPU manager 321 judges that the VM to be monitored has not suspended operation (step S1307: NO), the GPU manager 321 proceeds to step S1311.

Figure 13A:
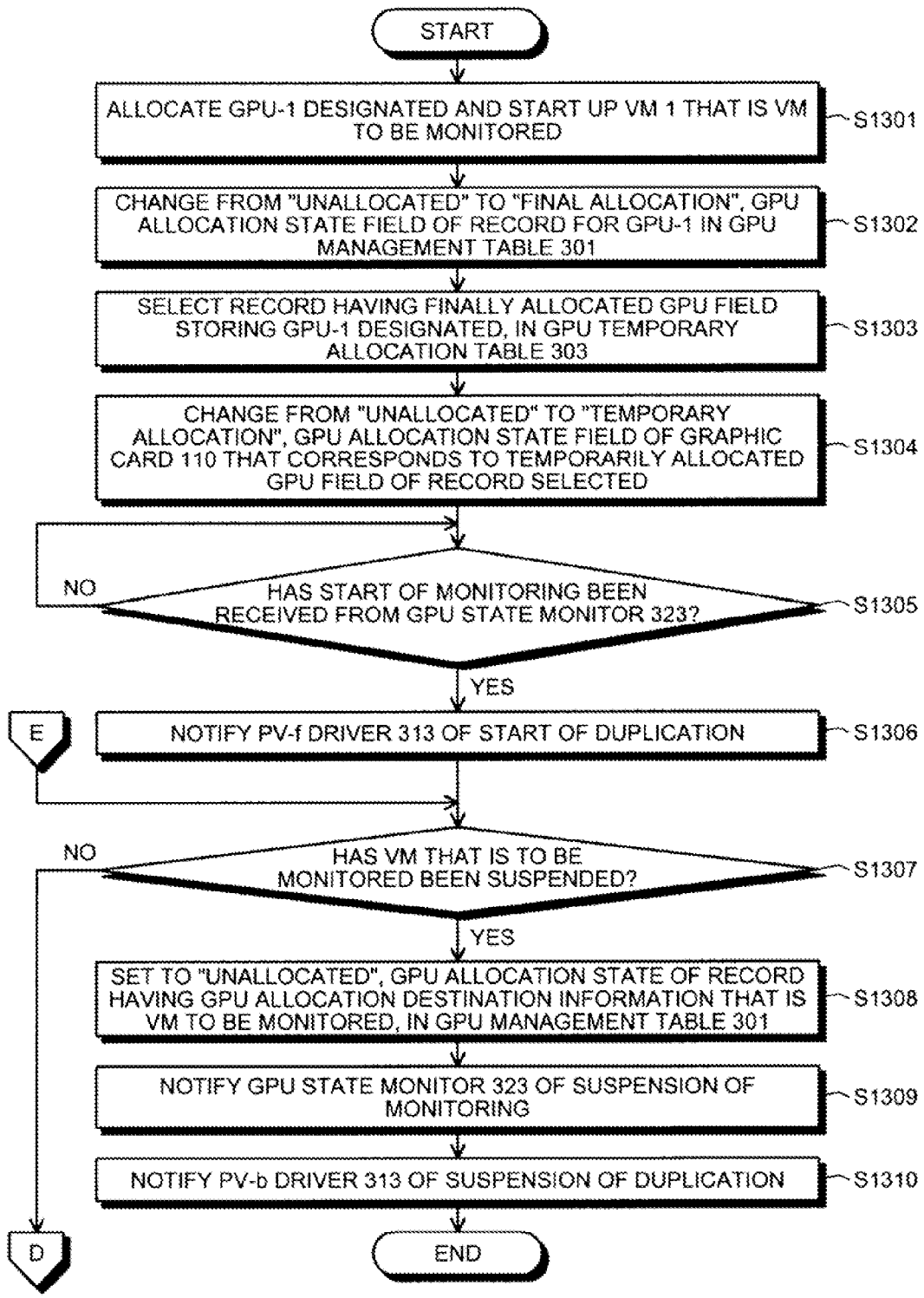
FIG. 13A is a flowchart of an example graphic card allocating operations of a GPU manager 321.
Figure 13B:
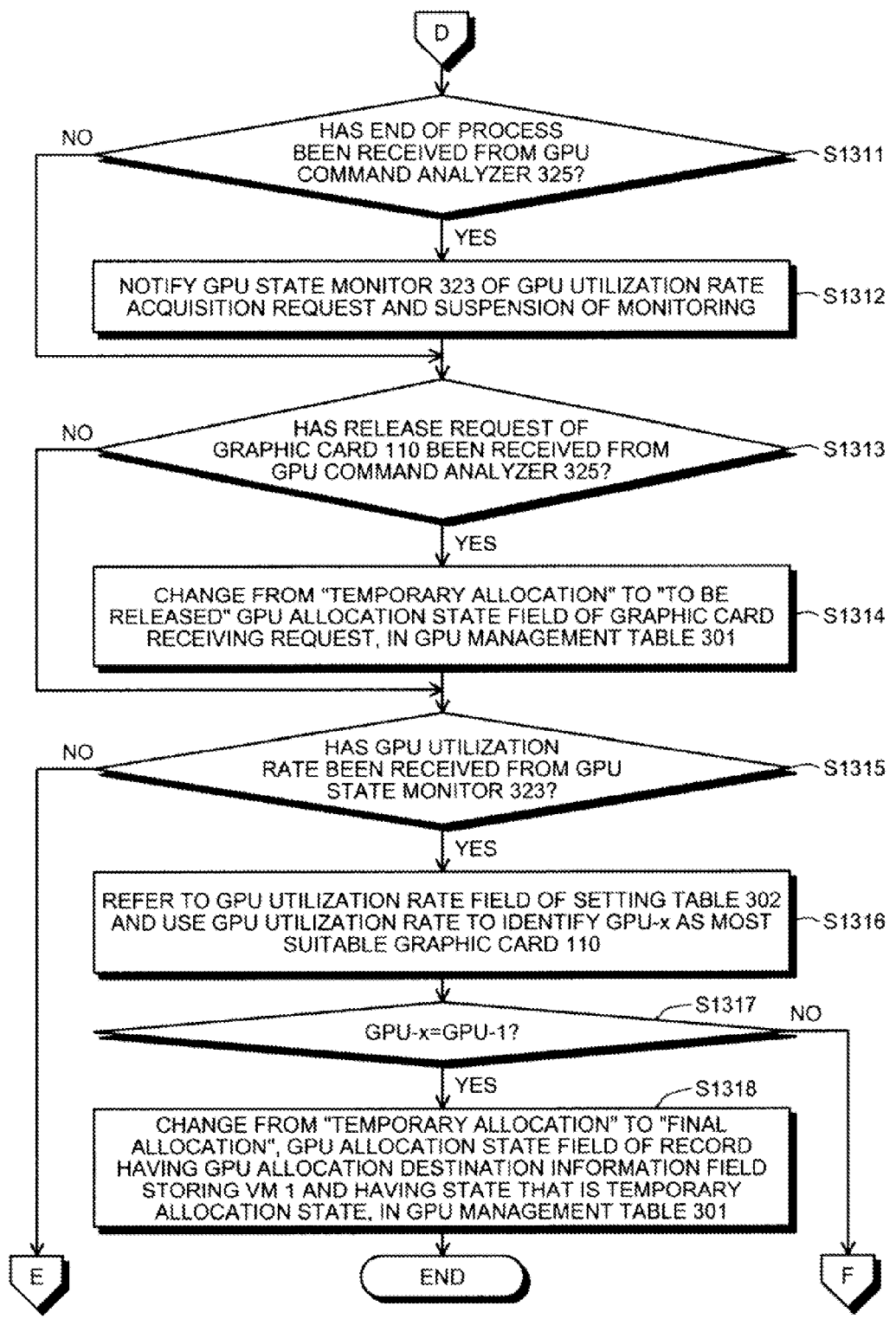
FIG. 13B is a flowchart of an example graphic card allocating operations of the GPU manager 321.

As depicted in FIG. 13B, the GPU manager 321 judges whether the end of the process has been received from the GPU command analyzer 325 (step S1311). If the GPU manager 321 judges that the end of the process has been received (step S1311: YES), the GPU manager 321 notifies the GPU state monitor 323 of a GPU utilization rate acquisition request and the suspension of the monitoring (step S1312). After this notifying or when the GPU manager 321 judges that the end of the process has not been received (step S1311: NO), the GPU manager 321 judges whether a release request for the graphic card 110 has been received from the GPU command analyzer 325 (step S1313).

If the GPU manager 321 judges that a release request for the graphic card 110 has been received (step S1313: YES), the GPU manager 321 changes, from the "temporary allocation" to the "to be released", the GPU allocation state field of the graphic card 110 for which the request is received, in the GPU management table 301 (step S1314). After this changing or if the GPU manager 321 judges that a release request for the graphic card 110 has not been received (step S1313: NO), the GPU manager 321 judges whether the GPU utilization rate has been received from the GPU state monitor 323 (step S1315). If the GPU manager 321 judges that the GPU utilization rate has not been received (step S1315: NO), the GPU manager 321 proceeds to step S1307.

If the GPU manager 321 judges that the GPU utilization rate has been received (step S1315: YES), the GPU manager 321 refers to the GPU utilization rate field of the setting table 302 and based on the GPU utilization rate, identifies a GPU-x to be the most suitable graphic card 110 (step S1316).

Operations at steps S1317 to S1337 will not be described because these operations are substantially identical to the state where the executing main entity is changed from the management OS 122 to the GPU manager 321 in the operations at steps S1214 to S1233 described with reference to FIGS. 12B and 12C.

For example, the operations at steps S1317 to S1320 correspond to those at steps S1214 to S1217; operations at steps S1322 to S1326 correspond to those at steps S1218 to S1222; and operations at steps S1335 to S1337 correspond to those at steps S1231 to S1233. In the following description, steps S1321, S1327, and S1333 whose operations are different from those described as above will be described.

Figure 13C:
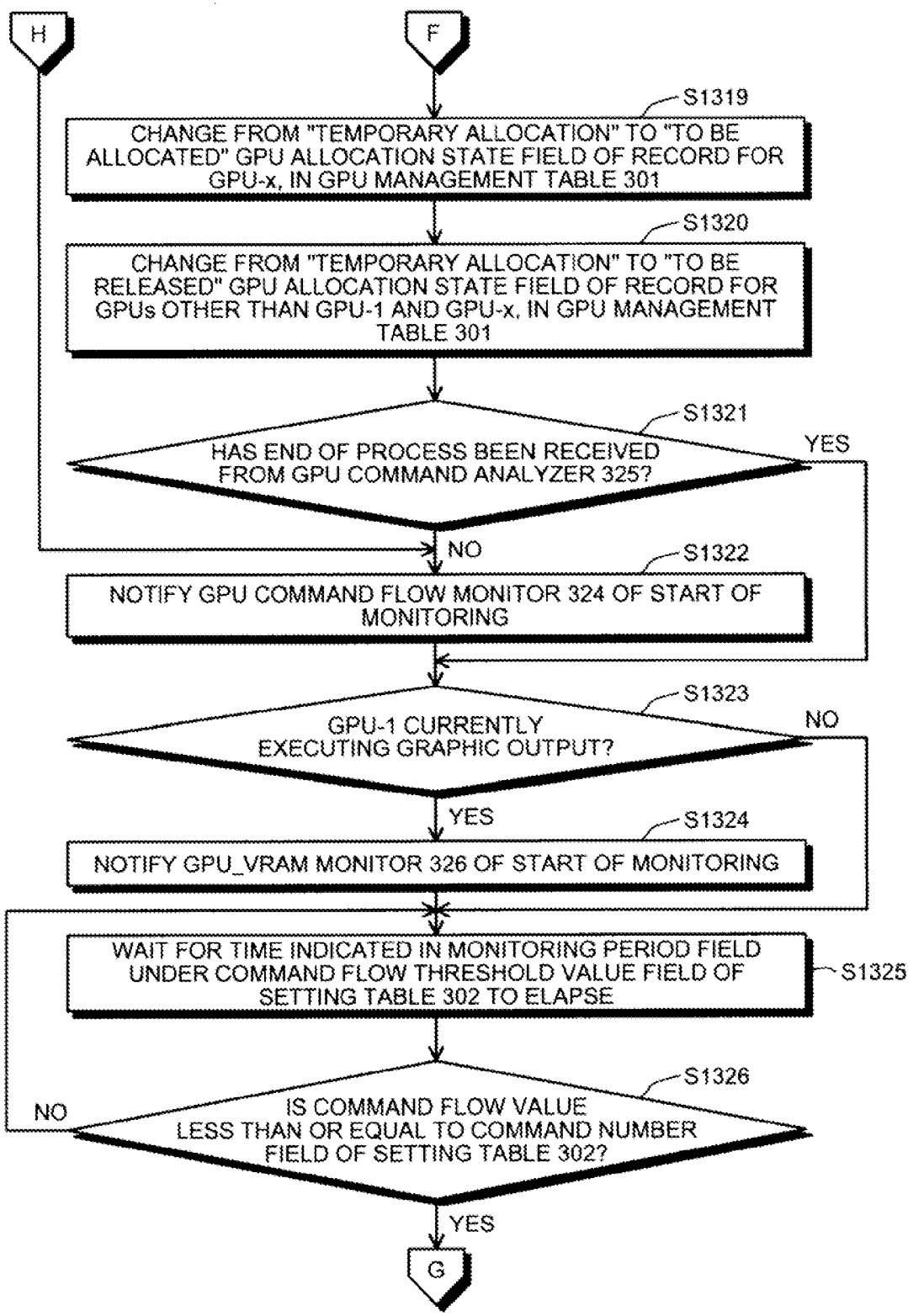
FIG. 13C is a flowchart of an example graphic card allocating operations of the GPU manager 321.

In the flowchart depicted in FIG. 13C, after the operation at step S1320 comes to an end, the GPU manager 321 judges whether the end of the process has been from the GPU command analyzer 325 (step S1321). If the GPU manager 321 judges that the end of the process has not been received (step S1321: NO), the GPU manager 321 proceeds to step S1322. If the GPU manager 321 judges that the end of the process has been received (step S1321: YES), the GPU manager 321 proceeds to step S1323.

Figure 13D:
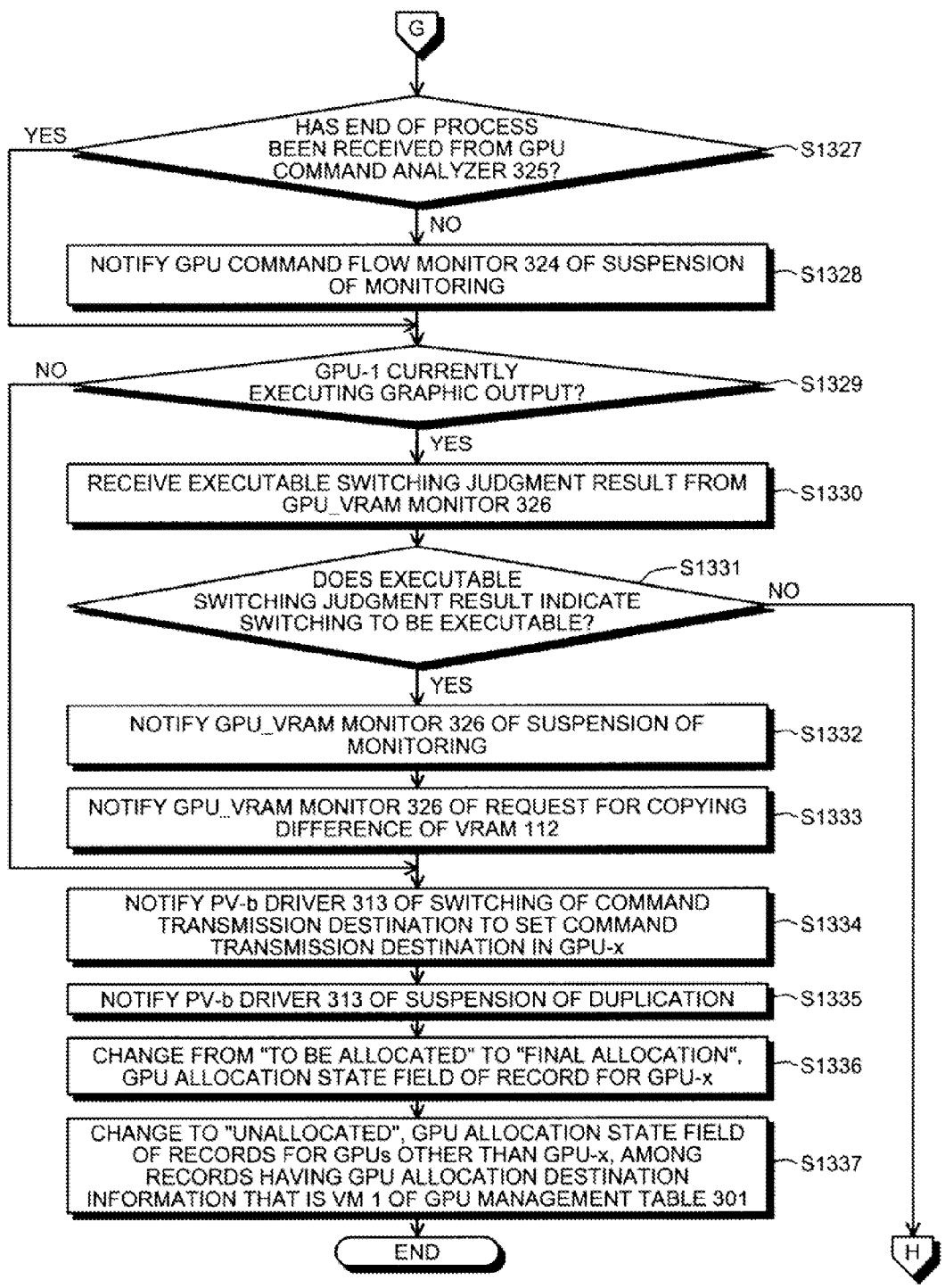
FIG. 13D is a flowchart of an example graphic card allocating operations of the GPU manager 321.

In the flowchart depicted in FIG. 13D, after the operation at step S1326 comes to an end, the GPU manager 321 judges whether the end of the process has been received from the GPU command analyzer 325 (step S1327). If the GPU manager 321 judges that the end of the process has not been received (step S1327: NO), the GPU manager 321 notifies the GPU command flow monitor 324 of the suspension of the monitoring (step S1328). After this notifying or if the GPU manager 321 judges that the end of the process has been received (step S1327: YES), the GPU manager 321 judges whether the GPU-1 is currently executing the graphic output (step S1329). If the GPU manager 321 judges that the GPU-1 is not currently executing the graphic output (step S1329: NO), the GPU manager 321 proceeds to step S1334.

If the GPU manager 321 judges that the GPU-1 is currently executing the graphic output (step S1329: YES), the GPU manager 321 receives the executable switching judgment result from the GPU_VRAM monitor 326 (step S1330) and judges whether the executable switching judgment result indicates that the switching is executable (step S1331). If the GPU manager 321 judges that the result indicates that the switching is executable (step S1331: YES), the GPU manager 321 notifies the GPU_VRAM monitor 326 of the suspension of the monitoring (step S1332) and notifies the GPU_VRAM monitor 326 of a copying request for the difference of the VRAM 112 (step S1333). Next, the GPU manager 321 notifies the PV-b driver 313 of command transmission destination switching to set the command transmission destination to be the GPU-x (step S1334) and the GPU manager 321 proceeds to step S1335. If the GPU manager 321 judges that the result indicates that the switching is not executable (step S1331: NO), the GPU manager 321 proceeds to step S1322.

FIG. 14 is a flowchart of an example of operations of the process monitor 322. The process monitor 322 monitors the PV-f driver 311 (step S1401) and judges whether a request for accessing the graphic card 110 has been issued (step S1402). If the process monitor 322 judges that no request for accessing the graphic card 110 has been issued (step S1402: NO), the process monitor 322 executes the operation at step S1402 upon the elapse of a given time period.

If the process monitor 322 judges that a request for accessing the graphic card 110 has been issued (step S1402: YES), the process monitor 322 notifies the GPU state monitor 323 of the start of the monitoring (step S1403) and judges whether the process has ended (step S1404). If the process monitor 322 judges that the process has not ended (step S1404: NO), the process monitor 322 judges whether a given time period has elapsed (step S1405). If the process monitor 322 judges that the given time period has not elapsed (step S1405: NO), the process monitor 322 proceeds to step S1404. If the process monitor 322 judges that the given time period has already elapsed (step S1405: YES) or if the process monitor 322 judges that the process has ended (step S1404: YES), the process monitor 322 notifies the GPU state monitor 323 of the suspension of the monitoring (step S1406) and causes the operation of the process monitor 322 to come to an end.

FIG. 15 is a flowchart of an example of operations of the GPU state monitor 323. The GPU state monitor 323 judges whether the start of the monitoring has been received from the process monitor 322 (step S1501). If the GPU state monitor 323 judges that the start of the monitoring has not been received (step S1501: NO), the GPU state monitor 323 executes the operation at step S1501 upon the elapse of a given time period. If the GPU state monitor 323 judges that the start of the monitoring has been received (step S1501: YES), the GPU state monitor 323 notifies the GPU manager 321 of the start of the monitoring (step S1502). After this notifying, the GPU state monitor 323 measures the GPU utilization rate (step S1503) and judges whether the VM that is to be monitored has suspended operation (step S1504). A specific method of measuring the GPU is the method described with reference to FIG. 8. The graphic card 110 that is to be measured may be a graphic card 110 whose GPU allocation state is the "temporary allocation" or the "final allocation".

If the GPU state monitor 323 judges that the VM to be monitored has not suspend operation (step S1504: NO), the GPU state monitor 323 judges whether a suspension of the monitoring has been received from the GPU manager 321 or the process monitor 322 (step S1505). If the GPU state monitor 323 judges that a suspension of the monitoring has not been received (step S1505: NO), the GPU state monitor 323 proceeds to step S1503. If the GPU state monitor 323 judges that a suspension of the monitoring has been received (step S1505: YES), the GPU state monitor 323 notifies the GPU manager 321 of the GPU utilization rate (step S1506). After this notifying, the GPU state monitor 323 causes the operations to come to an end. If the GPU state monitor 323 judges that the VM that is to be monitored has suspend operation (step S1504: YES), the GPU state monitor 323 causes the operations thereof to come to an end.

Figure 16:
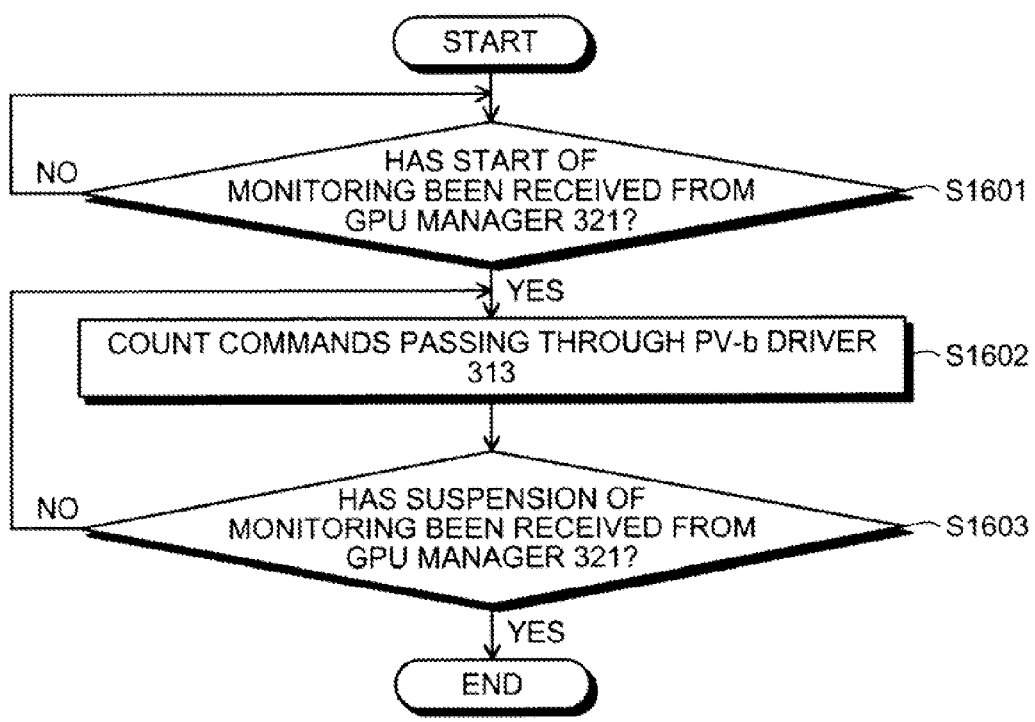
FIG. 16 is a flowchart of an example of operations of a GPU command flow monitor 324.

FIG. 16 is a flowchart of an example of operations of the GPU command flow monitor 324. The GPU command flow monitor 324 judges whether the start of the monitoring has been received from the GPU manager 321 (step S1601). If the GPU command flow monitor 324 judges that the start of the monitoring has not been received (step S1601: NO), the GPU command flow monitor 324 executes the operation at step S1601 upon the elapse of a given time period. If the GPU command flow monitor 324 judges that the start of the monitoring has been received (step S1601: YES), the GPU command flow monitor 324 counts the commands that pass through the PV-b driver 313 (step S1602).

After this counting, the GPU command flow monitor 324 judges whether a suspension of the monitoring has been received from the GPU manager 321 (step S1603). If the GPU command flow monitor 324 judges that a suspension of the monitoring has not been received (step S1603: NO), the GPU command flow monitor 324 proceeds to step S1602. If the GPU command flow monitor 324 judges that a suspension of the monitoring has been received (step S1603: YES), the GPU command flow monitor 324 causes operations thereof to come to an end.

Figure 17:
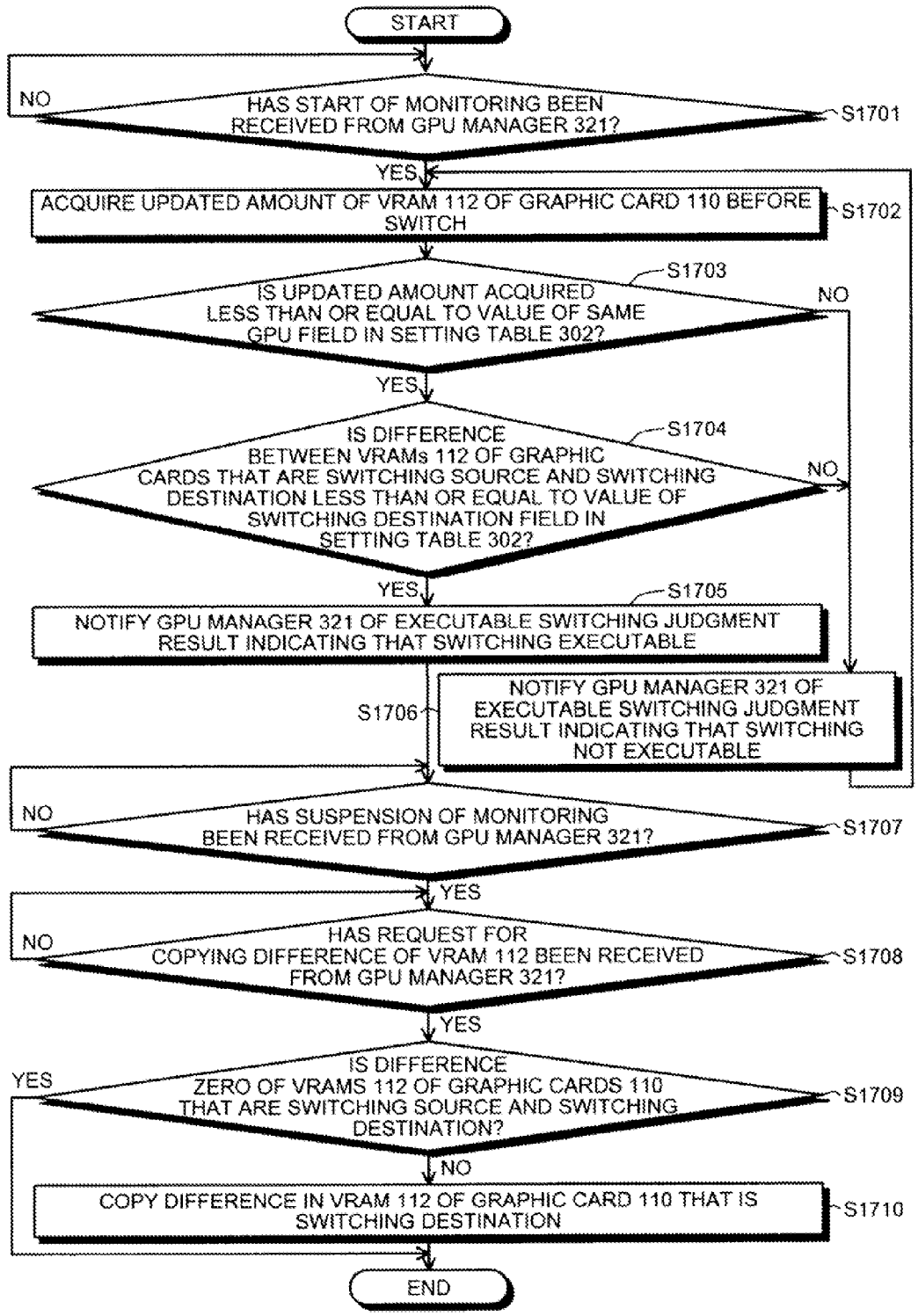
FIG. 17 is a flowchart of an example of operations of a GPU_VRAM monitor 326.

FIG. 17 is a flowchart of an example of operations of the GPU_VRAM monitor 326. The GPU_VRAM monitor 326 judges whether the start of the monitoring has been received from the GPU manager 321 (step S1701). If the GPU_VRAM monitor 326 judges that the start of the monitoring has not been received (step S1701: NO), the GPU_VRAM monitor 326 executes the operation at step S1701 upon the elapse of a given time period. If the GPU_VRAM monitor 326 judges that the start of the monitoring has been received (step S1701: YES), the GPU_VRAM monitor 326 acquires the updated amount of the VRAM 112 of the graphic card 110 before the switching (step S1702). The GPU_VRAM monitor 326 judges whether the acquired updated amount is at most a value in the same GPU sub field in the setting table 302 (step S1703).

If the GPU_VRAM monitor 326 judges that the updated amount is less than or equal to the value in the same GPU sub field (step S1703: YES), the GPU_VRAM monitor 326 judges whether the difference between the VRAMs 112 of the graphic cards 110 that are switching source and the switching destination is at most a value in the switching destination field in the setting table 302 (step S1704). The GPU allocation state of the graphic card 110 that is the switching source is the "final allocation" state, and that of the graphic card 110 that is the switching destination is the "to be allocated" state. If the GPU_VRAM monitor 326 judges that the difference is less than or equal to the value in the switching destination field (step S1704: YES), the GPU_VRAM monitor 326 notifies the GPU manager 321 of the switching judgment result indicating that the switching is executable (step S1705).

If the GPU_VRAM monitor 326 judges that the updated amount is greater than the value in the same GPU sub field (step S1703: NO) or if the GPU_VRAM monitor 326 judges that the difference is greater than the value in the switching destination field (step S1704: NO), the GPU_VRAM monitor 326 notifies the GPU manager 321 of the switching judgment result indicating that the switching is not executable (step S1706). After this notifying, the GPU_VRAM monitor 326 proceeds to step S1702.

After notifying that the switching is executable, the GPU_VRAM monitor 326 judges whether a suspension of the monitoring has been received from the GPU manager 321 (step S1707). If the GPU_VRAM monitor 326 judges that a suspension of the monitoring has not been received (step S1707: NO), the GPU_VRAM monitor 326 executes the operation at step S1707 after a given time period elapses. If the GPU_VRAM monitor 326 judges that a suspension of the monitoring has been received (step S1707: YES), the GPU_VRAM monitor 326 judges whether a request for copying the difference of the VRAM 112 has been received from the GPU manager 321 (step S1708). If the GPU_VRAM monitor 326 judges that a request for copying the difference has been received (step S1708: NO), the GPU_VRAM monitor 326 executes the operation at step S1708 after a given time period elapses.

If the GPU_VRAM monitor 326 judges that a request for copying the difference has been received (step S1708: YES), the GPU_VRAM monitor 326 judges whether the difference is zero between the VRAMs 112 of the graphic cards 110 that are the switching source and the switching destination (step S1709). If the GPU_VRAM monitor 326 judges that the difference is not zero (step S1709: NO), the GPU_VRAM monitor 326 copies the difference into the VRAM 112 of the graphic card 110 that is the switching destination (step S1710) and causes the operations thereof to come to an end. If the GPU_VRAM monitor 326 judges that the difference is zero (step S1709: YES), the GPU_VRAM monitor 326 causes the operations thereof to come to an end.

Figure 18:
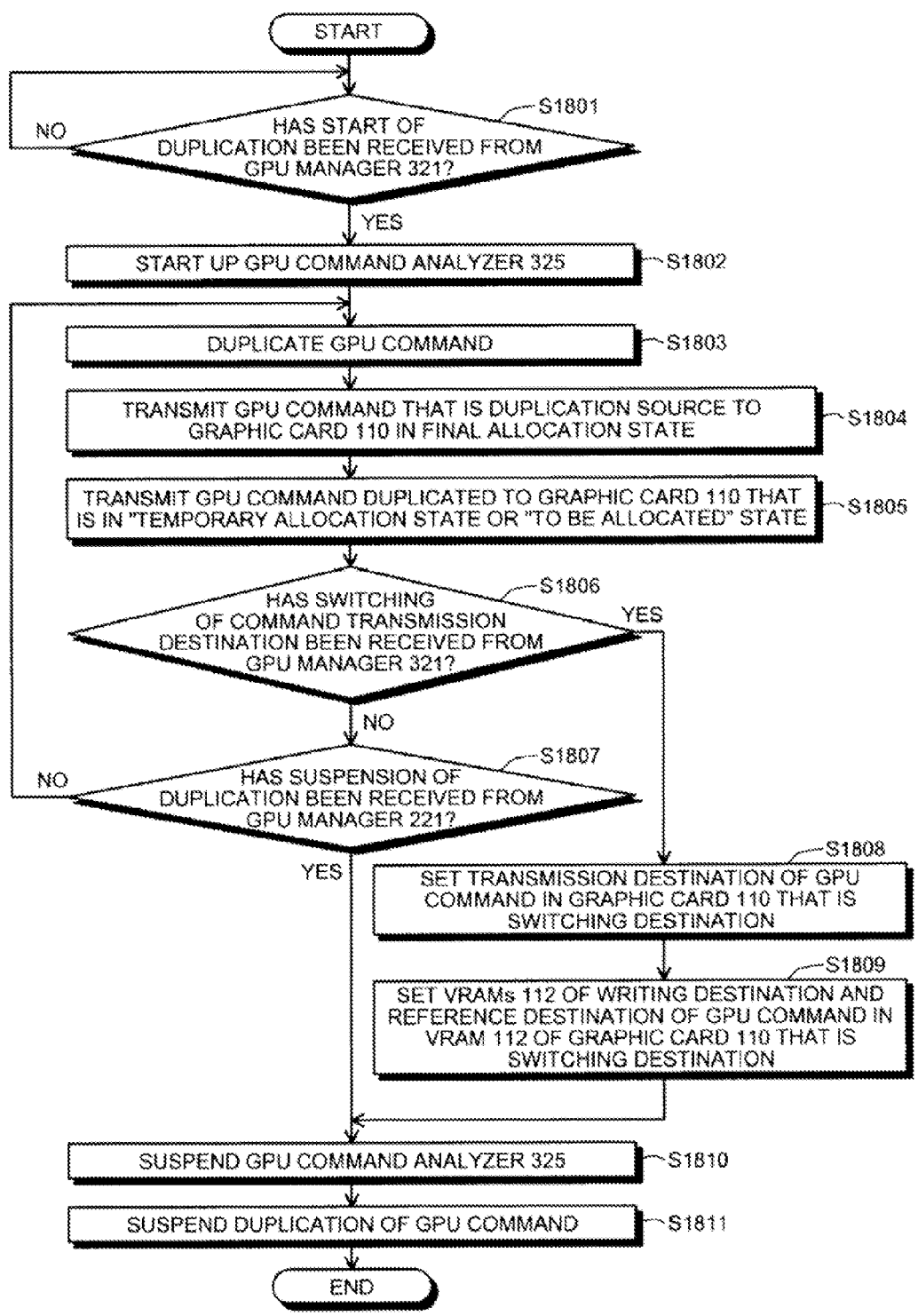
FIG. 18 is a flowchart of an example of operations of a PV-b driver 313.

FIG. 18 is a flowchart of an example of operations of the PV-b driver 313. The PV-b driver 313 judges whether the start of the duplication has been received from the GPU manager 321 (step S1801). If the PV-b driver 313 judges that the start of the duplication has not been received (step S1801: NO), the PV-b driver 313 executes the operation at step S1801 after a given time period elapses. If the PV-b driver 313 judges that the start of the duplication has been received (step S1801: YES), the PV-b driver 313 starts up the GPU command analyzer 325 (step S1802).

After this starting up, the PV-b driver 313 duplicates the GPU command (step S1803). For example, the PV-b driver 313 copies the received GPU command into the storage area of the graphic card driver 314 to be duplicated in. The PV-b driver 313 transmits the GPU command that is the duplication source to the graphic card 110 that is in the final allocation state (step S1804).

After this transmitting, the PV-b driver 313 transmits the GPU command duplicated, to the graphic card 110 that is in the "temporary allocation" state or the "to be allocated" state (step S1805). After this transmitting, the PV-b driver 313 judges whether switching of the command transmission destination has been received from the GPU manager 321 (step S1806). If the PV-b driver 313 judges that switching of the command transmission destination has not been received (step S1806: NO), the PV-b driver 313 judges whether a suspension of the duplication has been received from the GPU manager 321 (step S1807).

If the PV-b driver 313 judges that a suspension of the duplication has not been received (step S1807: NO), the PV-b driver 313 proceeds to the operation at step S1803. If the PV-b driver 313 judges that switching of the command transmission destination has been received (step S1806: YES), the PV-b driver 313 sets the transmission destination of the GPU command in the graphic card 110 that is the switching destination (step S1808). The PV-b driver 313 sets the VRAMs 112 that are the GPU command writing destination and the referring destination, in the VRAM 112 of the graphic card 110 that is the switching destination (step S1809).

After this setting or when the PV-b driver 313 judges that a suspension of the duplication has been received (step S1807: YES), the PV-b driver 313 causes the GPU command analyzer 325 to suspend operation (step S1810). After this suspension, the PV-b driver 313 suspends the duplication of the GPU command (step S1811) and causes the operations to come to an end.

Figure 19:
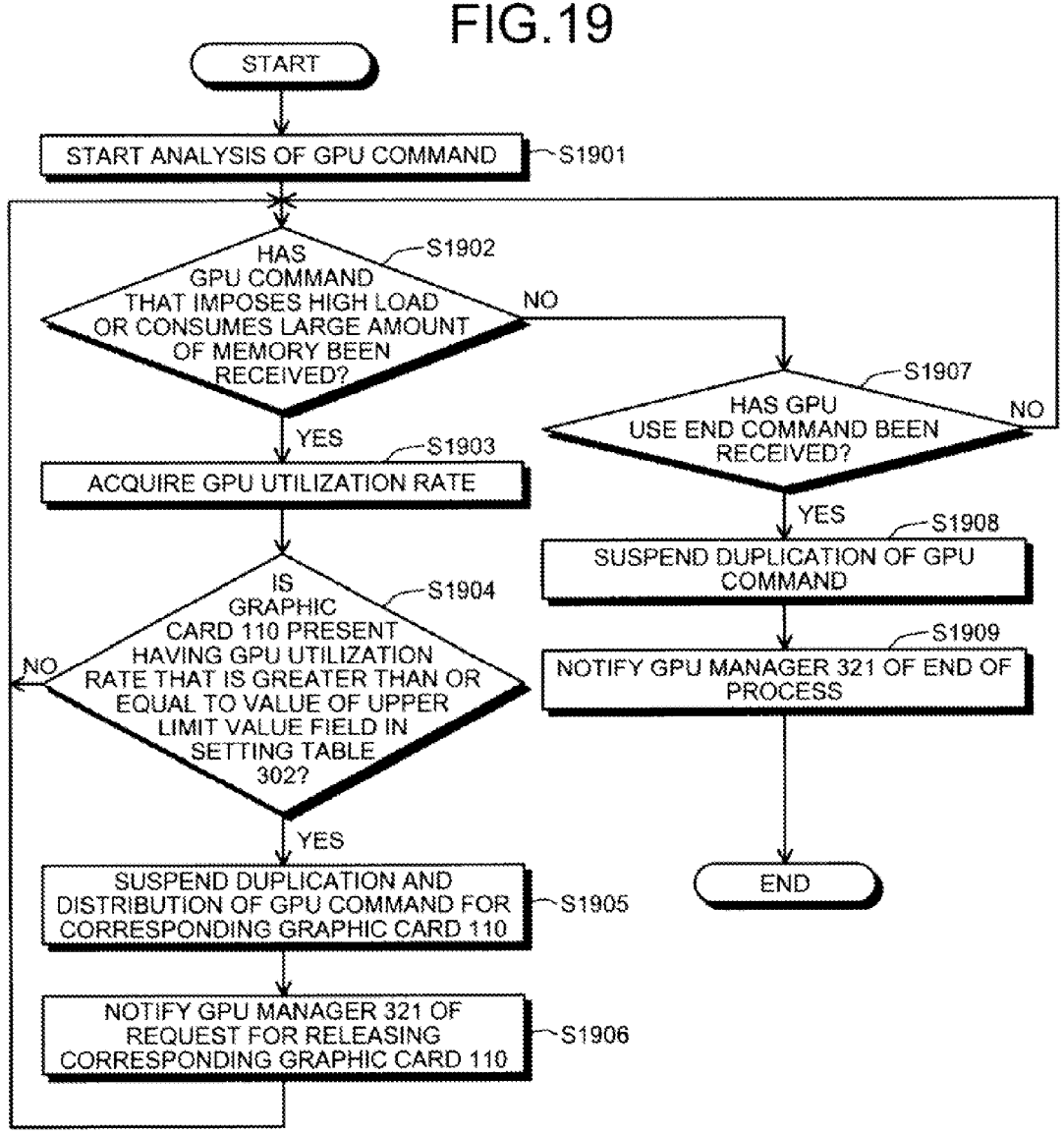
FIG. 19 is a flowchart of an example of operations of a GPU command analyzer 325.

FIG. 19 is a flowchart of an example of operations of the GPU command analyzer 325. The GPU command analyzer 325 is started up from the PV-b driver 313. The GPU command analyzer 325 starts analysis of the GPU command (step S1901). A specific analyzing method is to acquire a value of each field of the format 1003 depicted in FIG. 10A, for the received GPU command.

After starting the analysis, the GPU command analyzer 325 judges whether a GPU command that imposes a high load or consumes a large amount of memory has been received (step S1902). A "GPU command that imposes a high load" can be, for example, anisotropic filtering that is a kind of texture filtering or shadow processing. A "GPU command that consumes a large amount of memory" can be, for example, texture processing.

If the GPU command analyzer 325 judges that a GPU command that imposes a high load or consumes a large amount of memory has been received (step S1902: YES), the GPU command analyzer 325 acquires the GPU utilization rate (step S1903). After this acquisition, the GPU command analyzer 325 judges whether a graphic card 110 is present whose GPU utilization rate is greater than or equal to a value in the upper limit value sub field of the setting table 302 (step S1904). If the GPU command analyzer 325 judges that a graphic card 110 is present whose GPU utilization rate is greater than or equal to the value in the upper limit value sub field (step S1904: YES), the GPU command analyzer 325 causes the duplication and distribution of the GPU command to be suspended for the corresponding graphic card 110 (step S1905). After this suspension, the GPU command analyzer 325 notifies the GPU manager 321 of a request for releasing the corresponding graphic card 110 (step S1906) and proceeds to the operation at step S1902.

If the GPU command analyzer 325 judges that a graphic card 110 is not present whose GPU utilization rate is greater than or equal to the value in the upper limit value sub field (step S1904: NO), the GPU command analyzer 325 proceeds to step S1902. Configuration may be such that, after the operation at step S1903 comes to an end, the GPU command analyzer 325 proceeds to step S1902 without executing the operations at steps S1904 to 1906. By executing the operations at steps S1904 to 1906, the GPU command analyzer 325 is able to release the graphic card 110 that is already under a high load, before the operation of identifying the most suitable graphic card is executed.

If the GPU command analyzer 325 judges that a GPU command that imposes a high load or consumes a large amount of memory has not been received (step S1902: NO), the GPU command analyzer 325 judges whether a GPU utilization ending command has been received (step S1907). If the GPU command analyzer 325 judges that a GPU utilization ending command has not been received (step S1907: NO), the GPU command analyzer 325 proceeds to step S1902. If the GPU command analyzer 325 judges that a GPU utilization ending command has been received (step S1907: YES), the GPU command analyzer 325 causes the duplication of the GPU command to suspend (step S1908). After this suspension, the GPU command analyzer 325 notifies the GPU manager 321 that the process comes to an end (step S1909) and causes the operations to come to an end.

As described, according to the allocating method, the allocating apparatus, and the allocation program, a command is duplicated on a graphic card that has not executed any process; and the transmission destination of the command is switched from the graphic card that is the command transmission destination to a graphic card whose utilization rate becomes appropriate after the switching. Thereby, the allocating apparatus is able to execute allocation of a graphic card that is suitable for the processing capacity demanded by the source of the request. Therefore, the allocating apparatus does not have to allocate any graphic card whose processing performance is too high or too low and, is able to reduce the states where graphic cards having high processing performance are already in use when a VM requiring high processing performance is executed.

Configuration may be such that the allocating apparatus identifies a graphic card whose utilization rate is between the predetermined upper limit value and the predetermined lower limit value, as a suitable graphic card. Consequently, the allocating apparatus is able to allocate an apparatus suitable for the processing performance requested by the VM.

Configuration may be such that the allocating apparatus identifies a graphic card whose utilization rate is lower than the predetermined upper limit value and is highest, as a suitable graphic card. Consequently, the allocating apparatus is able to allocate a graphic card whose processing performance is lowest among the graphic cards that satisfy the processing performance required by the VM.

Configuration may be such that the allocating apparatus identifies a graphic card whose utilization rate is lower than the predetermined upper limit value and whose processing performance is lowest, as the suitable graphic card. For example, when commands accumulate in the queue, the processing performance of the allocating apparatus is insufficient compared to the capacity required by the application. The processing performance is static and therefore, the allocating apparatus is able to be applied with the embodiment even when the allocating apparatus allocates a graphic card whose utilization rate is not measurable because the allocating apparatus is unable to acquire the temperature information, etc.

Configuration may be such that when a suitable graphic card is identified, the allocating apparatus suspends the duplication of the command for the rest of the graphic cards. Consequently, the allocating apparatus is able to release the rest of the graphic cards and reduce the load on the allocating apparatus. The released graphic cards are able to respond to an allocation request from another VM.

The graphic card group transmitting duplicated commands may include graphic cards whose processing performance is higher or lower than that of the graphic card that is the command transmission destination. Consequently, the allocating apparatus is able to identify a more suitable graphic card even if the graphic card that is the command transmission destination is a graphic card whose processing performance is too high or one whose processing performance is too low.

Configuration may be such that when the number of command transmissions per unit time is lower than the predetermined number, the allocating apparatus switches the command transmission destination. When this switching is executed in a case where the number of command transmissions per unit time is too large, the difference in the number of commands processed is significant between the graphic card before the switching and the graphic card that is the switching destination. If the switching is executed at this point in time, reflection of the difference takes a long time and a user may feel as if the processing has stopped. Therefore, the allocating apparatus is able to execute the switching without causing the user any uncomfortable feeling, by executing the switching when the number of command transmissions per unit time is less than or equal to a predetermined number.

The allocating apparatus may execute the allocating operations for an apparatus other than the graphic cards. For example, when the allocating apparatus is connectable to multiple digital signal processors (DSPs), respectively having different processing performances, the allocating apparatus can execute the allocating operations with respect to the DSPs.

Further configuration may be such that when the updated amount of the VRAM in the graphic card that is the switching source is less than or equal to the predetermined amount, the allocating apparatus executes the switching. When the allocating apparatus executes the switching in a state where the updated amount of the VRAM is large, for example, a scene may be lost or a previous scene may again be displayed for moving image software as the process on the VM. Therefore, the allocating apparatus is able to execute the switching without causing the user any uncomfortable feeling, by executing the switching when the updated amount of the VRAM is less than or equal to a predetermined amount.

The allocating apparatus may execute the switching when, between the graphic cards that are the switching source and the switching destination, the difference in the VRAMs is less than or equal to a predetermined threshold value. In a case where the allocating apparatus executes the switching when the difference is significant, the copying operations for the difference takes a long time and the user may feel as if the processing has stopped. Therefore, the allocating apparatus is able to execute the switching without causing the user any uncomfortable feeling, by executing the switching when the difference in the VRAM is less than or equal to a predetermined threshold value.

An allocating apparatus 101 according to a second embodiment will be described for a case where the graphic cards 110 allocated in the "temporary allocation" state or the "to be released" state to the VM that is to be monitored, receive from a VM other than the VM that is to be monitored, allocation notification as the "final allocation" state. In this case, the GPU manager 321 suspends the duplication of the GPU command and the measurement of the GPU utilization rate. In the description of the allocating apparatus 101 according to the second embodiment, changes made to the allocating apparatus 101 of the first embodiment will be described.

Hardware of the allocating apparatus 101 according to the second embodiment is same as the hardware of the allocating apparatus 101 of the first embodiment depicted in FIG. 2 and therefore, will not again be described. Software of the allocating apparatus 101 according to the second embodiment has the same functions excluding the function of the GPU manager 321 and therefore, will not again be described.

Figure 20A:
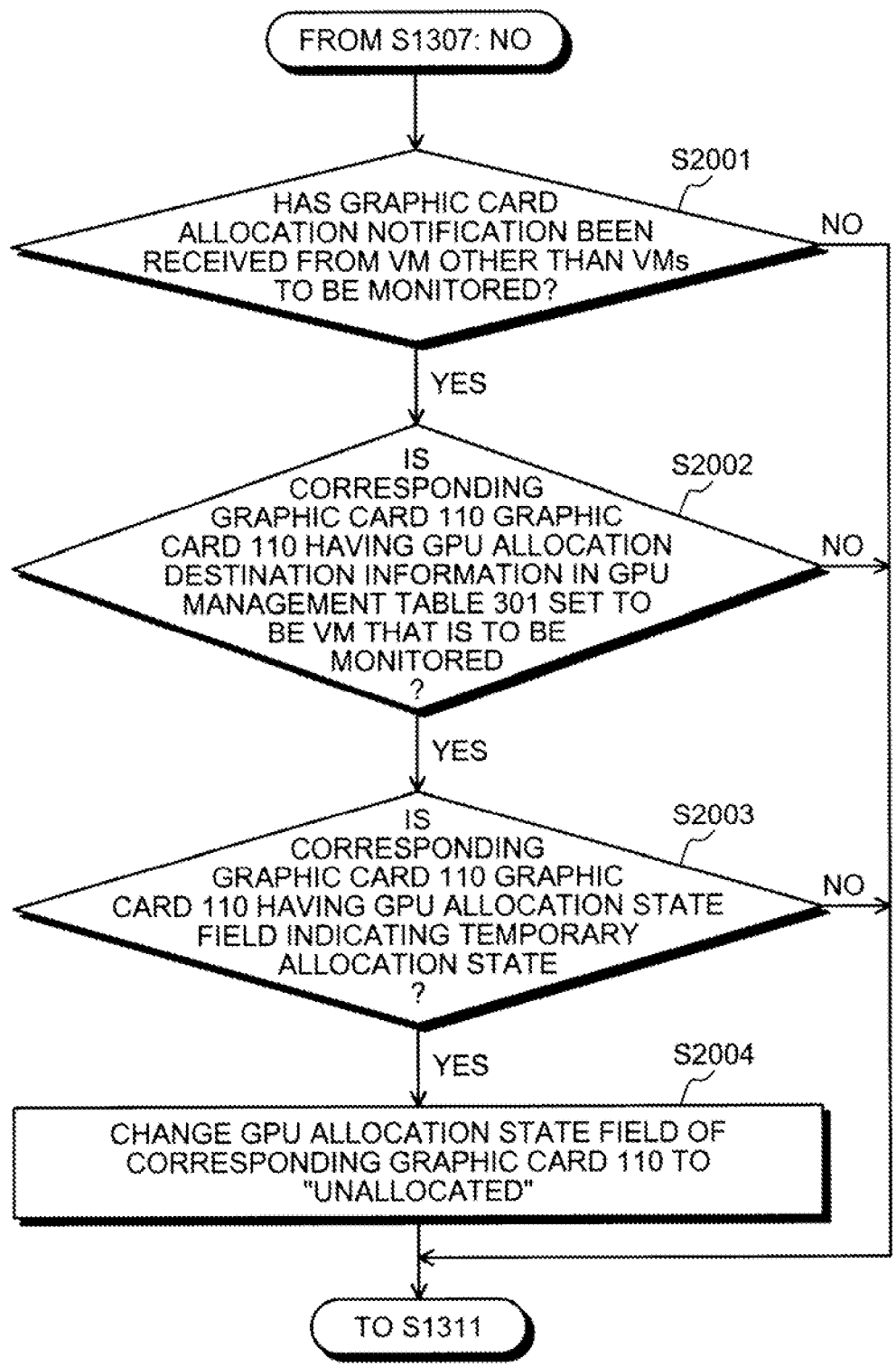
FIG. 20A is a flowchart of an example of graphic card allocating operations of the GPU manager 321 according to the second embodiment.

FIGS. 20A and 20B are flowcharts of an example of graphic card allocating operations of the GPU manager 321 according to the second embodiment. The graphic card allocating operations of a GPU manager 321 according to the second embodiment can be implemented by making two changes to the graphic card allocating operations of the GPU manager 321 of the first embodiment. The first change is an addition of steps S2001 to S2004 between "step S1307: NO" and step S1311, as depicted in FIG. 20A. The second change includes an addition of steps S2011 to S2014 between steps S1324 and S1325 and a change in the transition for "step S1326: NO", as depicted in FIG. 20B.

As depicted in the flowchart in FIG. 20A, after passing through "step S1307: NO", the GPU manager 321 judges whether a graphic card allocation notification has been received from a VM other than the VM that is to be monitored (step S2001). In the description below with reference to FIGS. 20A and 20B, a graphic card 110 that has received allocation notification will be referred to as "corresponding graphic card 110". If the GPU manager 321 judges that allocation notification has been received (step S2001: YES), the GPU manager 321 judges whether the corresponding graphic card 110 is a graphic card 110 whose GPU allocation destination information field in the GPU management table 301 indicates the VM that is to be monitored (step S2002).

If the GPU manager 321 judges that the corresponding graphic card 110 is a graphic card 110 whose GPU allocation destination information field indicates the VM that is to be monitored (step S2002: YES), the GPU manager 321 judges whether the corresponding graphic card 110 is a graphic card 110 whose GPU allocation state field indicates the "temporary allocation state" (step S2003). If the GPU manager 321 judges that the corresponding graphic card 110 is a graphic card 110 whose GPU allocation state field indicates the "temporary allocation state" (step S2003: YES), the GPU manager 321 changes the GPU allocation state field of the corresponding graphic card 110 to the "unallocated" state (step S2004) and proceeds to the operation at step S1311.

The GPU allocation state is changed to the "unallocated" state and therefore, the corresponding graphic card 110 is excluded from those to be measured at step S1503 by the GPU state monitor 323. Therefore, the measurement of the GPU utilization rate of the corresponding graphic card 110 is not executed. Similarly, the corresponding graphic card 110 is excluded from those that are the transmission destinations of the GPU commands duplicated at step S1805 by the PV-b driver 313 and therefore, no GPU command is distributed thereto.

If the GPU manager 321 judges that allocation notification has not been received (step S2001: NO), the GPU manager 321 proceeds to the operation at step S1311. If the GPU manager 321 judges that the corresponding graphic card 110 is not a graphic card 110 whose GPU allocation destination information field indicates the VM that is to be monitored (step S2002: NO) or when the GPU manager 321 judges that the corresponding graphic card 110 is not a graphic card 110 whose GPU allocation state field indicates the "temporary allocation" state (step S2003: NO), the GPU manager 321 proceeds to the operation at step S1311.

As depicted in the flowchart in FIG. 20B, after passing through "step S1323: NO" or after the operation at step S1324, the GPU manager 321 executes the operations at steps S2011 to S2013. Here, the operations at steps S2011 and S2012 are same as the operations at steps S2001 and S2002 and therefore, will not again be described. If the flow passes through "step S2002: YES", the GPU manager 321 judges whether the corresponding graphic card 110 is a graphic card 110 whose GPU allocation state field indicates the "to be released" state (step S2013). If the GPU manager 321 judges that the corresponding graphic card 110 is a graphic card 110 whose GPU allocation state field indicates the "to be released" state (step S2013: YES), the GPU manager 321 changes the GPU allocation state field of the corresponding graphic card 110 to the "unallocated" state (step S2014) and proceeds to the operation at step S1325.

If the judgment result is "NO" at step S2011, if the judgment result is "NO" at step S2012, or if the GPU manager 321 judges that the corresponding graphic card 110 is not a graphic card 110 whose GPU allocation state field indicates the "to be released" state (step S2013: NO), the GPU manager 321 proceeds to the operation at step S1325. If the judgment result is "NO" at step S1326, the GPU manager 321 proceeds to the operation at step S2011.

As described, according to the allocating method, the allocating apparatus, and the allocation program, when allocation notification is received as the final allocation from another VM, the graphic card allocating operations executed for the corresponding graphic card is suspended. Consequently, the allocating apparatus is able to execute the graphic card allocating operations without interfering with the graphic card allocation of another VM.

An allocating apparatus 101 according to a third embodiment will be described for a case where graphic card allocating operations for multiple VMs simultaneously occur. In a case where the operations simultaneously occur, when the GPU utilization rate is measured, the process that accesses the graphic card 110 may be unable to achieve its original performance and accurate measurement of the GPU utilization rate is not possible. Therefore, when the graphic card allocating operations simultaneously occur, the allocating apparatus 101 according to the third embodiment allocates the VM that is to be monitored to the physical CPU whose CPU utilization rate is low. In the description of the allocating apparatus 101 according to the third embodiment, changes made thereto from the allocating apparatus 101 according to the first embodiment will be described. The third embodiment is also applicable to the allocating apparatus 101 according to the second embodiment.

Hardware of the allocating apparatus 101 according to the third embodiment is same as the hardware of the allocating apparatus 101 of the first embodiment depicted in FIG. 2 and therefore, will not again be described. Software of the allocating apparatus 101 according to the third embodiment has the same functions excluding the function of the GPU manager 321 and therefore, will not again be described.

FIGS. 21A and 21B are flowcharts of an example of graphic card allocating operations of the GPU manager 321 according to the third embodiment. The graphic card allocating operations of the GPU manager 321 according to the third embodiment can be implemented by making two changes to the graphic card allocating operations of the GPU manager 321 depicted in FIG. 13. The first change is an addition of steps S2101 to S2104 between "step S1305: YES" and step S1306, as depicted in FIG. 21A. The second change is an addition of steps S2101 and S2102 between the operations at steps S1335 and S1336, as depicted in FIG. 21B.

As depicted in the flowchart in FIG. 21A, when the flow passes through "step S1305: YES", the GPU manager 321 judges whether a VM other than the VMs that are to be monitored is currently executing graphic card allocating operations (step S2101). If the GPU manager 321 judges that a VM other than the VMs to be monitored is currently executing the graphic card allocating operations (step S2101: YES), the GPU manager 321 judges whether any physical CPU is present that is available for the allocation and whose CPU utilization rate is less than or equal to a predetermined threshold value (step S2102). The predetermined threshold value may be registered as a field in the setting table 302. For example, it is determined whether the CPU utilization rate is at most 10[%], as the predetermined threshold value.

The CPU utilization rate is calculated using the ratio of the CPU execution time period per unit time as the load amount, and may be calculated based on the number of operations allocated to the CPU as another calculation method. The CPU utilization rate may be calculated using as the load amount for the CPU, the total amount of processing indicated in processing amount information appended to each process allocated to the CPU. The processing amount information is generated by preliminarily measuring the amounts of processing.

If the GPU manager 321 judges that no physical CPU is present whose CPU utilization rate is less than or equal to the predetermined threshold value (step S2102: NO), the GPU manager 321 judges whether the CPU utilization rate of a virtual CPU originally allocated is at most a predetermined threshold value (step S2103). If the GPU manager 321 judges that the CPU utilization rate of the virtual CPU is greater than the predetermined threshold value (step S2103: NO), the GPU manager 321 proceeds to the operation at step S2102. If the GPU manager 321 judges that the CPU utilization rate of the virtual CPU is less than or equal to the predetermined threshold value (step S2103: YES), the GPU manager 321 proceeds to the operation at step S1306.

If the GPU manager 321 judges that a physical CPU is present whose CPU utilization rate is less than or equal to the predetermined threshold value (step S2102: YES), the GPU manager 321 allocates the VM that is to be monitored to the physical CPU (step S2104). After this allocation, the GPU manager 321 sets the virtual CPU originally allocated to an "off line" state (step S2105) and proceeds to the operation at step S1306. If the virtual CPU is set to the "off line" state, the virtual CPU is not usable by the VM. If the GPU manager 321 judges that a VM other than those that are to be monitored is not currently executing the graphic card allocating operations (step S2101: NO), the GPU manager 321 proceeds to the operation at step S1306.

As depicted in the flowchart in FIG. 21B, after the operation at step S1335, the GPU manager 321 judges whether the VM that is to be monitored has been allocated to the physical CPU (step S2111). If the GPU manager 321 judges that the VM that is to be monitored has been allocated to the physical CPU (step S2111: YES), the GPU manager 321 sets the virtual CPU originally allocated to an "on line" state (step S2112). Consequently, the virtual CPU becomes usable by the VM. After this setting, the GPU manager 321 releases the physical CPU (step S2113).

After this release, the GPU manager 321 proceeds to the operation at step S1336. If the GPU manager 321 judges that the VM that is to be monitored has not been allocated to the physical CPU (step S2111: NO), the GPU manager 321 proceeds to the operation at step S1336.

As described, according to the allocating method, the allocating apparatus, and the allocation program, when the graphic card allocating operations is currently executed by other VMs, the VM that is to be monitored is allocated to a CPU that has a low load. Consequently, the allocating apparatus is able to execute the graphic card allocating operations with its original performance.

An allocating apparatus 101 according to a fourth embodiment will be described for a case where a user table 2201 is accessed that stores therein the graphic cards identified in the past. If a VM started up by an operation of a user has been started up in the past with the graphic card 110 allocated thereto, the allocating apparatus 110 again executes the operations of allocating the graphic cards 110 identified in the past. In the description of the allocating apparatus 101 according to the fourth embodiment, changes made to the allocating apparatus 101 according to the first embodiment will be described. The fourth embodiment is applicable also to the second or the third embodiment.

Hardware of the allocating apparatus 101 according to the fourth embodiment is same as the hardware of the allocating apparatus 101 of the first embodiment depicted in FIG. 2 and therefore, will not again be described. As to software of the allocating apparatus 101 according to the fourth embodiment, graphic card allocation preprocessing is added to the GPU manager 321, and the graphic card allocating operations of the GPU manager 321 are not changed and therefore, will not again be described. Other functional units excluding a determiner 600 and a duplicator 601 have the same functions as those in the first embodiment and will not again be described.

The determiner 600 according to the fourth embodiment determines the apparatuses that are to be candidates for the most suitable apparatus. The number of apparatuses determined corresponds to the amount of memory used by commands notified from the PV-f driver 311. The "used memory amount" is stored in the user table 2201. A state is assumed where the value in the "number of GPUs temporarily allocated" field is, for example, two. In this case, if the used memory amount is greater than or equal to a predetermined upper limit value, the determiner 600 determines the number of GPUs temporarily allocated to be, for example, 2−1=1 and determines one graphic card 110 to be a candidate apparatus. If the used memory amount is less than or equal to a predetermined lower limit value, the determiner 600 determines the number of GPUs temporarily allocated to be, for example, 2+1=3 and determines three graphic cards 110 to be candidate apparatuses.

The duplicator 601 according to the fourth embodiment duplicates a command for the number of apparatuses that have been determined as candidates for the most suitable apparatus. A state is assumed where the value in the "number of GPUs temporarily allocated" field is, for example, two. In this case, if the number of GPUs temporarily allocated is one, the duplicator 601 duplicates the original command, thereby acquiring one duplicated command. If the number of GPUs temporarily allocated is three, the duplicator 601 duplicates the original command, thereby acquiring three duplicated commands.

FIG. 22 is an explanatory diagram of an example of the contents stored in the user table 2201. The user table 2201 includes five fields that include a "user ID" field, a "password" field, a "VMID" field, a "graphic card ID" field, and a "used memory amount" field. The user ID field stores therein identification information of a user. The password field stores therein a password of the user indicated in the corresponding user ID field. The VMID field stores identification information of a VM used by the user. The graphic card ID field stores therein identification information of a graphic card previously allocated. Even if the VM is started up, the graphic card is not necessarily used. If the graphic card is not used, the graphic card ID and the used memory amount fields are blank.

The used memory amount field stores therein the amount of memory used for the previous execution of the GPU command, and has sub fields that include an "average value" sub field and a "maximum value" sub field. The average value sub field stores therein the average amount of memory previously used. The maximum value sub field stores therein the maximal amount of memory previously used.

For example, for a user-A depicted in FIG. 22, the password is a password-A and a used VM thereof is the VM 1. The graphic card previously allocated to the used VM 1 is the GPU-3. The amount of memory used on average is 1.5 [Mbyte], where the maximum is 1.8 [Mbyte].

Figure 23A:
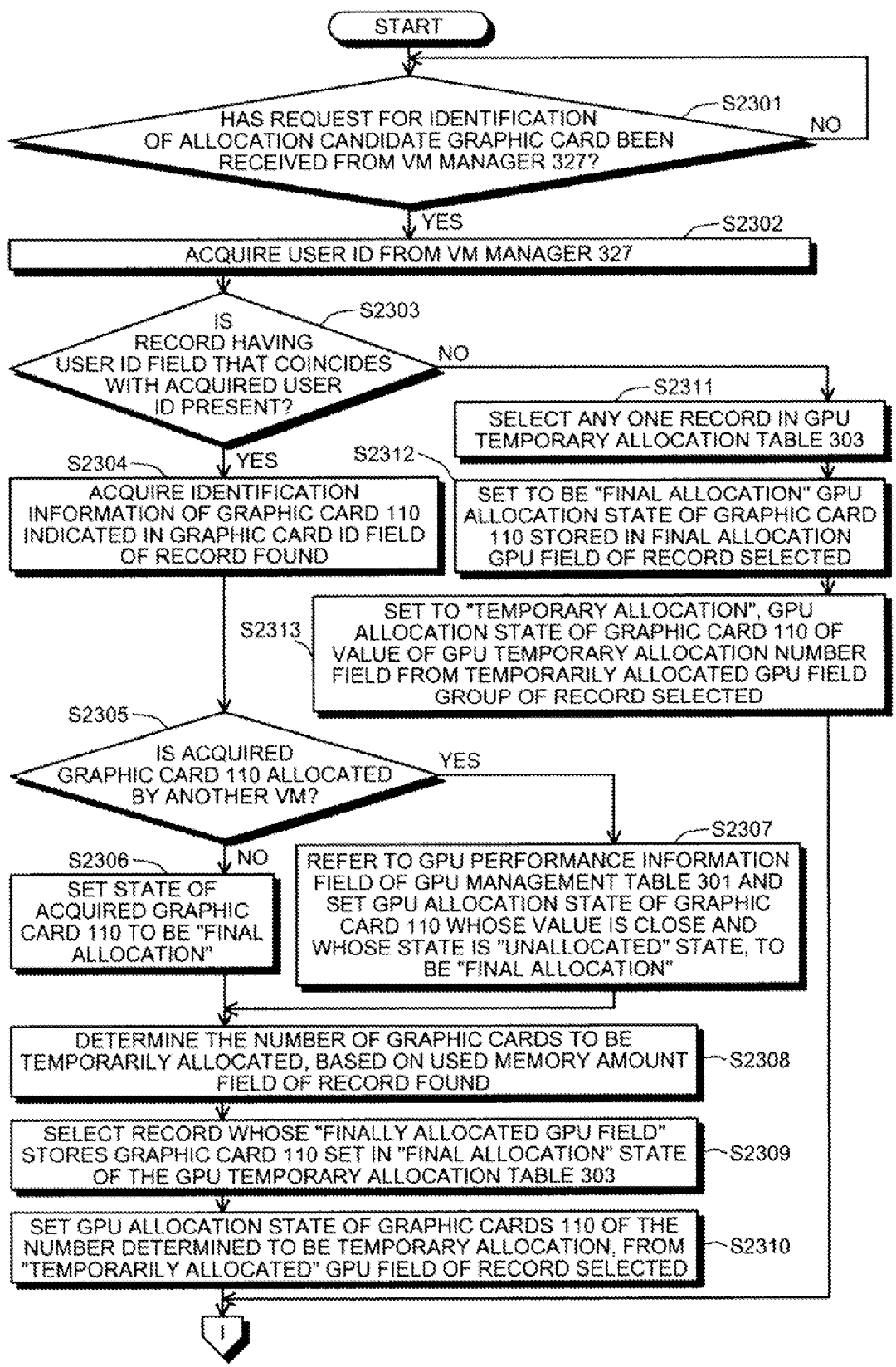
FIG. 23A is a flowchart of an example of the graphic card allocation preprocessing by the GPU manager 321.
Figure 23B:
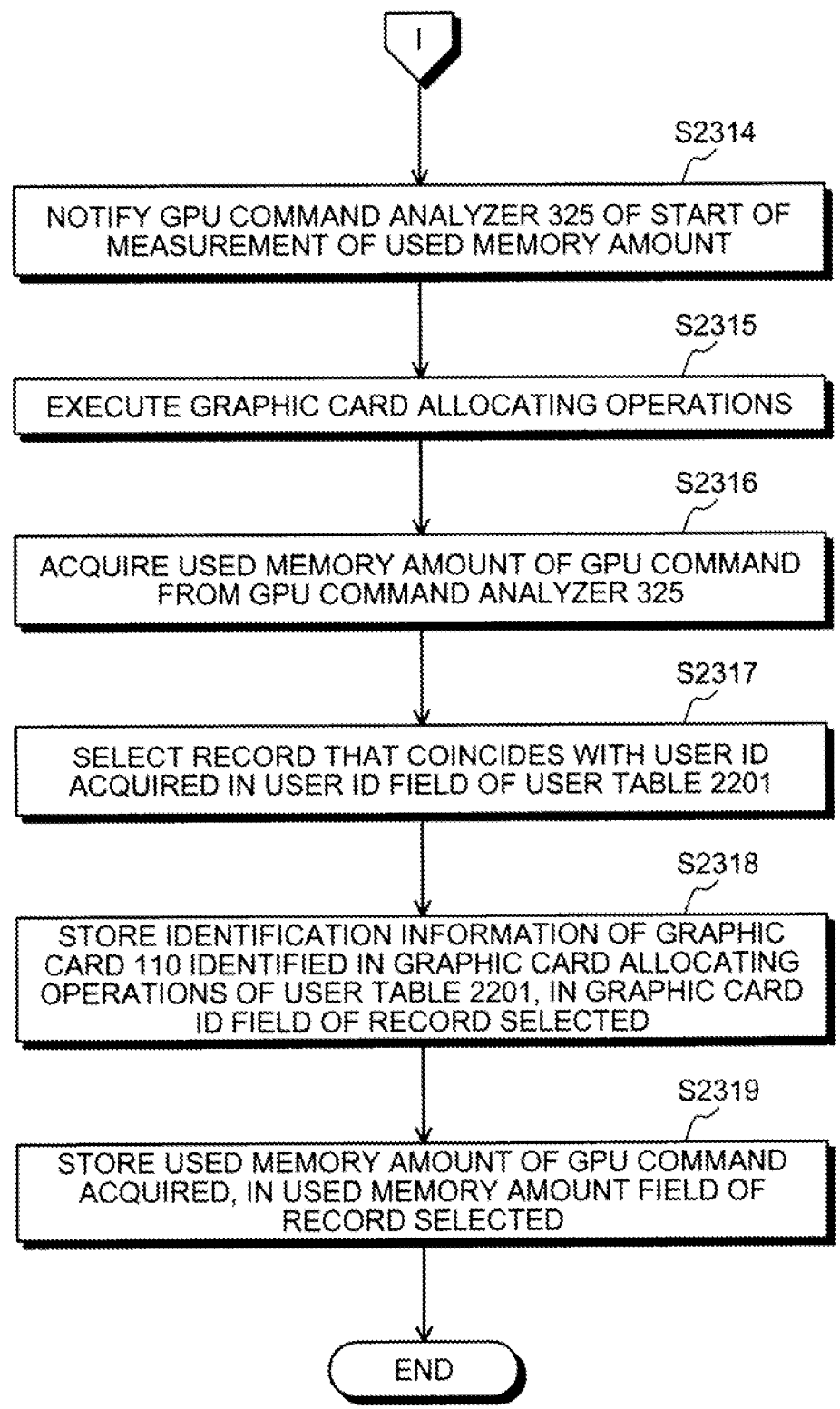
FIG. 23B is a flowchart of an example of the graphic card allocation preprocessing by the GPU manager 321.

FIGS. 23A and 23B are flowcharts of an example of the graphic card allocation preprocessing by the GPU manager 321. The GPU manager 321 judges whether an allocation candidate graphic card identification request has been received from the VM manager 327 (step S2301). If the GPU manager judges that a graphic card identification request has not been received (step S2301: NO), the GPU manager 321 executes the operation at step S2301 after a given time period elapses.

If the GPU manager 321 judges that a graphic card identification request has been received (step S2301: YES), the GPU manager 321 acquires the user ID from the VM manager 327 (step S2302). After this acquisition, the GPU manager 321 judges whether a record is present whose user ID coincides with the acquired user ID in the user ID field (step S2303).

If the GPU manager 321 judges that the record is present (step S2303: YES), the GPU manager 321 acquires the identification information of the graphic card 110 stored in the graphic card ID field in the record found (step S2304). The identification information of the graphic card 110 may not be stored in the graphic card ID field of the record. In this case, the GPU manager 321 may execute the route that includes "step S2303: NO" assuming that the record is not present.

After this acquisition, the GPU manager 321 refers to the GPU management table 301 and thereby, judges whether the acquired graphic card 110 has been allocated by another VM (step S2305). If the GPU manager 321 judges that the acquired graphic card 110 has not been allocated by another VM (step S2305: NO), the GPU manager 321 sets the GPU allocation state of the acquired graphic card 110 to "the final allocation state" (step S2306). If the GPU manager 321 judges that the acquired graphic card 110 has been allocated by another VM (step S2305: YES), the GPU manager 321 refers to the GPU performance information field of the GPU management table 301 and sets the GPU allocation state of the graphic card 110 having a close value and in the unallocated state, to "final allocation" (step S2307).

After setting the graphic card 110 allocated at steps S2306 and S2307, the GPU manager 321 determines the number of graphic cards to be temporarily allocated, based on the used memory amount field of the record found (step S2308).

The GPU manager 321 prepares an upper limit value and a lower limit value as the predetermined threshold values, as a specific method of determining the number of graphic cards to be temporarily allocated. These values may be stored as fields in the setting table 302. In this state, the GPU manager 321 may determine the number of graphic cards to be temporarily allocated to be "(the value in the number of GPUs temporarily allocated field in the setting table 302)−1" if the value in the used memory amount field is greater than or equal to the upper limit value, or "(the value in the number of GPUs temporarily allocated field)+1" if the value is less than or equal to the lower limit value.

In a case where the VM of the record found is a VM that frequently issues GPU commands that respectively use a large amount of memory like the texture process, when the temporarily allocated quantity is large, accesses to the memory may increase and may occupy the band of the bus 207. Therefore, for a user who uses a large amount of memory, the GPU manager 321 can prevent other users from being affected by such a user, by reducing the temporarily allocated quantity.

After this determination, the GPU manager 321 selects a record whose final allocation GPU field stores therein a graphic card 110 set to the final allocation state, in the GPU temporary allocation table 303 (step S2309). After this selection, the GPU manager 321 sets to "the temporary allocation state", the GPU allocation state of the graphic cards 110 of the determined number, from the temporarily allocated GPU field group of the record selected (step S2310) and proceeds to the operation at step S2314. If the determined number is larger than the number of temporarily allocated GPU field groups, the GPU manager 321 may set the GPU allocation state of each graphic card 110 in the temporarily allocated GPU field groups. If a graphic card 110 is present whose GPU allocation state is "final allocation", the GPU manager 321 may set the graphic card 110 present to "the temporary allocation state".

If the GPU manager 321 judges that a record is not present (step S2303: NO), the GPU manager 321 selects any one record among those in the GPU temporary allocation table 303 (step S2311). For example, as a method of selecting the record, the GPU manager 321 may search for a record based on the following given condition, sequentially from the record at the head of the GPU temporary allocation table 303 and may select the corresponding record. The "given condition" is, for example, that the three graphic cards are stored in the finally allocated GPU field, the temporarily allocated GPU 1 field, and the temporarily allocated GPU 2 field are respectively unallocated.

After the selection, the GPU manager 321 sets to "the final allocation state", the GPU allocation state of the graphic card 110 stored in the finally allocated GPU field of the record selected (step S2312). After this setting, the GPU manager 321 sets to "the temporary allocation state", the GPU allocation state of the graphic card 110 of the value in the number of GPUs temporarily allocated field, from the temporarily allocated GPU field group of the record selected (step S2313) and proceeds to the operation at step S2314.

As depicted in the flowchart in FIG. 23B, the GPU manager 321 notifies the GPU command analyzer 325 of the start of the measurement of the used memory amount (step S2314). The GPU command analyzer 325 receives the start of the measurement and stores the used memory amount when the graphic card accesses the memory. After this notification, the GPU manager 321 executes the graphic card allocating operations (step S2315). The graphic card allocating operations executed are any one of the series of graphic card allocating operations described in the first to the third embodiments. The operations at steps S1302 to S1304 are executed in the graphic card allocating operations and therefore, do not need to be executed.

After the graphic card allocating operations to an end, the GPU manager 321 acquires the used memory amount for the GPU command, from the GPU command analyzer 325 (step S2316). After this acquisition, the GPU manager 321 selects a record that coincides with the acquired user ID in the user ID field in the user table 2201 (step S2317). If no such record is present, the GPU manager 321 generates a new record and adds this record to the user table 2201. In this case, the GPU manager 321 acquires the user ID field, the password field, and the VMID field of the record generated from the VM manager 327, and stores these fields.

After this acquisition, the GPU manager 321 stores to the graphic card ID field of the selected record, the identification information of the graphic card 110 identified by the graphic card allocating operations for the user table 2201 (step S2318). The GPU manager 321 stores to the used memory amount field of the selected record, the amount of memory used by the acquired GPU command (step S2319) and causes the graphic card allocation preprocessing to come to an end.

As described, according to the allocating method, the allocating apparatus, and the allocation program, the graphic card allocating operations is executed using the information on the graphic card that is previously allocated. Consequently, the allocating apparatus is able to reduce the possibility that the graphic card is switched during the graphic card allocating operations.

The allocating apparatus may duplicate a command and transmit the command to the apparatus group that is of a number that corresponds to the memory amount used by the command. For example, the allocating apparatus may reduce the number of apparatus groups when the used memory amount is high. Consequently, when the used memory amount is high, the allocating apparatus is able to reduce the number of graphic cards that are to be temporarily allocated and avoid occupation of the bus associated with access to the memory. When the used memory amount is low, the allocating apparatus may increase the number of graphic cards that are to be temporarily allocated. Consequently, the allocating apparatus temporarily allocates many graphic cards and thereby, easily finds a more suitable graphic card.

An allocating apparatus 101 according to a fifth embodiment will be described for a case where the measured GPU utilization rate is reflected on the GPU performance information in the GPU management table 301. In the description of the allocating apparatus 101 according to the fifth embodiment, the description will be made based on the allocating apparatus 101 according to the first embodiment. The fifth embodiment is also applicable to the second, the third, or the fourth embodiment.

In the description of the allocating apparatus 101 according to the fifth embodiment, an example of software and the contents stored in a command retaining table 2401 will be described and thereafter, a GPU utilization rate measuring operation will be described of measuring the GPU utilization rate for each of the graphic cards 110.

Hardware of the allocating apparatus 101 according to the fifth embodiment is same as the hardware of the allocating apparatus 101 of the first embodiment depicted in FIG. 2 and therefore, will not again be described. As to software of the allocating apparatus 101 according to the fifth embodiment, graphic card allocation preprocessing is added to the GPU manager 321, and the graphic card allocating operations of the GPU manager 321 are not changed and therefore, will not again be described. Other functional units have the same functions as those in the first embodiment and will not again be described.

Figure 24:
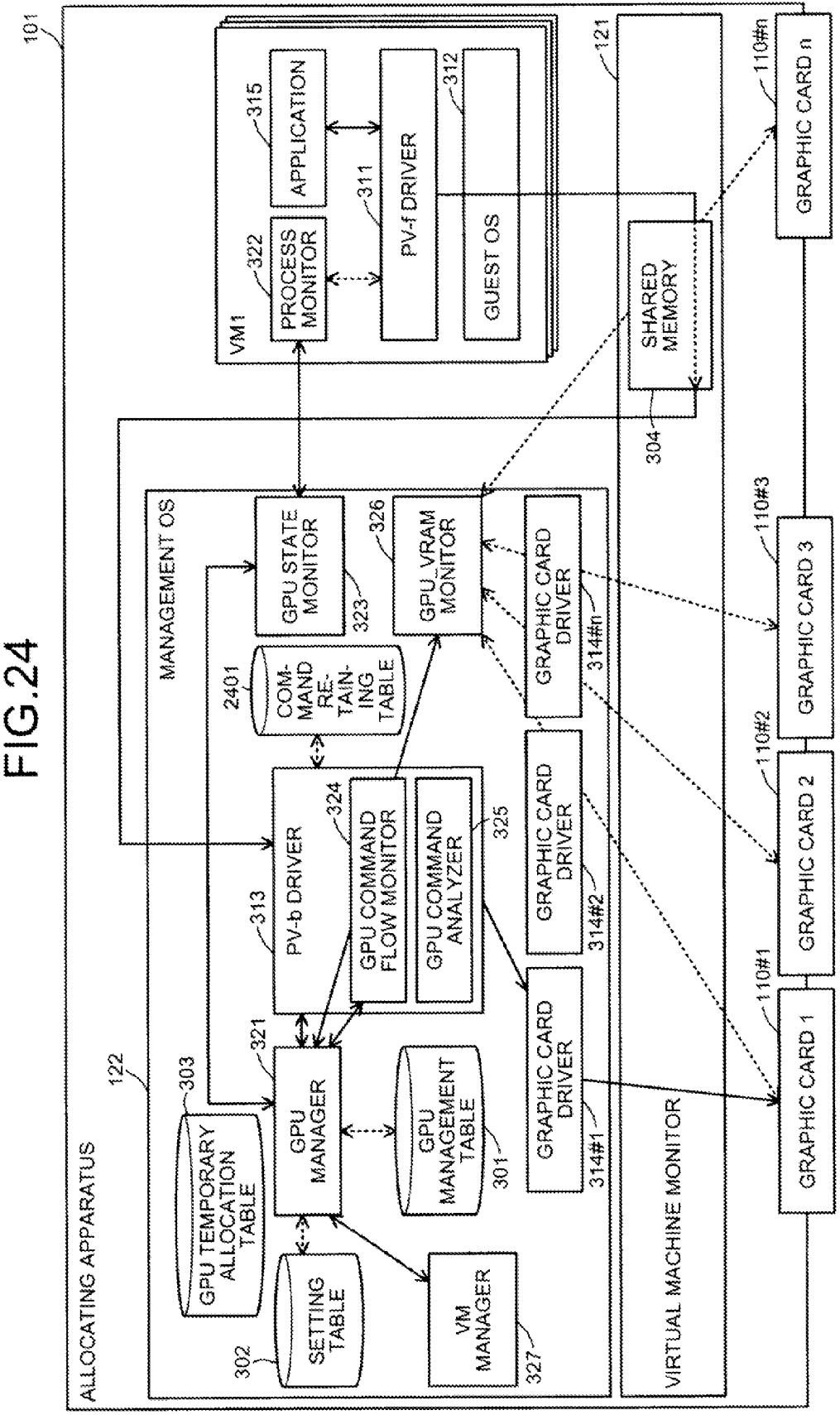
FIG. 24 is a block diagram of an example of software of the allocating apparatus 101 according to the fifth embodiment.

FIG. 24 is a block diagram of an example of software of the allocating apparatus 101 according to the fifth embodiment. The allocating apparatus 101 according to the fifth embodiment is able to access a command retaining table 2401 in addition to the table group accessible by the allocating apparatus 101 according to the first embodiment.

The command retaining table 2401 is a table that stores therein the GPU commands notified from the VM. For example, when the GPU manager 321 executes the graphic card allocating operations, the PV-b driver 313 stores the GPU command notified from the VM, to the command retaining table 2401. At this time, the GPU state monitor 323 also stores the GPU utilization rate measured, to the command retaining table 2401. The GPU manager 321 accesses the command retaining table 2401 and executes the GPU utilization rate measuring operations.

FIG. 25 is an explanatory diagram of an example of the contents stored in the command retaining table 2401. The command retaining table 2401 includes two fields that include a command list field and a GPU utilization rate field. The command list field stores therein an address to the command list that stores therein the GPU commands. The GPU utilization rate field stores therein the GPU utilization rate acquired when a GPU command that is stored in the command list field is executed. The GPU utilization rate field includes a sub field storing therein the GPU utilization rates of the GPU-1 to the GPU-n.

For example, the command retaining table 2401 depicted in FIG. 25 indicates that the address to a command list 2501 is "0x10002000", and that when the command list 2501 is executed, the GPU utilization rates are 82.3[%] for the GPU-1, 27.9[%] for the GPU-2, and 96.4[%] for the GPU-3. The GPU utilization rate of the GPU-n is not measured. The command list 2501 depicted in FIG. 25 stores therein a GPU command group to generate a window and draw a triangle after initializing the graphic card 110.

As depicted in FIG. 26, the GPU manager 321 executes GPU utilization rate recording operations. Those in the GPU command group used in the GPU utilization rate recording operations are the GPU commands to be duplicated at step S1803, the step at which the operations of the GPU command analyzer 325 are executed. The GPU command analyzer 325 stores the GPU commands to be duplicated, to the command list 2501.

Figure 26B:
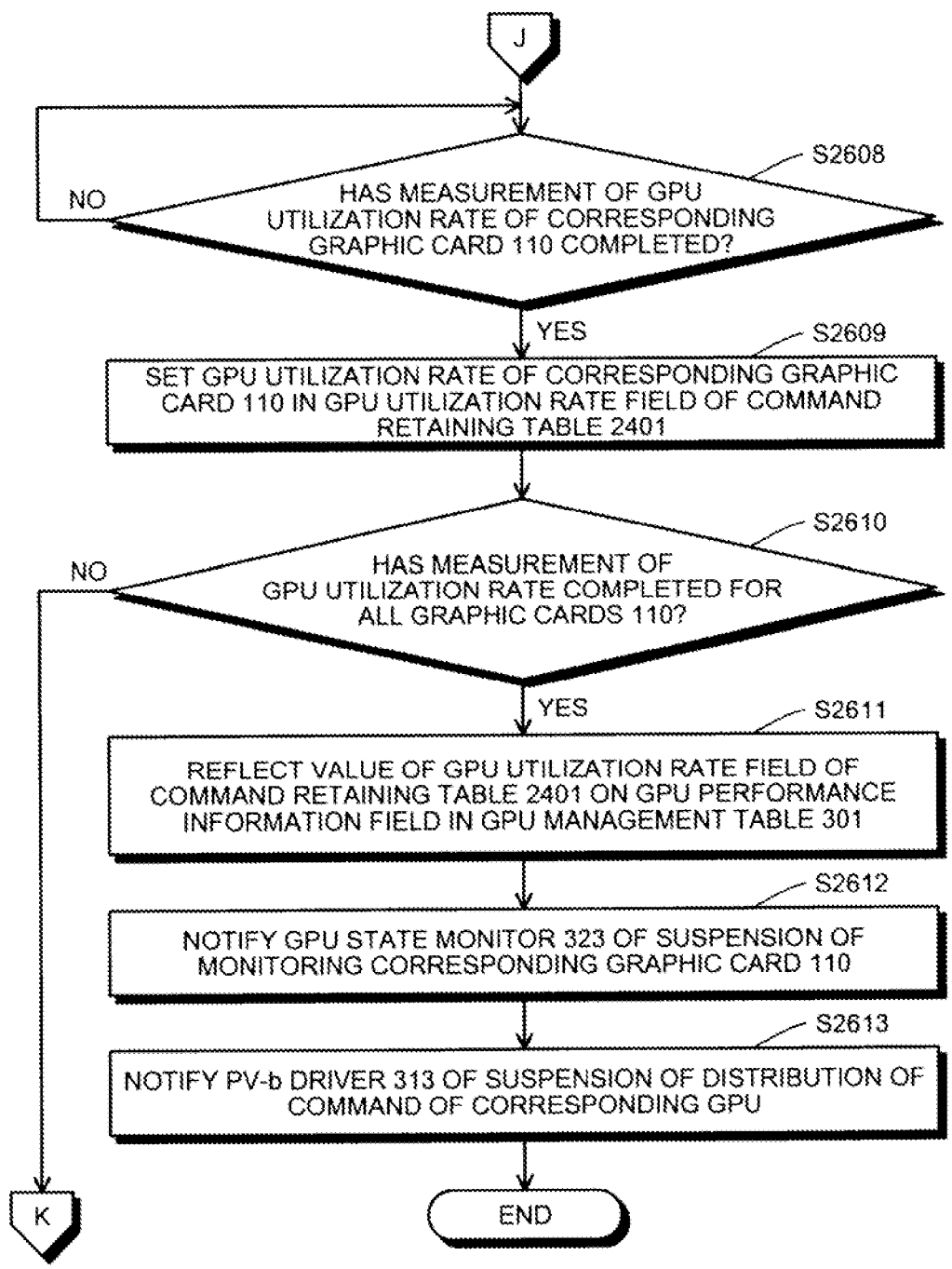
FIG. 26B is a flowchart of an example of the GPU utilization rate measuring operations by the GPU manager 321.

FIGS. 26A and 26B are flowcharts of an example of the GPU utilization rate measuring operations by the GPU manager 321. In a case where the GPU utilization rate measuring operations is executed, a value is stored in the GPU utilization rate field for the graphic card that is in the final allocation state or the temporary allocation state when the graphic card allocating operations are executed. Therefore, in the GPU utilization rate measuring operations, the GPU utilization rate has to be measured for only graphic cards 110 other than the graphic cards 110 that are in the final allocation state or the temporary allocation state.

The GPU manager 321 notifies the PV-b driver 313 of the start of the duplication of the GPU command stored in the command list 2501 (step S2601). After this notification, the GPU manager 321 judges whether a graphic card 110 is present whose GPU utilization rate corresponding to the command list 2501 has not been measured and whose GPU allocation state is the "unallocated" or the "to be released" state (step S2602). If the GPU manager 321 judges that a graphic card 110 is not present whose GPU utilization rate has not been measured and whose GPU allocation state is the "unallocated" or the "to be released" state (step S2602: NO), the GPU manager 321 executes the operation at step S2602 after a given time period elapses. Consequently, for each graphic card in the "final allocation", the "temporary allocation", or "to be allocated" state, the GPU utilization rates thereof can be measured after the allocation is released.

With reference to FIGS. 26A and 26B, hereinafter, a graphic card 110 whose GPU utilization rate has not been measured and that is in the "unallocated" or the "to be released" state will be referred to as "corresponding graphic card 110". If the GPU manager 321 judges that a corresponding graphic card 110 is present (step S2602: YES), the GPU manager 321 notifies the PV-b driver 313 of the start of the distribution of the GPU commands to the corresponding graphic card 110 (step S2603). The PV-b driver 313 receives the start of the distribution of the GPU commands and transmits the duplicated GPU commands to the corresponding graphic card 110 by the operation at step S1805.

The GPU manager 321 notifies the GPU state monitor 323 of the start of the monitoring of the corresponding graphic card 110 (step S2604). The GPU state monitor 323 receives the start of the monitoring and measures the GPU utilization rate of the corresponding graphic card 110 by the operation at step S1503.

After this notification, the GPU manager 321 judges whether allocation notification to the corresponding graphic card 110 has been received from a VM other than the VMs that are to be monitored (step S2605). If the GPU manager 321 judges that allocation notification from another VM has been received (step S2605: YES), the GPU manager 321 notifies the GPU state monitor 323 of the suspension of the monitoring of the corresponding graphic card 110 (step S2606). After this notification, the GPU manager 321 notifies the PV-b driver 313 of the suspension of the distribution of the commands of the corresponding GPU (step S2607) and proceeds to the operation at step S2602. If the GPU manager 321 judges that allocation notification has not been received from another VM (step S2605: NO), the GPU manager 321 proceeds to step S2608.

Is depicted in the flowchart in FIG. 26B, the GPU manager 321 judges whether GPU utilization rate measurement has been completed for the corresponding graphic card 110 (step S2608). If the GPU manager 321 judges that the measurement has not been completed (step S2608: NO), the GPU manager 321 proceeds to the operation at step S2608 after a given time period elapses. If the GPU manager 321 judges that the measurement has been completed (step S2608: YES), the GPU manager 321 sets the GPU utilization rate of the corresponding graphic card 110, in the GPU utilization rate field of the command retaining table 2401 (step S2609).

After this setting, the GPU manager 321 judges whether GPU utilization rate measurement has been completed for each of the graphic cards 110 (step S2610). If the GPU manager 321 judges that the measurement has not been completed (step S2610: NO), the GPU manager 321 proceeds to the operation at step S2602. If the GPU manager 321 judges that the measurement has been completed (step S2610: YES), the GPU manager 321 reflects the value in the GPU utilization rate field of the command retaining table 2401, to the GPU performance information field of the GPU management table 301 (step S2611).

As a reflecting method, if no value is stored in the GPU performance information field, the GPU manager 321 stores the value stored in the GPU utilization rate field of the command retaining table 2401, to the GPU performance information field. When the value is stored to the GPU performance information field, the GPU manager 321 may store to the GPU performance information field, for example, an average value of the value stored in the GPU performance information field and the value stored in the GPU utilization rate field.

After this reflection, the GPU manager 321 notifies the GPU state monitor 323 of the suspension of the monitoring of the corresponding graphic card 110 (step S2612). After this notification, the GPU manager 321 notifies the PV-b driver 313 of the suspension of the distribution of the commands of the corresponding GPU (step S2613) and causes the GPU utilization rate measuring operations to come to an end.

As described, according to the allocating method, the allocating apparatus, and the allocation program, a command actually transmitted is transmitted to all of the graphic cards and the respective GPU utilization rates thereof are measured. As a result, the allocating apparatus is able to acquire more accurate processing performance for each of the graphic cards.

The allocating method described in the present embodiment may be implemented by executing a prepared program on a computer such as a personal computer and a workstation. The program is stored on a computer-readable medium such as a hard disk, a flexible disk, a CD-ROM, an MO, and a DVD, read out from the recording medium, and executed by the computer. The program may be distributed through a network such as the Internet. However, the computer-readable medium does not include a transitory medium such as a propagation signal.

According to an aspect of the present invention, allocation is effected that can be executed according to the processing performance of the source of the request.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An allocating method executed by a computer, the allocating method comprising:
    transmitting to any one given apparatus among a plurality of apparatuses capable of executing an identical process and respectively having a different processing performance, a command for the process;
    duplicating the command and transmitting resulting duplicated commands to an apparatus group that is not executing the process and among the plurality of apparatuses;
    measuring for the given apparatus and each apparatus of the apparatus group, a utilization rate acquired when the command is executed;
    identifying based on the utilization rate for the given apparatus, an apparatus to be switched among the apparatus group; and
    switching a transmission destination of the command, from the given apparatus to the apparatus to be switched.

2. The allocating method according to claim 1, wherein the identifying includes identifying from the utilization rate for the given apparatus and the utilization rate of each apparatus of the apparatus group, an apparatus whose utilization rate is between a predetermined upper limit value and a predetermined lower limit value as the apparatus to be switched.

3. The allocating method according to claim 1, wherein the identifying includes identifying from the utilization rate for the given apparatus and the utilization rate of each apparatus of the apparatus group, an apparatus whose utilization rate is less than a predetermined upper limit value and is the highest as the apparatus to be switched.

4. The allocating method according to claim 1, wherein the identifying includes identifying from the utilization rate for the given apparatus and the utilization rate of each apparatus of the apparatus group, an apparatus whose utilization rate is less than a predetermined upper limit value and is the lowest as the apparatus to be switched.

5. The allocating method according to claim 1, further comprising
    suspending the duplicating of the command for apparatuses other than the apparatus to be switched and among the apparatus group.

6. The allocating method according to claim 1, wherein the duplicating includes duplicating the command and transmitting resulting duplicated commands to the apparatus group that is among the plurality of apparatuses and includes an apparatus that is not executing the process and has processing performance lower than that of the given apparatus and an apparatus that is not executing the process and has processing performance higher than that of the given apparatus.

7. The allocating method according to claim 1, wherein the switching includes switching the transmission destination of the command from the given apparatus to the apparatus to be switched, when the number of transmissions per unit time of the command is less than or equal to a predetermined number.

8. The allocating method according to claim 1, wherein the duplicating further includes duplicating the command and transmitting resulting duplicated commands to the apparatus group having apparatuses of a number corresponding to the amount of memory used by the command.

9. The allocating method according to claim 1, wherein the apparatus is an image processing apparatus and the command is a drawing command.

10. The allocating method according to claim 9, wherein the switching includes switching the transmission destination of the command from the given apparatus to the apparatus to be switched, when an updated amount according to the command is less than or equal to a predetermined amount in an image storage area in the given apparatus.

11. The allocating method according to claim 9, wherein the switching includes switching the transmission destination of the command from the given apparatus to the apparatus to be switched, when a difference between an image storage area in the given apparatus and an image storage area in the apparatus to be switched is less than or equal to a predetermined threshold value.

12. An allocating apparatus comprising:
    a first transmitter that transmits to any one given apparatus among a plurality of apparatuses capable of executing an identical process and respectively having a different processing performance, a command for the process;
    a second transmitter that duplicates the command and transmits resulting duplicated commands to an apparatus group that is not executing the process and among the plurality of apparatuses;
    a measurer that measures for the given apparatus and each apparatus of the apparatus group, a utilization rate acquired when the command is executed;
    an identifier that based on the utilization rate for the given apparatus, identifies an apparatus to be switched among the apparatus group; and
    a switcher that switches a transmission destination of the command, from the given apparatus to the apparatus to be switched.

13. A computer-readable medium storing therein an allocating program that causes a computer to execute a process, the process comprising:
    transmitting to any one given apparatus among a plurality of apparatuses capable of executing an identical process and respectively having a different processing performance, a command for the process;
    duplicating the command and transmitting resulting duplicated commands to an apparatus group that is not executing the process and among the plurality of apparatuses;
    measuring for the given apparatus and each apparatus of the apparatus group, a utilization rate acquired when the command is executed;

identifying based on the utilization rate for the given apparatus, an apparatus to be switched among the apparatus group; and switching a transmission destination of the command, from the given apparatus to the apparatus to be switched.

* * * * *